US006910148B1

(12) United States Patent
Ho et al.

(10) Patent No.: US 6,910,148 B1
(45) Date of Patent: Jun. 21, 2005

(54) ROUTER AND ROUTING PROTOCOL REDUNDANCY

(75) Inventors: Chi Fai Ho, Sunnyvale, CA (US); Amar Gupta, Cupertino, CA (US); Madhu Grandhi, Fremont, CA (US); Alex Bachmutsky, San Jose, CA (US)

(73) Assignee: Nokia, Inc., Irving, TX (US)

( * ) Notice: Subject to any disclaimer, the term of this patent is extended or adjusted under 35 U.S.C. 154(b) by 654 days.

(21) Appl. No.: 09/733,284

(22) Filed: Dec. 7, 2000

(51) Int. Cl.[7] .............................................. G06F 11/00

(52) U.S. Cl. .............................................. 714/4; 714/6

(58) Field of Search ........................... 714/4, 6, 15, 43; 370/219

(56) References Cited

U.S. PATENT DOCUMENTS

| 5,473,599 | A | | 12/1995 | Li et al. |
| 5,870,382 | A | * | 2/1999 | Tounai et al. ............... 370/220 |
| 5,936,936 | A | | 8/1999 | Alexander, Jr. et al. .... 370/216 |
| 6,148,410 | A | * | 11/2000 | Baskey et al. .................. 714/4 |
| 6,490,246 | B2 | * | 12/2002 | Fukushima et al. ......... 370/220 |
| 6,577,634 | B1 | * | 6/2003 | Tsukakoshi et al. ... 370/395.31 |
| 2002/0176355 | A1 | * | 11/2002 | Mimms et al. ............. 370/216 |

FOREIGN PATENT DOCUMENTS

WO   WO 96/12363   4/1996

OTHER PUBLICATIONS

Zhou et al.; "Fast Cluster Failover Using Virtual Memory–Mapped Communication"; 1999; ACM; ICS '99 Rhodes Greece; pp. 373–382.*

"Layer 3"; Jul. 29, 2001; searchNetworking.com Definitions; p. 1; http://searchnetworking.techtarget.com/sDefinition/0,,sid7_gci214604,00.html.*

"BGP"; Dec. 4, 2002; Whatis.com Target Search; pp. 1–2; http://whatis.techtarget.com/definition/0,,sid9_gci213813,00.html.*

George Swallow, "MPLA Advantages for Traffic Engineering", IEEE Communications Magazine, Dec. 1999, p. 54–57.

"The Technology of IP Routers in the New Public Network", Ericsson IP Infrastructure, Jan. 2000, p. 1–21.

"Unleash the Power, Building Multi–Service IP Networks with ATM Cores", The ATM Forum, p. 1–12, printed in Belgium—Mar. 1999.

J.Y. Liu, T.T. Chiam, and K.K. Kwong, "Temasek Polytechnic Campus Network Design & Implementation: A Case Study," XP010365608, Internet Workshop, 1999, Osaka, Japan, pp. 209–214 (Feb, 18–20, 1999).

PCT Invitation to Pay Additional Fees for PCT Counterpart Appl. No. PCT/US01/48582 Containing International Search Report (Jun. 17, 2002).

(Continued)

*Primary Examiner*—Scott Baderman
*Assistant Examiner*—Joshua Lohn
(74) *Attorney, Agent, or Firm*—Squire, Sanders & Dempsey L.L.P.

(57) ABSTRACT

A router and routing protocol redundancy are disclosed to reduce service outage or degradation for a network device and thus to increase service availability on a network due to software and hardware failures of the network device. A network device such as router includes a redundancy platform having an active controller system and a standby controller system. A routing protocol state change is received or generated by the active controller system. The received or generated routing protocol state change is replicated to the standby controller system. By replicating the routing protocol state change, the standby controller system can maintain the routing protocol sessions for the network device if a failure occurs in the active controller system. Furthermore, the routing protocol states are maintained in realtime to handle the dynamic changes created by routing protocols.

21 Claims, 38 Drawing Sheets

OTHER PUBLICATIONS

Liu et al, "Temasek Polytechnic campus network design and implementation: a case study" Internet Workshop, 1999. IWS 99 Osaka, Japan, Feb. 18–20, 1999, pp. 209–214, XP010365608.

Massey et al, "Fault detection in routing protocols", IEEE, Oct. 31, 1999, pp. 31–40, XP010356973.

Livevault Corporation: "Real Time Replicator Concepts Guide", Real Time Replicator Concepts Guide, Jun. 2000, pp. 1–4, XP002295399, Retrieved from Internet: URL:http://www.livevault.com/support/knowledge/rtrcg_2_4.pdf>.

Garcia–Luna–Aceves et al, "Scalable link–state Internet Routing", Network Protocols, 1998. Proceedings. Sixth International Conference on Austin, Texas, Oct. 13–16, 1998, IEEE COMPUT.Soc., pp. 52–61, XP010309349.

Afek et al, "Trainet: a new label switching sheme", INFOCOM 2000, Nineteenth Annual Joint Conference of the IEEE Computer and Communications Societies. Proceedings. IEEE, Mar. 26, 2000, pp. 874–883, XP010376177.

Wilder Floyd, "A Guide to TCP/IP Protocol Suite second edition", 1998, Artech House, Norwood, MA, USA, XP002295400, p. 182–184.

* cited by examiner

ROUTER AND ROUTING PROTOCOL REDUNDANCY

FIELD OF THE INVENTION

The present invention pertains to the field of networking and networking devices. More particularly, the present invention relates to network routers and routing protocols. Specifically, the present invention relates to router and routing protocol redundancy.

BACKGROUND OF THE INVENTION

A network is a collection of interconnected devices, which allow users to access resources and data. Common types of network devices include servers, routers, bridges, switches, gateways, and hubs. A well-known network is the Internet. The Internet is a worldwide system of interconnected networks that runs the Internet Protocol (IP) to transfer data (e.g., packets). Because a packet can reach its destination by crossing a number of network boundaries on the Internet, IP includes a layer "3" service that provides routing and forwarding functions so that the packet can reach its destination using an optimal path.

A common network device that provides IP layer 3 service is a router. A router routes packets by determining an optimal path based on its current view of the network and forwards the packet across the network boundaries to a destination using the optimal path. Based on its view of the network, a router generates and maintains a routing table of available routes known to the router. The router uses the routing table to create a forward information table (FIB). The FIB is a table of routes that the router uses to forward packets to their destination.

A router uses a routing protocol to exchange information with other routers in order to maintain a consistent view of the network (i.e., a consistent FIB). For packets to be forwarded properly, each router must have a consistent FIB with other routers on the network. That is, routers having inconsistent forwarding information tables (FIBs) will not traverse packets through the network in a predictable manner. As such, routing loops or improper routing of packets can occur.

Hence, a critical problem that can occur on the network is a router failure. A router can fail for any number of reasons such as misconfigurations, hacker attacks, hardware failures, and software failures. Such failures are unpredictable. Unfortunately, a router failure can cause the topology of the network to change. In particular, the topology can change because certain links or routes disappear. Furthermore, routing protocol information can be lost because certain nodes cannot be reached or certain information cannot be propagated throughout the network. In addition, packets may be unable to reach a destination because certain addresses are unreachable.

A router failure can thus cause a number of problems such as a service outage, service degradation (suboptimal routing), and service outage due to large routing table convergence time. A failed router can cause other routers to forward packets using non-optimal paths causing service degradation because the packets may take more time to reach their destination. A failed router will also cause its peers and other routers on the network through these peers to update their routing tables ("convergence") causing a service outage or degradation to perform such a convergence.

For example, if a router fails and routing protocols of peer nodes or neighboring routers observe the failure, the routing protocols will propagate knowledge of the failed router throughout the network so that the routing tables are updated accordingly. Consequently, before the network can resume complete services, there is a service outage or degradation to update the routing tables in the working routers so they can generate consistent FIBs with each other. This network reconfiguration can take several seconds, minutes, or hours before the entire network can recover. For mission critical services, such a behavior is unacceptable.

A method for dealing with a router failure is to have hardware redundancy in order to increase system availability. This type of redundancy is commonly referred to as layer 2 redundancy. A layer 2 redundancy system may include redundant line cards, ports, or controller cards. If a line card, port, or controller card fails, the redundant line card, port, or controller card can resume operation. However, a disadvantage of layer 2 redundancy is that it does not provide realtime routing protocol redundancy. For instance, the numerous software states that are generated by the routing protocols in realtime are not maintained in the redundant hardware causing protocol sessions to be dropped. Therefore, in a layer 2 redundancy system, protocol sessions are dropped causing a network topology change and thus a service outage or service degradation.

Another method for dealing with a router failure is having a backup router. Such a scheme is commonly referred to as a Virtual Router Redundancy Protocol (VRRP). In a VRRP scheme, if a peer router recognizes that a main router has failed it will start communicating with a backup router. A disadvantage with VRRP is that it can take a long time ("glitch time") to switchover to the backup router. Another disadvantage with VRRP is that the peering sessions of the failed router are torn down or disconnected and cannot be resumed by the backup router thus causing service failure.

Another disadvantage with VRRP is that either all routing sessions are disconnected, or the backup router has separate peering sessions with the same neighbors as the main router causing significant overhead for routing processing. In any case, there is a convergence time involved when the main router fails because peering sessions for the main router will be dropped.

SUMMARY OF THE INVENTION

A router and routing protocol redundancy are disclosed to reduce service outage or degradation for a network device and thus to increase service availability on a network due to software and hardware failures of the network device. For one embodiment, a network device such as router includes a redundancy platform having an active controller system and a standby controller system. A routing protocol state change is received or generated by the active controller system. The received or generated routing protocol state change is replicated to the standby controller system. By replicating the routing protocol state change, the standby controller system can maintain the routing protocol sessions for the network device if a failure occurs in the active controller system. Furthermore, the routing protocol states are maintained in realtime to handle the dynamic changes created by routing protocols.

Other features and advantages of the present invention will be apparent from the accompanying drawings, and from the detailed description, which follows below.

BRIEF DESCRIPTION OF THE DRAWINGS

The present invention is illustrated by way of example and not intended to be limited by the figures of the accompanying drawings in which like references indicate similar elements and in which.

DETAILED DESCRIPTION

A router and routing protocol redundancy are described to reduce service outage or degradation for a network device and thus to increase service availability on a network due to software and hardware failures of the network device. For one embodiment, a network device such as a router includes a redundancy platform having an active controller system and a standby controller system. A routing protocol state change is received or generated by the active controller system. The received or generated routing protocol state change is replicated to the standby controller system. By replicating the routing protocol state change, the standby controller system can maintain the routing protocol sessions for the network device if a failure occurs in the active controller system. Furthermore, the routing protocol states are maintained in realtime to handle the dynamic changes created by routing protocols.

The redundancy techniques described herein allow a failed network device to return to service in a short amount of time to avoid service outages. The redundancy techniques also allow a backup or standby controller system to return the failed network device to service at the working state of the active controller system prior to a failure. The redundancy techniques also prevent peer nodes to a network device from observing the failure to the network device. The redundancy techniques also prevent routing protocol sessions from being dropped in the event of a switchover from an active controller system to a standby controller system by maintaining the protocol sessions in realtime. The redundancy techniques also maintain a consistent view of the network in a standby controller system.

In the following description, redundancy techniques are described with respect to network routers and routing protocols. However, the redundancy techniques described herein are not intended to be limited to any particular type of network device and can be implemented with other types of network devices, which can have hardware and software failures or perform routing protocol functions such as, for example, network switches, network optical switches, bridges, hubs, or gateways.

Furthermore, in the following description, router redundancy refers to a router having a backup controller system (i.e., standby controller system) for an active controller system. The standby controller system can resume operation for the active controller system if the active controller system fails. In addition, routing protocol redundancy refers to maintaining protocol sessions running on the active controller system in the standby controller system and to maintaining consistent routing and forwarding information in the standby controller system with the active controller system.

Router and Routing Protocol Redundancy Overview

Exemplary Network with Router Redundancy

Figure 1:
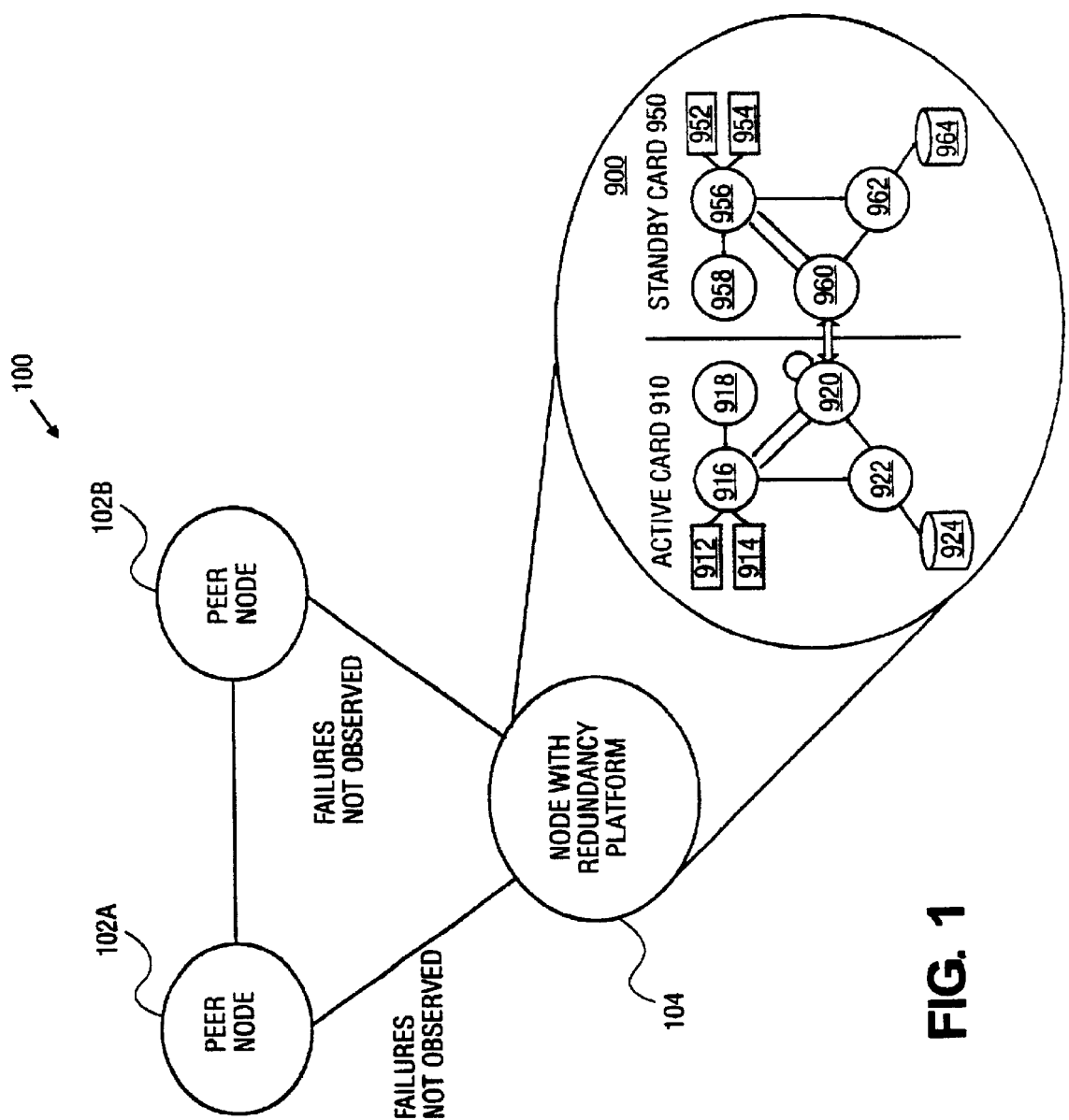
FIG. 1 illustrates an exemplary network in which the present invention can be practiced.

FIG. 1 illustrates an exemplary network 100 in which the present invention can be practiced. Referring to FIG. 1, exemplary network system includes a node 104 having a redundancy platform 900 ("redundant node 104") interconnected with a plurality of peer nodes 102A and 102B. For purposes of illustration, three nodes are shown, however, network 100 can include any number of nodes. Peer nodes 102A and 102B are nodes having a "session" or "logical connection" with redundant node 104.

For one embodiment, nodes 102A, 102B, and redundant node 104 represent network devices such as, for example, network routers performing IP layer 3 services. Alternatively, nodes 102A, 102B, and redundant node 104 can be other type of network devices such as, for example, switches, bridges, hubs, or gateways that can perform IP layer 3 services or even higher layer level services up to application services. In other embodiments, the nodes 102A, 102B, and redundant node 104 can perform Multiprotocol Label Switching (MPLS) services.

Nodes 102A, 102B, and redundant node 104 can represent network routers that are used to forward information (i.e., packets) through one particular group of networks under the same administrative authority and control, which is commonly referred to as an Autonomous System (AS). As such, nodes 102A, 102B, and redundant node 104 can represent "Interior Routers" that run an Interior Gateway Protocol (IGPs) to exchange information within the AS.

If acting as IGPs, nodes 102A, 102B, and redundant node 104 can operate routing protocols such as an Intermediate System-to-Intermediate System Protocol (IS-IS), Open Shortest Path First Protocol (OSPF), and a Routing Information Protocol (RIP). The IS-IS protocol and the OSPF protocol are link state protocols. A link state protocol uses link state packets to maintain a consistent view of the network. The RIP protocol is a simple protocol based on distance vectors that use a shortest path computation.

Alternatively, nodes 102A, 102B, and 104 can represent network routers that are used to forward information between ASs in which case the routers are referred to as "Exterior Routers" and run Exterior Gateway Protocols (EGPs). If acting as EGPs, node 102A, 102B, and redundant node 104 can operate a routing protocol such as a Border Gateway Protocol (BGP). The BGP protocol exchanges connectivity information over a reliable transport protocol such as the Transport Control Protocol (TCP) and does not have error control capabilities. Nodes 102A, 102B, and redundant node 104, however, can represent any combination of Interior Routers or Exterior Routers and any number of routers can be represented within network 100.

Thus, nodes 102A, 102B, and redundant node 104 can maintain consistent routing and routing protocol state information. If a route is updated, the route must be updated in peer nodes to maintain a consistent view of the network. For one embodiment, nodes 102A, 102B, and redundant node 104 can determine neighbors by sending out a "hello" packet. If an established peer node does not respond to the "hello" packet in a certain period of time, the peer node will considered to be inoperative or have "failed."

As such, redundant node 104 is a special type of node having a redundancy platform with an active controller system (active card 910) and a standby controller system (standby card 950) that can prevent failures in the node from being observed by peer nodes 102A and 102B. Furthermore, if the active controller system fails, the standby controller system can resume protocol sessions with peer nodes such that the peer nodes do not observe that the active controller system failed. For example, if node 102A sends a "hello" packet to redundant node 104, that is lost for any reason, and switchover occurs, and node 102A resends the hello packet, the standby controller system can resume operation for redundant node 104 and acknowledge the resent hello packet before a timeout period. Thus, node 102A does not observe the switchover to the standby system.

Figure 9:
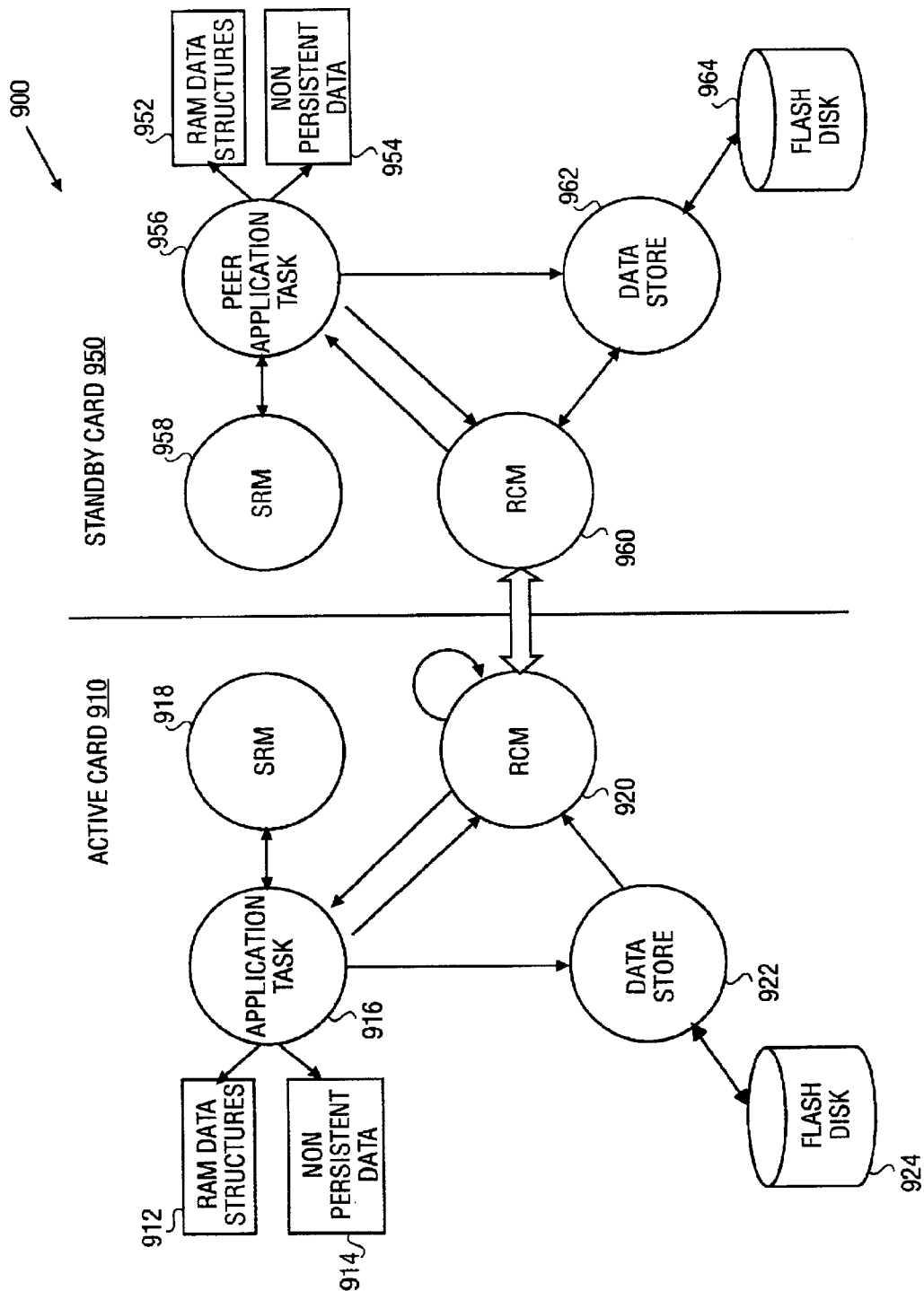
FIG. 9 illustrates a redundancy platform for a network device according to one embodiment.

For one embodiment, node 104 represents a router having a redundancy platform 900 as shown in FIG. 9. The redundancy platform 900 includes an active card 910 and a standby card 950 to resume operation if there is a failure to the active card 910. The active card 910 and standby card 950 include hardware and software modules operating therein. For one embodiment, both active card 910 and standby card 950 can run potentially different or the same versions of software. As will be explained in more detail below, the redundancy platform 900 provides the support to have router and routing protocol redundancy for node 104, which prevents peer nodes from observing failures and maintains routing protocol sessions for the redundant node 104 with its peer nodes.

Exemplary Architecture Layered Model

Figure 2:
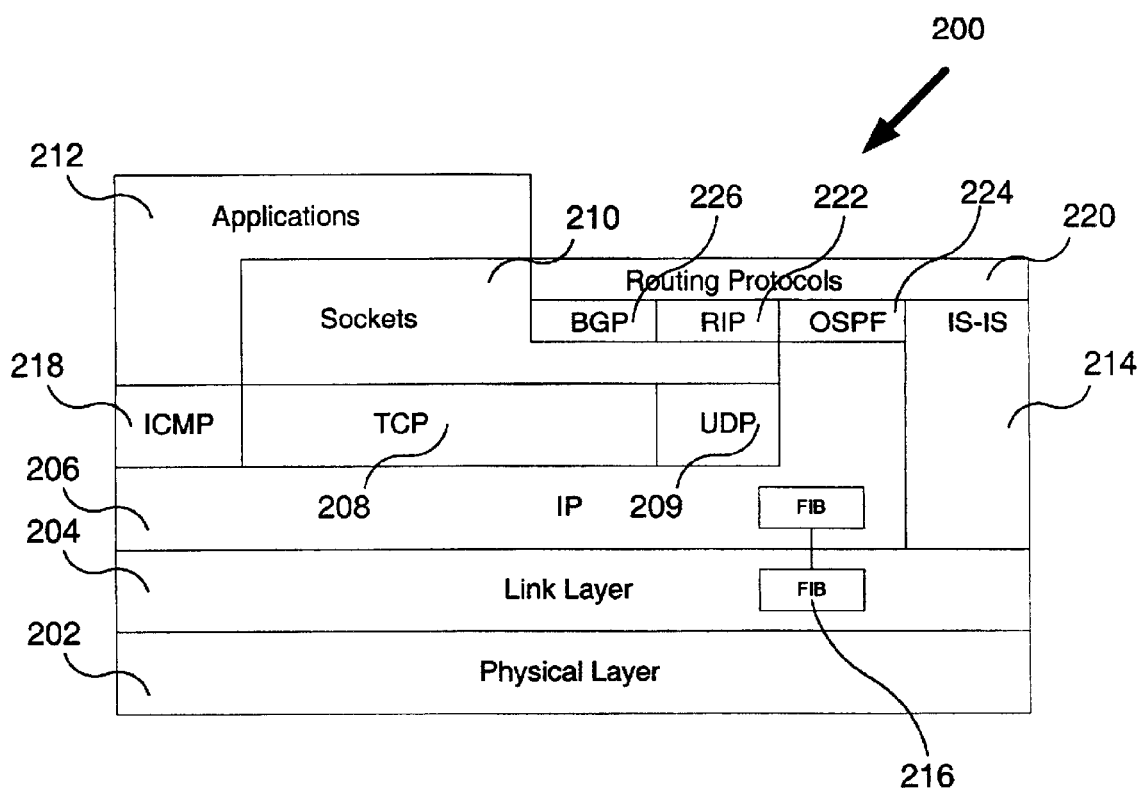
FIG. 2 illustrates an architecture layered model that can be used by the nodes shown in FIG. 1 according to one embodiment.

FIG. 2 illustrates an architecture layered model 200 that can be used by the nodes shown in FIG. 1 according to one embodiment For one embodiment, the active card 910 and standby card 950 operate using the architecture layered model 200. The architecture layered model 200 can be based on a standard 7-layer reference model for network communications. For purposes of explanation, architecture layered model 200 represents one embodiment of the different layers in which an IP router can operate.

Referring to FIG. 2, architecture layered model 200 includes a physical layer 202, link layer 204, IP layer 206, Transmission Control Protocol (TCP) layer 208, User Datagram Protocol (UDP) layer 208, Internet Control Message Protocol (ICMP) 218, routing protocols layer 220 that includes a Border Gateway Protocol (BGP) layer 226, Routing Internet Protocol (RIP) layer 222, Open Shortest Path First (OSPF) protocol layer 224, Intermediate System-to-Intermediate System (IS-IS) protocol layer 214, sockets layer 210, applications layer 212. The routing protocols 220 can maintain a routing table to generate a forwarding information table (FIB) 216. The FIB 216 is used by the IP layer 209 and link layer 216. The above layers provide services for nodes in a network.

The physical layer 202 provides the service of moving data between nodes on a physical link. The link layer 204 provides the service of handling the data being transferred on the physical link. The IP layer 209 ("IP layer 3") provides routing and forwarding services over the physical and link layers. The TCP layer 208 provides the service of ensuring complete data transfer by performing error-checking and making sure all data has arrived. The TCP layer 208 operates over the IP layer 3. Thus, nodes in a network can transmit data using a TCP service over an IP layer 3 service.

The ICMP layer 218 runs on top and is an integral part of IP layer 206. That is, IP layer 3 service is inherently unreliable and data packets can be dropped. Thus, the ICMP layer 218 provides message control and error-reporting for the IP layer 3 service. The UDP layer 209 provides an alternative service to the service provided by the TCP layer 208. In particular, the UDP layer 209 runs on top of the IP layer 3 service layer to provide a connectionless transmission protocol for transmitting datagrams. That is, the UDP layer 209 does not provide end-to-end error detection. The sockets layer 210 provides an end-point of a two-way communication between applications layer 212 or routing protocols 220 of a node running on a network. The applications layer 212 includes applications running on a node. The applications layer 212 can use the lower layers to communicate with applications of other nodes.

The routing protocols 220 provide the service of determining optimal paths ("routes"), forwarding packets, and ensuring updates to the routes are consistent throughout the network. By analyzing routing updates from all routers, a router can build detailed view of the network. Within routing protocols 220, a number of routing protocols can operate. For example, the BGP protocol 226, RIP protocol 222, OSPF protocol 224, and the IS-IS protocol 220 can all operate within the routing protocols layer 220. The routing protocols 220 can use FIB 216 for the transmission of data (e.g., packets) within the layer 3 service provided by the IP layer 206.

The BGP protocol 226 is not a reliable routing protocol. Thus, BGP 226 runs on top of TCP 208 for reliable transfer of messages or packets. In particular, BGP 226 does not resend messages or packets, but relies on the TCP 208 to handle lost messages or packets. RIP 222 uses UDP 209 for the transfer of messages or packets. OSPF 224 and IS-IS 214 have reliable data transfer mechanisms within their respective routing protocols. OSPF 224 runs on top of IP layer 206 and IS-IS 214 runs directly on top of the link layer 204.

As will be explained in more detail below, the routing protocols operating in redundant node 104 can operate in conjunction with the redundancy platform 900 to obtain router and routing protocol redundancy. The redundancy platform 900 provides the support necessary to have realtime routing protocol redundancy. That is, routing protocols are dynamic in which updates to routes occur at regular or irregular intervals depending on routing protocols. To have full redundancy, these updates need to be maintained in realtime.

For example, the routing protocol sessions states for RIP 222, OSPF 224, BGP 226, and IS-IS 214 that may be running on the active card 910 for redundant node 104 can be maintained in realtime on the standby card 950 using the redundancy platform 900. The standby card 950 can resume same routing protocol session states if the active card 910 fails. Furthermore, FIB 216 is also maintained in the standby card 950 such that the standby card 950 will have the most current view of the network if it takes over control for the redundant node 104.

Basic Redundancy Operation

Figure 3:
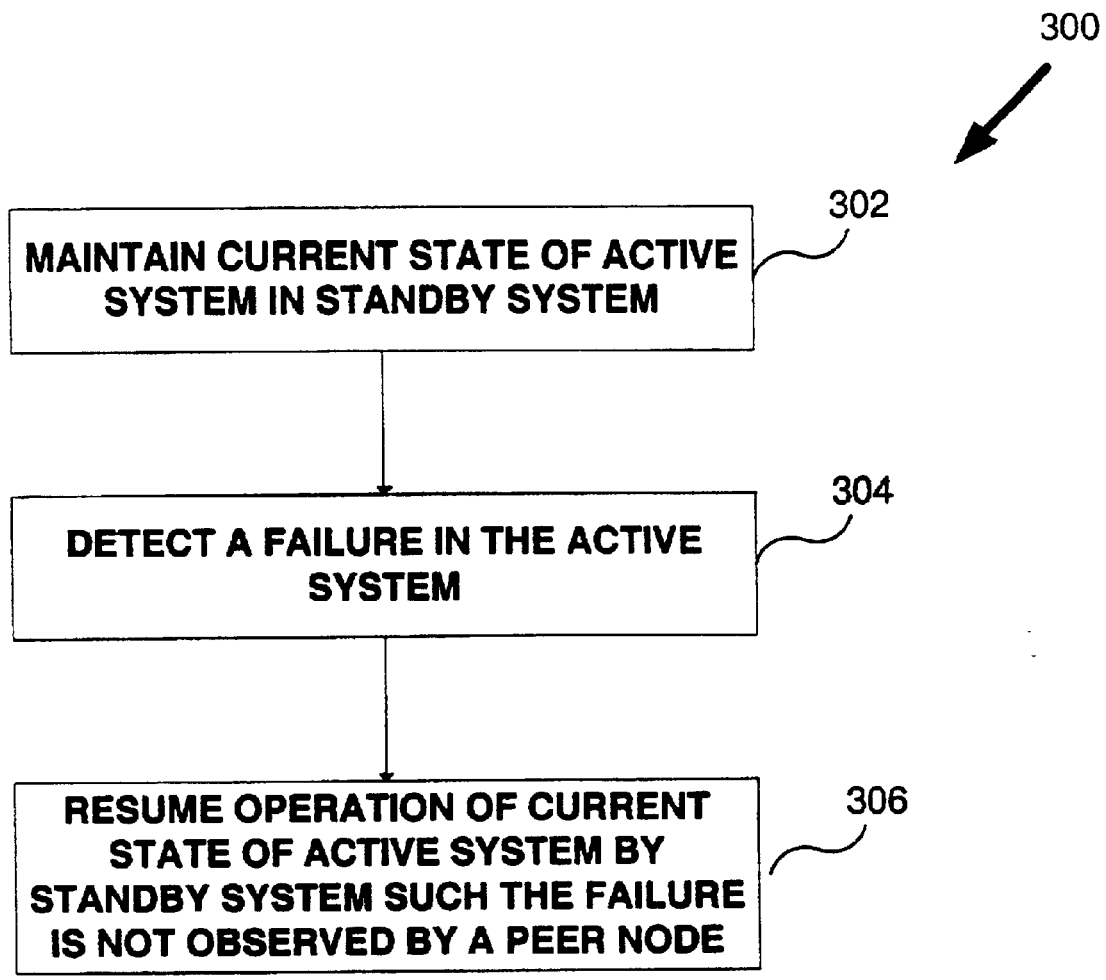
FIG. 3 illustrates a flow chart of a basic operation for a redundant node according to one embodiment.

FIG. 3 illustrates a flow chart of a basic operation 300 for redundant node 104 according to one embodiment. The following operation 300 can be implemented by redundant node 104 having an active card 910 and standby card 950 as shown in FIG. 1. For purposes of explanation, redundant node 104 is a network router 104 that can perform IP layer 3 or MPLS services and operation 300 begins at operation 302.

At operation 302, redundant node 104 maintains the current state of the active card 910 in the standby card 950. In particular, redundant node 104 uses the redundancy platform 900 to replicate or copy current configuration information, global information, routing table information, forwarding table information, protocol session information, or database information in the active card 910 to the standby card 950.

At operation 304, the active card 910 detects a failure. For example, the active card 910 can detect a hardware failure or a software failure in redundant node 104 that will cause redundant node 104 to switchover operation from active card 910 to standby card 950.

At operation 306, the standby card 950 will resume operation of the current state of the active card 910 prior to failure. The standby card 950 will resume operation such that the failure is not observed by peer nodes 102A or 102B. As will be explained in more detail in FIGS. 4A through 7, redundant node 104 can prevent failures from being observed by the peer nodes by maintaining in realtime routing protocol session states of the active card 910 in the standby card 950 and by obtaining a fast switchover to the standby card 950 such that a protocol session will not be dropped. Thus, a network topology change does not have to be propagated throughout the network and convergence time is reduced.

Maintaining Protocol Sessions and Routing Information

Figure 4A:
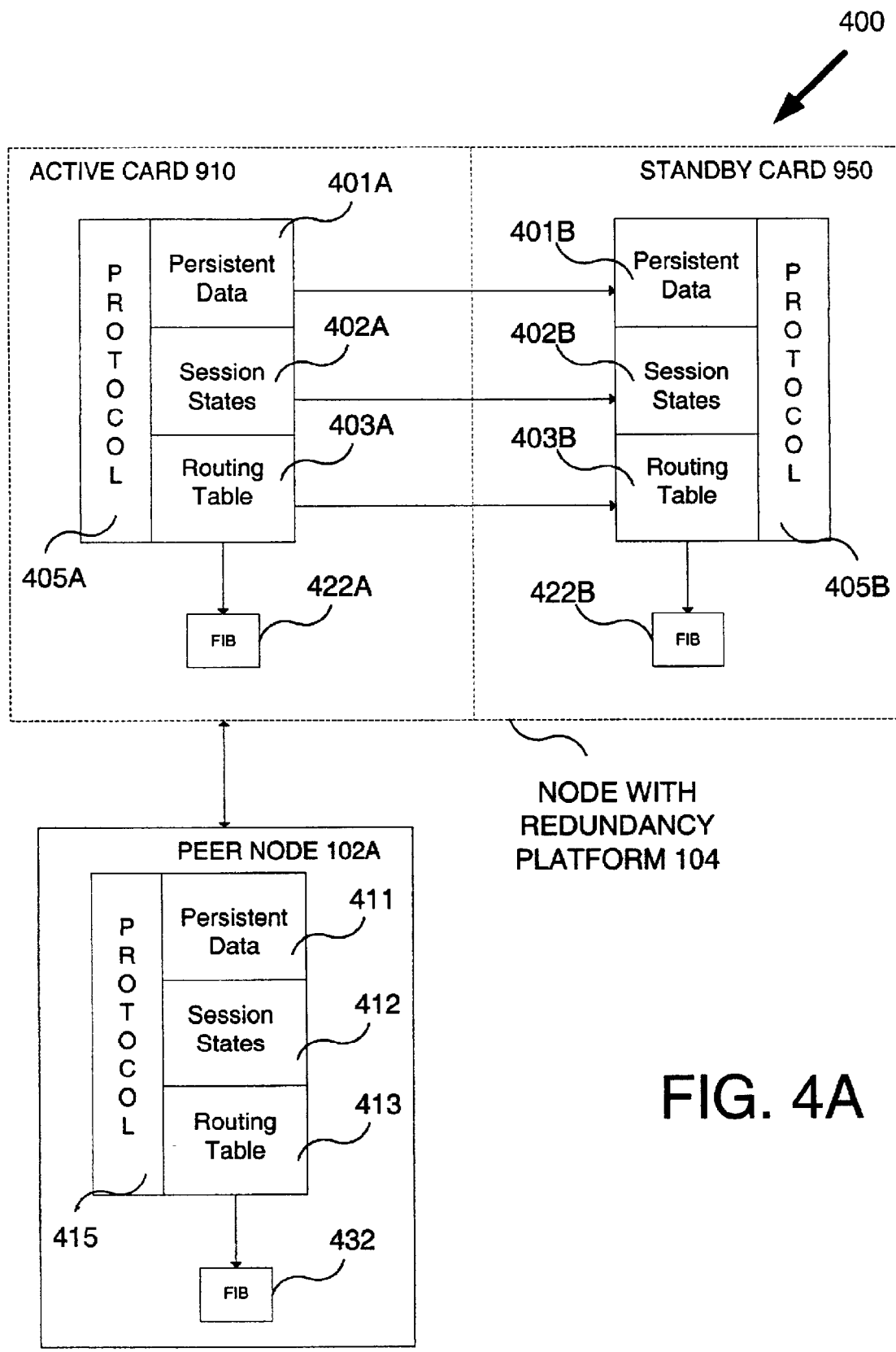
FIG. 4A illustrates a diagram to show replication of routing protocol information from an active card to a standby card.

FIG. 4A illustrates a diagram 400 to show replication of routing protocol information from active card 910 to standby card 950. The redundancy platform 900, as shown in FIG. 9, provides the support to maintain routing protocol information protocol in realtime in standby card 950. Referring to FIG. 4A, the diagram shows peer node 102A communicating with redundant node 104. The redundant node 104 includes a redundancy platform 900 having an active card 910 communicating with peer node 102A. The redundant node 104 also includes a standby card 950 to resume operation if there is a failure to active card 910.

For one embodiment, peer node 102A includes protocol information 415 including persistent data 411, session states 412, and routing table 413, which is used to generate the FIB 432. The protocol information 415 must be consistent with the protocol information 405A within active card 910. That is, the persistent data 411, session states 412, and routing table 413 information of peer node 102A must be consistent with persistent data 401A, session states 402A, and routing table 403A so that standby card 950 can be replicated with the same information to ensure redundancy. Furthermore, If the routing tables 413 and 403A are not consistent, the FIB 432 in peer node 102A will not be consistent with the FIB 422A in active card 910. As such, peer node 102A may consider redundant node 104 to have a different view of the network that it has and peer node 102A and can tear down routing protocol sessions with redundant node 104.

In order to have full redundancy, changes received or made by active card 910 to protocol information 405A must be replicated to protocol information 405B in standby card 950. Specifically, changes received or made by active card 910 to persistent data 401A, session states 402A, and routing table 403A are replicated to persistent data 401B, session states 402B, and routing table 403B in standby card 950. If the changes are not maintained, redundancy is broken.

The protocol information can be related to routing protocols such as, for example, the BGP, RIP, OSPF, and IS-IS routing protocols. Persistent data can include configuration information for each routing protocol that are more permanent in nature. Session state information include routing protocol state changes for each routing protocol running on a node. Session state information is dynamic in nature and can change at regular or irregular intervals. For example, routing protocol state change data can include information related to rules for communication between nodes, status of every route received from a peer, status of every route sent to a peer, time out parameters, history of routes being deleted by every peer, and etc., for each routing protocol. Routing table information includes routes known by a node for each routing protocol. The routing table information is used to generate the FIB table, which is used to forward packets.

Because the standby card 950 is populated with pertinent information required for each routing protocol running on the active card 910, if a failure occurs to the active card 910, the standby card 950 can resume the routing protocol sessions of the active card 910 using a consistent FIB with the active card 910. Thus, standby card 950 can resume the same protocol sessions using the same states of the active card 910. In such a case, peer node 102A will communicate with standby card 950 believing it is still communicating with active card 910 thereby avoiding a service outage.

Figure 4B:
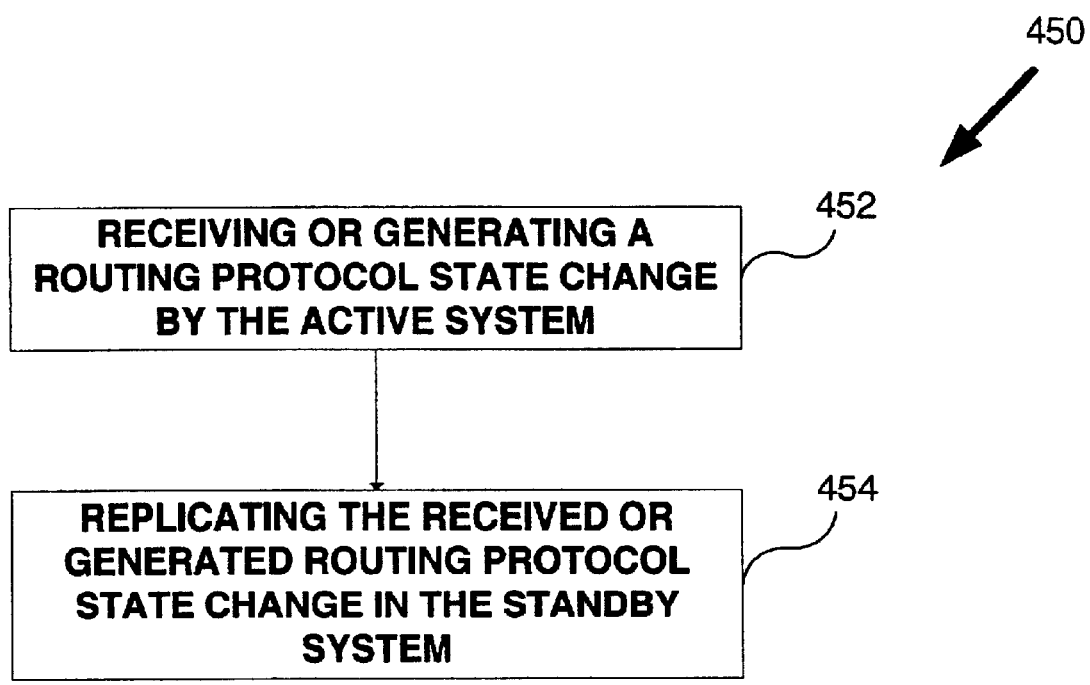
FIG. 4B illustrates a flow chart of an operation for replicating routing protocol state change information according to one embodiment.

FIG. 4B illustrates a flow chart of an operation 450 for replicating routing protocol state change information according to one embodiment. The following operation 450 can be implemented by redundant node 104 having an active card 910 and standby card 950 as shown in FIG. 1. For purposes of explanation, redundant node 104 is a network router 104 performing IP layer 3 or MPLS services and operation 450 begins at operation 452.

At operation 452, routing protocol state change information is received or generated by active card 910. For example, active card 910 can generate a change to persistent data 401A, session states 402A, and routing table 403A. Alternatively, active card 910 can receive a change from peer node 102A for persistent data 401A, session states 402A, and routing table 403A At operation 454, the received or generated routing protocol state change in the active card 910 is replicated to the standby card 950. For example, the redundancy platform 900 as shown in FIG. 9 provides the support for the replication of persistent data 401A, session states 402A, and routing table 403A in active card 910 to be made in its peer persistent data 401B, session states 402B, and routing table 403B in standby card 950. Such a replication operation is performed in realtime. Thus, if active card 950 fails, standby card 950 can resume operation using the same information in active card 950.

Fast Switchover/Failure Spoofing

Figure 5:
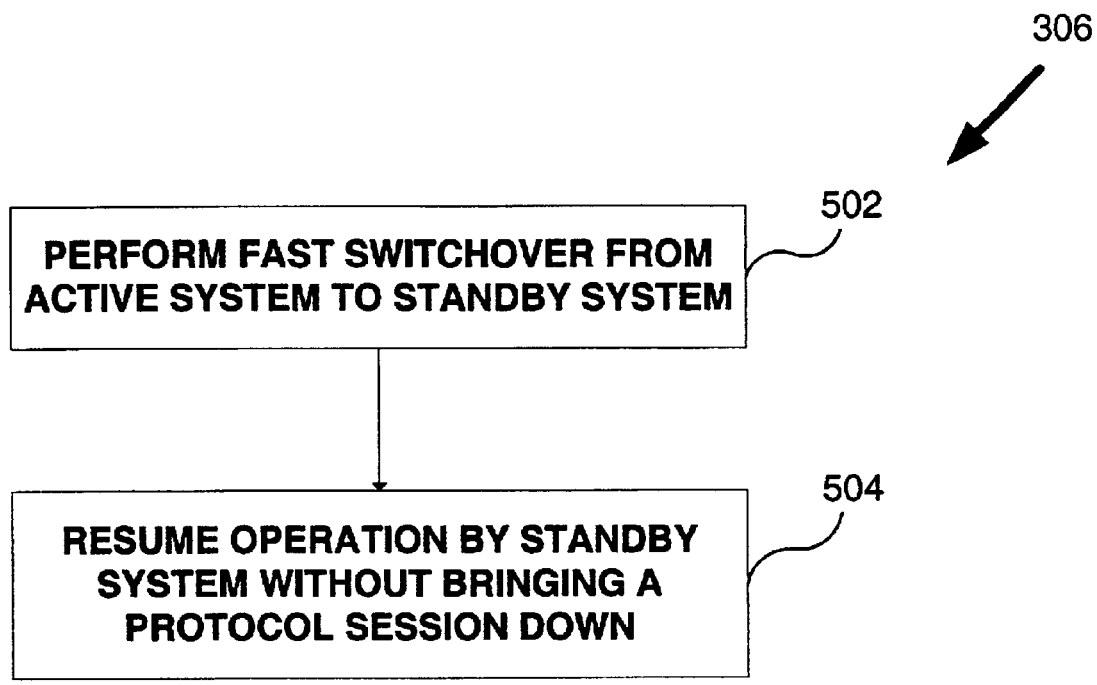
FIG. 5 illustrates a flow chart of a detailed operation for the resuming operation in FIG. 3 having a fast switchover to the standby controller system according to one embodiment.
Figure 6A:
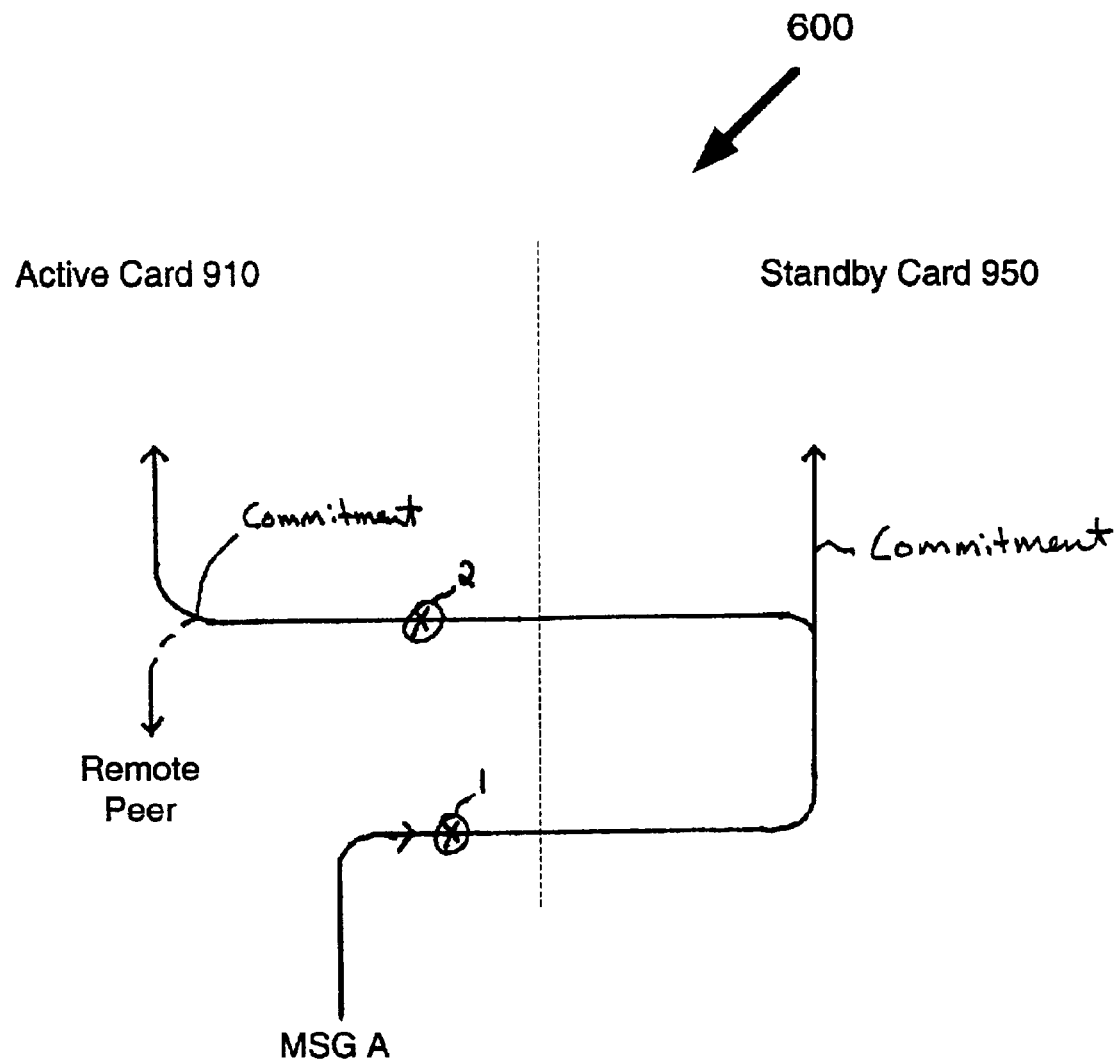
FIG. 6A illustrates a diagram to show spoofing of a peer node from observing a failure and a switchover according to one embodiment.
Figure 6B:
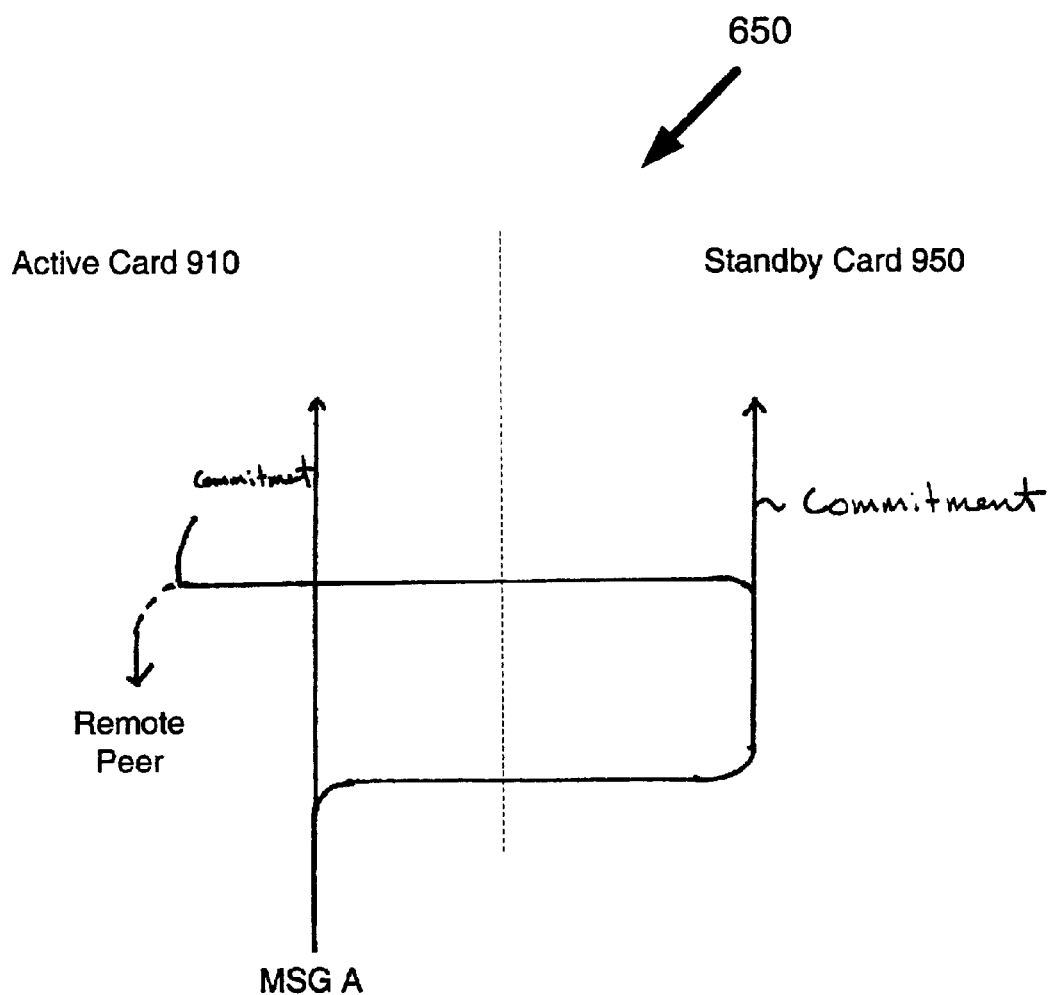
FIG. 6B illustrates a diagram to show spoofing of a peer node from observing a failure and a switchover according to another embodiment.
Figure 7:
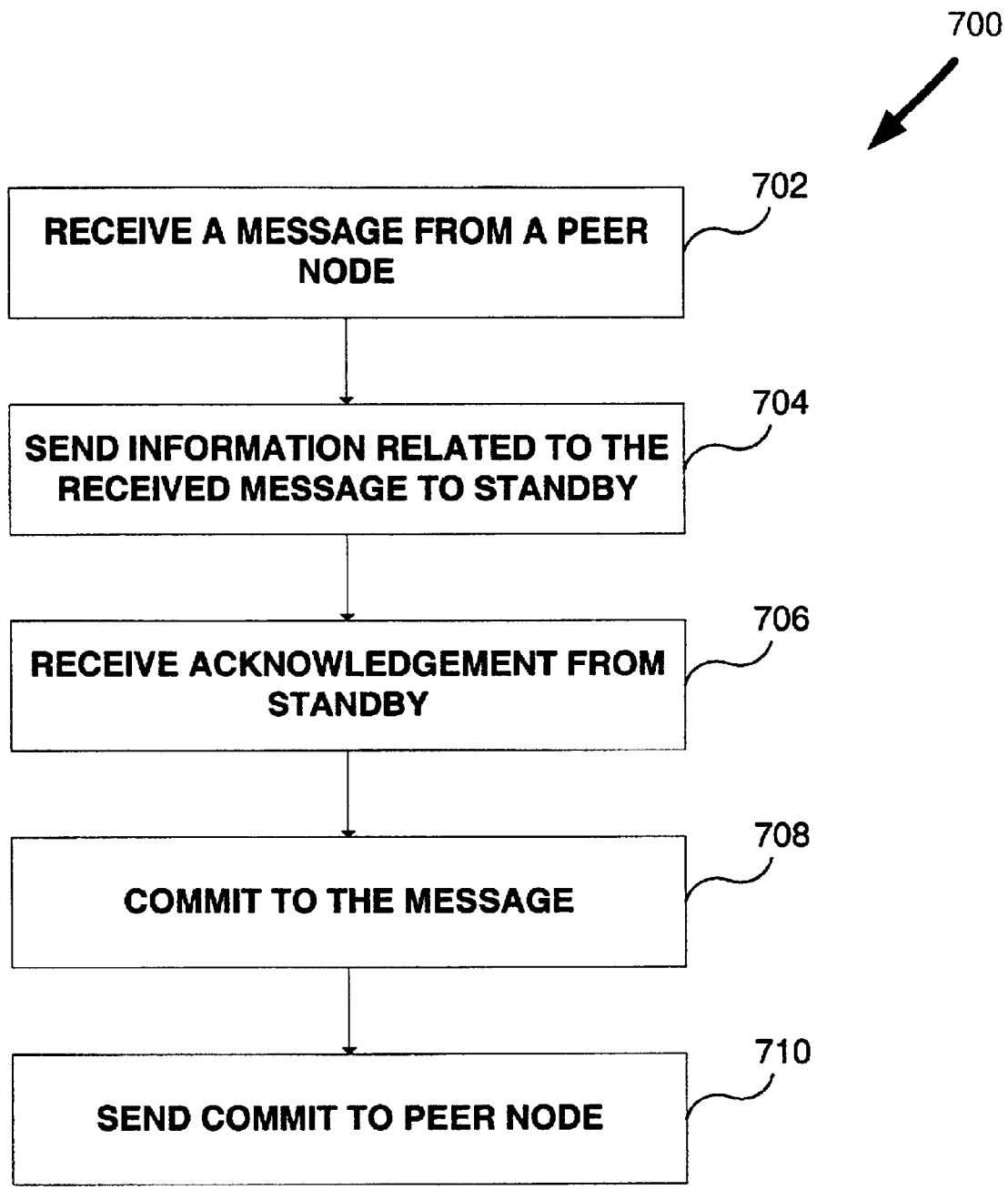
FIG. 7 illustrates a flow chart of an operation for sending a commit to a peer node according to one embodiment.

FIGS. 5 through 7 illustrate how a node with redundancy platform 900 can prevent peer nodes from observing failures and switchovers. By maintaining persistent data, session states, and routing table information consistent in a standby controller system (standby card 950) with the rest of the network, a seamless, smooth, and fast switchover can take place. The switchover is fast enough (e.g., within a few milliseconds) that peer nodes do not observe that the redundant node 104 may have lagged slightly to perform the switchover.

FIG. 5 illustrates a flow chart of a detailed operation 306 of FIG. 3 for resuming operation by a standby controller system having a fast switchover according to one embodiment. For purposes of explanation, operation 306 begins at operation 502.

Referring to FIG. 5, at operation 502, redundant node 104 performs a switchover from active card 910 to standby card 950. The switchover can be performed within a few milliseconds. The small amount of time to perform the switchover (i.e., "glitch") is so small that a peer node 102A does not observe that a switchover has occurred. At operation 504, the standby card 350 resumes operation with peer node 102A without bringing down a protocol session. That is, the glitch is so small that peer node 102A does know there was a glitch in redundant node 104.

The following is a detailed description to explain the fast switchover. Because IP is inherently unreliable, packets can be dropped. If a packet is received by active card 910 from peer node 102A and a failure occurs such that the active card 910 does not acknowledge receipt of the packet, peer node 102A can resend the packet. In this situation even if there is a switchover, the standby card 950 can still receive the packet being resent from peer node 102A and acknowledge receipt of that packet. Thus, the peer node 102A will observe a common occurrence (i.e., resending a packet and receiving an acknowledgement to the resent packet) and will not believe a failure or switchover occurred in redundant node 104 even though a packet was dropped.

Because the switchover is performed quickly, the standby card 950 can resume operation for the redundant node 104 without a routing protocol session from being torn down. For example, each routing protocol includes a timeout period in which it will tear down a session if a certain number of packets are not acknowledged within a certain period of time. Consequently, even if some packets are dropped during the switchover, the glitch is short for redundant node 104 having the redundancy platform 900. That is, standby card 950 can resume operation for the active card 910 without sessions being torn down or services failing for redundant node 104.

FIG. 6A illustrates a diagram 600 to show spoofing of a peer node from observing a failure and a switchover according to one embodiment. Because there is a realtime aspect to routing protocols, a peer node 102A to redundant node 104 requires that a transaction being committed by active card 910 be also committed by standby card 950. For example, if active card 910 commits to routing update, the routing update must also be made in standby card 950. If the transaction that is committed by active card 910 is not committed by standby card 950 and a switchover occurs, peer node 102A will tear down its session with redundant node 104 because standby card 950 will not have a consistent view of the network as peer node 102A. Specifically, standby card 950 did not commit to the update.

Therefore, to prevent peer node 102A from tearing down the session with redundant node 104, the switchover to standby card 950 must done quickly and committed transactions by the active card 910 must be committed by standby card 950. Redundant node 104 having a redundancy platform 900 can perform such a fast switchover and commit to transactions in the standby card 950 in preventing a peer node 102A from tearing down protocol sessions.

Referring to FIG. 6, the diagram illustrates an active card 910 receiving a message (MSG A) from a peer node. The message can be, for example, to inform redundant node 104 that node 102B has failed and that its route to 102B must be updated accordingly. Node 102A needs to hear a confirmation that node 104 received the update and is making the necessary changes (i.e., committing to the message). If node 104 does not commit to the message, redundant node 104 will have an inconsistent view of the network than peer node 102A. Thus, if peer node 102A believes that redundant node 104 has an inconsistent view of the network, redundant node 102A will tear down its session with redundant node 104 causing a service outage.

Now, if active card 910 is processing the message and it fails at failure points 1 or 2 (redundant node 104 did not commit to the message at these points) and a switchover occurs to standby card 950, peer node 102A will not tear down its session with node 104 because it can resend the message again (up to a certain number of retries) and standby card 950 will receive the resent message and respond accordingly by committing to the route update that peer node 102B failed. As long as the switchover occurs quickly and standby card 950 resumes operation before the maximum number of retries, standby card 950 can resume operation for redundant node 104 in which the failure and switchover is not observed by peer node 102A.

However, if a failure occurs at the point of commitment by active card 910, standby card 950 must also commit to the message. That is, if active card 910 committed to the message and standby card 950 did not commit to the message, redundancy is broken and there will be inconsistency of information in the active card 910 and standby card 950 that can cause a service failure. For instance, the committed transaction was related to a route update and if standby card 950 does commit to that update, it will have an inconsistent view of the network than peer node 102A. Thus, standby card 950 must commit to message committed by active card 910.

In the example of FIG. 6A, to ensure message committed by active card 910 are committed by standby card 950, active card 910 will not commit to a message unless standby card 950 has committed to the message. As shown in FIG. 6A, after receiving MSG A, active card 910 sends MSG A to standby card 950. Standby card 950 sends an acknowledgement of MSG A to active card 910 (e.g., "received MSG A and committed to MSG A"). After active card 910 receives the acknowledgement from standby card 950, active card 910 will commit to the message and send the commitment ("acknowledgement that MSG A has been committed") to the remote peer. Active card 910 will then send MSG A through the upper layers.

FIG. 6B illustrates a diagram 650 to show spoofing of a peer node from observing a failure and a switchover according to another embodiment. In the example of FIG. 6B, active card 910 can send MSG A straight through to the upper layers, but will not commit to the MSG A until an acknowledgement has been received that standby card 950 has committed to MSG A. At that point, active card 910 will send a "commitment" to the remote peer. As shown in FIG. 6B, MSG A will pass more quickly through the upper layers of active card 910 than MSG A in FIG. 6A.

The redundancy platform 900 provides the support to update standby card 950 with information related to committed transactions in active card 910. As will be explained below, committed messages or transactions can require small updates or huge updates. For individual transactions, a small or "delta" update is required to the standby card 950. To replay a long history of transactions, a large or "bulk" update is required for standby card 950. Thus, all the transactions committed by active card 910 can be maintained in standby card 950.

FIG. 7 illustrates a flow chart of an operation 700 for sending a commit to a peer node according to one embodiment. Referring to FIG. 7, at operation 702, a message is received from a peer node. For example, active card 910 can receive a message from a peer node 102A that a status of a route has changed and an update needs to be made.

At operation 704, the information related to the message is sent to standby card 950. At operation 706, standby card 950 processes the message and commits to the message by changing the status of the route. By committing to the message, standby card 950 sends an acknowledgment to active card 910. Active card 910 thus receives the acknowledgement from standby card 950.

At operation 708, after receiving the acknowledgement from standby card 950, active card 910 commits to the message. At this point, standby card 910 will also change the status of the route.

At operation 710, after committing to the message, active card 910 can send a "commit" to the peer node informing the peer node that the update the route has been made thus maintaining a consistent view of the network not only in active card 910 but in standby card 950 as well.

Router Redundancy

Router Redundancy Hardware

Figure 8:
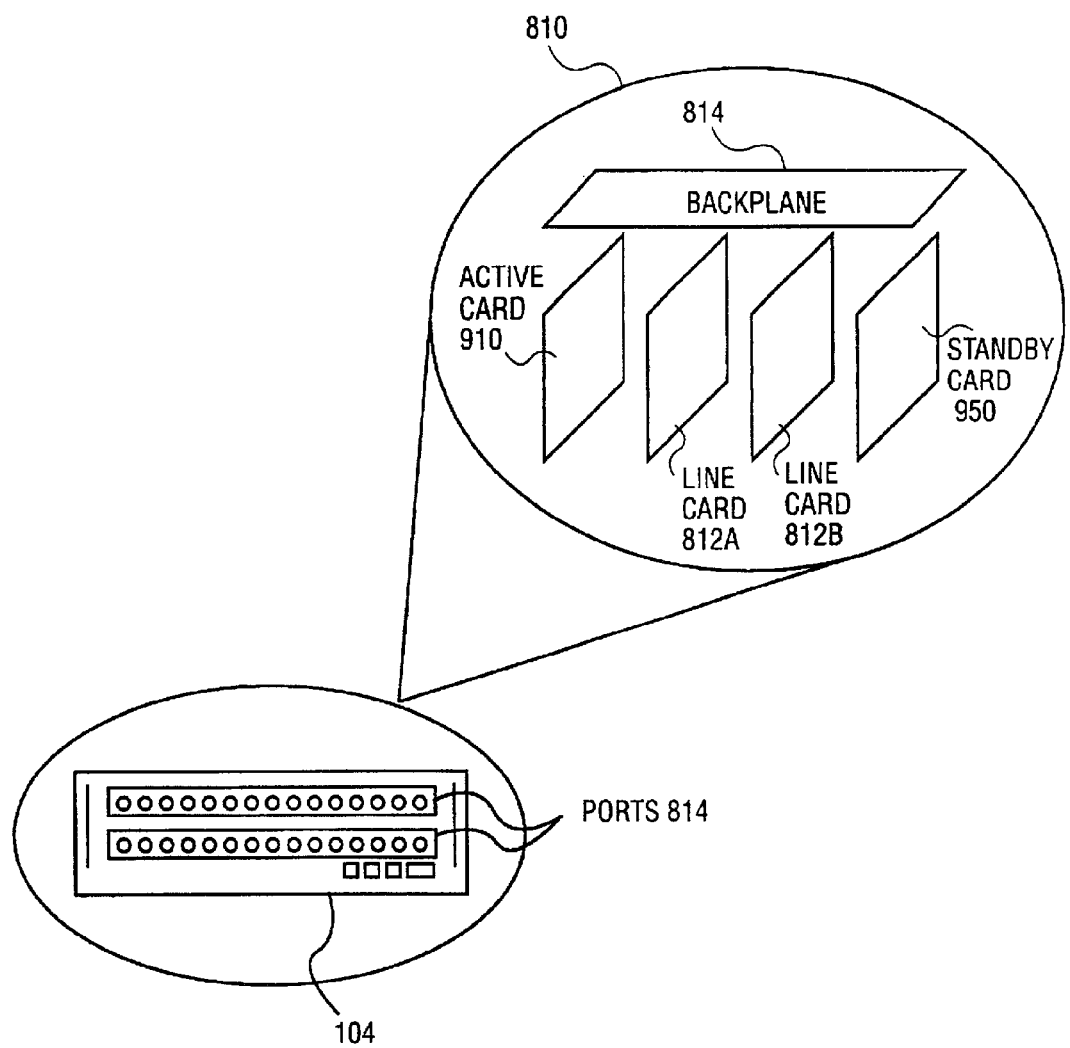
FIG. 8 illustrates a network device having an active controller system and a standby controller system according to one embodiment.

FIG. 8 illustrates a network device 104 having an active controller system and a redundant standby controller system according to one embodiment. Referring to FIG. 8, network device 104 includes a plurality of ports 814. Ports 814 can support electrical signals or optical signals at varying data transfer rates. A blown-up view 810 illustrates basic internal components of the network device 104, which includes a line card 812A, active card 910, standby card 950, line card 812, and a backplane 814 coupling the cards to each other. Other types of components can also be included such as a system controller card. For one embodiment, network device 104 is a network router to provide IP layer 3 services. In other embodiments, network device 104 can provide upper layer level services up to application layer services. Network device 104 can also provide Multiprotocol Label Switching (MPLS) services.

For router 104 to be redundant, active card 910 and standby card 950 have identical hardware and software components or modules. The active card 910 and standby card 950 can include a high speed network processor, standard memory controller to control memory devices such as static random access memory (SRAM) devices, dynamic random access memory (DRAM) devices, or other like memory devices. Such memory devices can be used to store protocol information, global information, or configuration information about the card. The memory devices can also store instructions, software modules, and operating systems to control the cards.

For one embodiment, the backplane 814 is passive and allows for communication between the line card 812A, active card 910, standby card 950, and line card 812B. In other embodiments, the backplane 814 can support >2 line card redundancy such that active card 910 and standby card 950 can control more than one line card. Active card 910 includes hardware and/or software to detect failures in active card 910 or line card 812A and to transfer operation to the standby card 950. Standby card 950 also includes hardware and/or software to resume operation for active card 910 if it fails.

As will be explained in further detail regarding the redundancy platform 900, active card 910 and standby card 950 include data forwarding and retrieving subsystems to maintain consistent information in the standby card 950. The active card 910 can communicate with the standby card 950 over a communication link via the backplane 814. For example, the communication link can be a peripheral control interface (PCI) link or an Ethernet link.

Router 104 can provide the following types of hardware or router redundancy: (a) card set redundancy, (b) system card redundancy, (c) port redundancy, or (d) line card redundancy. Card set redundancy refers to standby card 950 and line card 812B acting as a redundant pair to active card 910 and line card 812A. For one embodiment, line card 812A and active card 910 can be inserted into slots 0 and I and standby card 950 and line card 812B can be inserted in slots 2 and 3 for router 104. Thus, a failure to line card 812A or active card 910 will cause a switchover to line card 812B and standby card 950.

System card redundancy refers to standby card 950 acting as a redundant system card to active card 910. For one embodiment, system card redundancy is the default configuration for router 104 and is independent of port redundancy and can be enabled with or without port redundancy. Port redundancy refers to having redundant ports 814. For example, a "Y" type cable redundancy can be implemented for ports 814. For one embodiment, port redundancy is only applied to individual line cards. Line card redundancy refers to having a redundant line card for an active line card. For example, line cards 812A can have a redundant line card and line card 812B can also have a redundant line card.

Card States

The active card 910 and standby card 950 must be aware of two important states, which are an "active state" and a "standby state." Depending on which state a card is operating in, each card will perform different types of operations. For example, a card operating in the active state will update configuration, state, and learned information to a standby card operating in a standby state. The card operating in the standby state will receive information from the active card and update its storage subsystems accordingly. As will be explained in more detail below, there are two kinds of updates to the standby card 950: A large ("bulk") update and a small or incremental ("delta") update.

The active card 910 is considered to be in an "active state" if all of its diagnostics and self tests are capable of receiving and sending data traffic from and to peer nodes and has mastership. An active card is thus accessible for managing and provisioning purposes. For one embodiment, a determination if a card is active can be made by a global flag. furthermore, a user can determine which card is active based on a light emitting diode (LED) indicator (e.g., a green indicator) on router 104. The standby card 950 is considered to be in a "standby state" if all of its diagnostics and self tests pass and is capable of becoming an active card and does not have mastership. For one embodiment, a standby card is accessible for managing, but not for provisioning purposes. In one embodiment, a determination if a card is in standby can also be made by a global flag and a user can determine which card is standby based on an LED indicator (e.g., a yellow indicator) on router 104.

If active card 910 or standby card 950 cannot be operational, the card enters a "failed state." The failed state can also be determined by a LED indicator (e.g., a red indicator). A card is defined as "redundant" if configuration of the active state is mirrored in a redundant card. Communication between the active card and standby card should be existing at all times to maintain redundancy. In particular, the redundant card 950 should be capable of becoming active if the active card 910 fails.

Redundancy Platform

Basic Requirements

FIG. 9 illustrates one embodiment of a redundancy platform 900 for node 104. For node 104 to prevent peer nodes from observing a failure occurring in the node, the redundancy platform 900 is required to (a) maintain connections for node 104 with peer nodes (i.e., sessions with peer nodes 102A and 102B) from being dropped and to (b) maintain consistent information in the active card 910 and standby card 950. As such, if the standby card 950 resumes operation for a failed active card 910, the standby card 950 operates just as if it were the active card 910.

Exemplary Architecture

Referring to FIG. 9, the redundancy platform 900 shows an exemplary platform architecture having a combination of hardware and software components or modules. The redundancy platform includes an active card 910 and a standby card 950 having redundant memory subsystems and software modules. For example, the memory subsystems include a random access memory (RAM) to store data structures and non-persistent data and a flash disk to store persistent data. Furthermore, the software modules include software redundancy managers, application tasks, redundancy control managers, and datastores.

Active card 910 includes a software redundancy manager (SRM) 918 communicating with an application task 916. Application task 916 can send information changes to RAM data structures 912 and non-persistent data 914. Non-persistent data 914 stores information that changes after an update such as routing information and states. Application task 916 can send updates to datastore 922 in which changes to RAM data structures 912 and non-persistent data 914 can be permanently and redundantly stored in flash disk 924. A redundancy control manager (RCM) 920 can communicate with application task 920 and datastore 922. RCM 920 sends update information to its peer RCM 960 in standby card 950. Standby card 950 includes a peer application task 956, which is to mirror the operation of application task 916. Peer application task 956 can communicate with SRM 958 and send changes to RAM data structures 952 and non persistent data 954 that were made in active card 910. RCM 960 can also send changes to data store 962 to update flash disk 964 in order to maintain consistency with flash disk 924.

The RAM data structures 912 can store states of routing protocol sessions for active card 910 with peer nodes. The RAM data structures 952 in standby card 950 is to maintain consistent information with RAM data structures 912 in active card 912. Non-persistent data 914 represents information stored in the RAM. In particular, non-persistent data can be packets temporarily stored in a buffer. FIB information can include non-persistent data, which is being updated at regular or irregular intervals. Persistent data is data that is stored permanently in a flash disk using the datastore. For example, persistent data can be routing protocol configuration data, which does not change frequently.

The SRM 918 in the active card 910 is responsible for detecting software failures, notifying its peer SRM 958 of any failures, and switching over operation to standby card 950. Specifically, the SRM 916 in the active card 910 determines if active card 910 is degrading or failing. If SRM 916 detects such a degradation or failure in active card 910, SRM 916 facilitates a switchover to standby card 950 and can coordinate with other tasks running on the standby card 950.

For node 104 to operate properly, the other modules must be in a "ready" state. In particular, the RCM 960, peer application task 956, and data store 962 must be in a "ready" state. A ready state is the state at which a seamless switchover can take place. This is when information in RAM data structures 912, persistent data 914, flash disk 924 in active card 910 are consistent with the same in RAM data structures 952, persistent data 954, and flash disk 964 in standby card 950.

The RCM 920 in the active card 910 communicates with the RCM 960 in the standby card 950 to "mirror" information in the active card 912 with the standby card 950 at every instant of time and to synchronize processes of the active card 910 with the standby card 950. RCM 920 is responsible for the selective movement of data to standby card 950. In particular, RCM 920 is responsible for the small individual transaction updating, which is referred to as "delta" updating, and for large transaction updating, which is referred to as "bulk" updating.

Intercard Communication

A physical layer supports the intercard communication between active card 910 and standby card 950. For example, an Ethernet link can be used to support communication between active card 910 and standby card 950. The RCM 920 in active card 910 can communicate with RCM 960 in standby card 950 using such a link.

RCM 920 and 960 are software modules that run on top of the intercard communications. The redundancy control managers (RCMs) determine role and mastership for its respective card. The RCMs can also communicate with hardware logic to determine role and mastership. The RCMs support the transfer of updating the standby card 950 with consistent information in the active cad 910. For example, the RCMs control large "bulk" updates and small incremental "delta" updates between active card 910 and standby card 950. Bulk updates are usually performed if a new redundancy card has been inserted. Delta updates are considered standby updates and are performed as individual changes are being made in the active card 910. For one embodiment, RCM 960 in standby card 950 can operate a few transactions behind to facilitate a more efficient updating process.

The underlying platform 900 supports the intercard communication so replication of information between active card 910 and standby card 950, i.e., bulk updating and delta updating, can take place. The intercard communication can facilitate acknowledgement of messages between active card 910 and standby card 950 and to maintain consistency of information in active card 910 and standby card 950.

Mastership

A mastership determination occurs if there is redundant system (i.e., an inserted standby card for node or router 104). In a single card configuration, e.g., having just an active card 910, the active card 910 obtains automatically mastership for router 104. For one embodiment, active card 910 determines automatically if a standby card 950 is present in router 104. If no redundant card is present, active card 910 takes mastership. However, if the active card 910 determines that there is a redundant card, a determination is made to decide mastership between active card 910 and standby card 950. This determination can be made in software and/or hardware. For example, arbitration logic or mastership logic can reside in both active card 910 and standby card 950 using any number of techniques to determine mastership. For example, arbitration logic can determine mastership based on the slot ID of the cards. For instance, the card inserted in slot ID 1 can be determined to be the "active card" and the card inserted in slot ID 2 can be determined to be the "redundant card." Alternatively, arbitration logic can check a ID number on the card to see if it matches with an ID number of the router. If it matches, that card will become the "active card." As is evident, various number of techniques can be used to determine mastership.

Boot Sequence

In a single controller card configuration, mastership belongs to the controller card. However, in a redundant system, at boot-up a determination is made to determine which card is to be "active." FIG. 10A illustrates a flow chart of an operation 1000 for a boot sequence according to one embodiment.

Figure 10A:
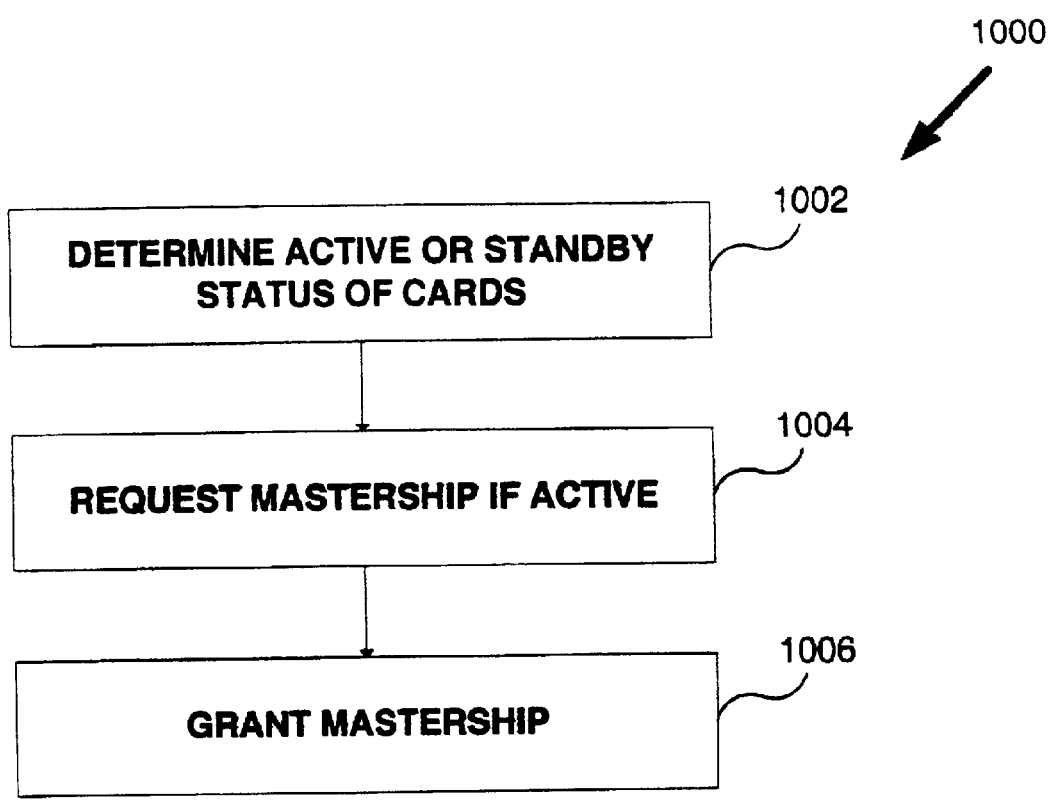
FIG. 10A illustrates a flow chart of an operation for a boot sequence according to one embodiment.

Referring to FIG. 10A, at operation 1002, a determination is made to see which of the card in the redundant system are to operate as active or standby. For one implementation, if one of the cards was active before the boot sequence, it is given mastership and becomes active. For another implementation, the slot IDs are used to determine which card is active or standby.

At operation 1004, the card determined to be active requests mastership. The same processes can take place in the other card, i.e., both cards can run at the same time and each card can run a process to obtain mastership. Any number of mastership or election algorithms or techniques can be used (e.g., a random number technique) to break a tiebreaker in the situation where both cards were active before and are ready to be active.

At operation 1004, the arbitration logic grants mastership to one of the cards 910 or 950. For purposes of explanation, arbitration logic on active card 910 grants mastership to active card 910 and arbitration logic on standby card 950 gives it a standby status.

Figure 10B:
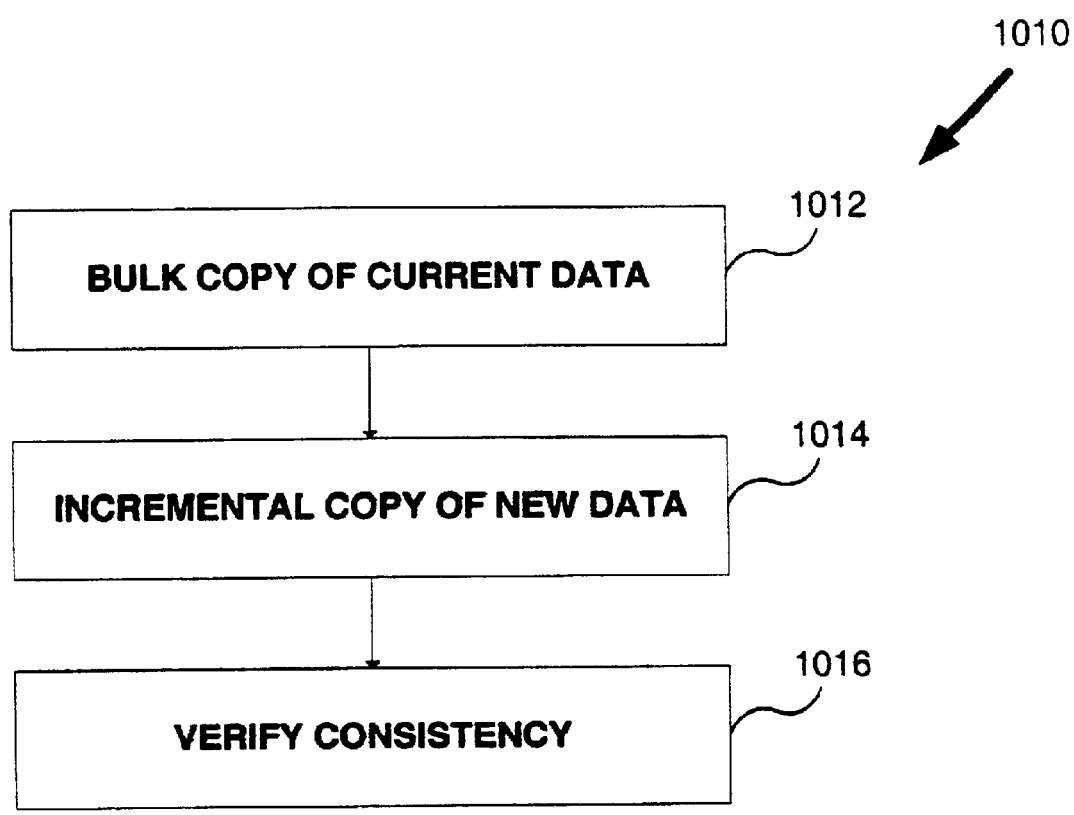
FIG. 10B illustrates a flow chart of an operation for a boot sequence according to another embodiment.

Assuming active card 910 operates as active and standby card 950 operates as standby, standby card 950 needs to be updated to mirror active card 910 during the bootup sequence. That is, active card 910 boots up and SRM 918 reads configuration and state information in active card 910, which starts running accordingly in the active state. The SRM 958 in standby card 950 will also read configuration and state information and will run in a standby state and inform SRM 918 that it is ready and in a standby state. FIG. 10B illustrates a flow chart of an operation 1010 for a boot sequence according to another embodiment.

Referring to FIG. 10B, at operation 1012, active card 910 performs a bulk copy of all of its content stored in RAM data structures 912, flash disk 924, and non-persistent data 914 to its peer in standby card 950 using application task 916, SRM 918, and RCM 920. For example, routing protocol applications running on active card 910 will commence copying of all pertinent information in RAM data structures 912 to is peer 952 in standby card 950. For one embodiment, only essential data has to be copied such as state data, connection data, private routes database, etc. Furthermore, non-essential data such as counter information do not have to be copied.

At operation 1014, active card 910 performs an incremental copy of any new information or data generated from new routing messages arriving from peer nodes. The new information must be copied over to standby card 950 regardless if the bulk copy operation has completed. For one implementation, a mark and sweep technique can be used to determine which information has been newly generated. For another implementation, concurrent incremental and bulk copying is not allowed. In such a case, redundancy platform 900 can include any number of queues for performing incremental updating after a bulk copy operation. In order to guarantee a valid and consistent routing protocol information, data store 922 performs a redundancy copy of flash disk 924 to data store 962 and flash disk 964 in standby card 950 before any changes can be made to flash disk 924.

At operation 1016, both the active card 910 and standby card 950 implement a consistency verification. For instance, each router protocol needs to implement a verification that consistent information has been copied or replicated from active card 910 to standby card 950. Once consistency is verified, the routing protocols can declare itself redundant in the standby card 950 and if the routing protocols declare themselves as redundant, router 104 is declared redundant.

Graceful Switchover

A graceful switchover refers to a switchover that is initiated by a user or software in a controlled manner. For example, a user can initiate a command at a command line to switch operation from active card 910 to standby card 950 for node 104. In a graceful switchover, SRM 918 is aware of a mastership change to standby card 950. Hence, SRM 918 prepares for the switchover in a more controlled manner and active card 910 can relinquish smoothly control of router 104 to standby card 950. The SRM 918 maintains a bit map of all the critical functions that are necessary for active card 910 to function in an "active state." Tasks via application task 916 send their states to SRM 918 in the standby card 950 for a seamless and fast switchover.

Figure 11A:
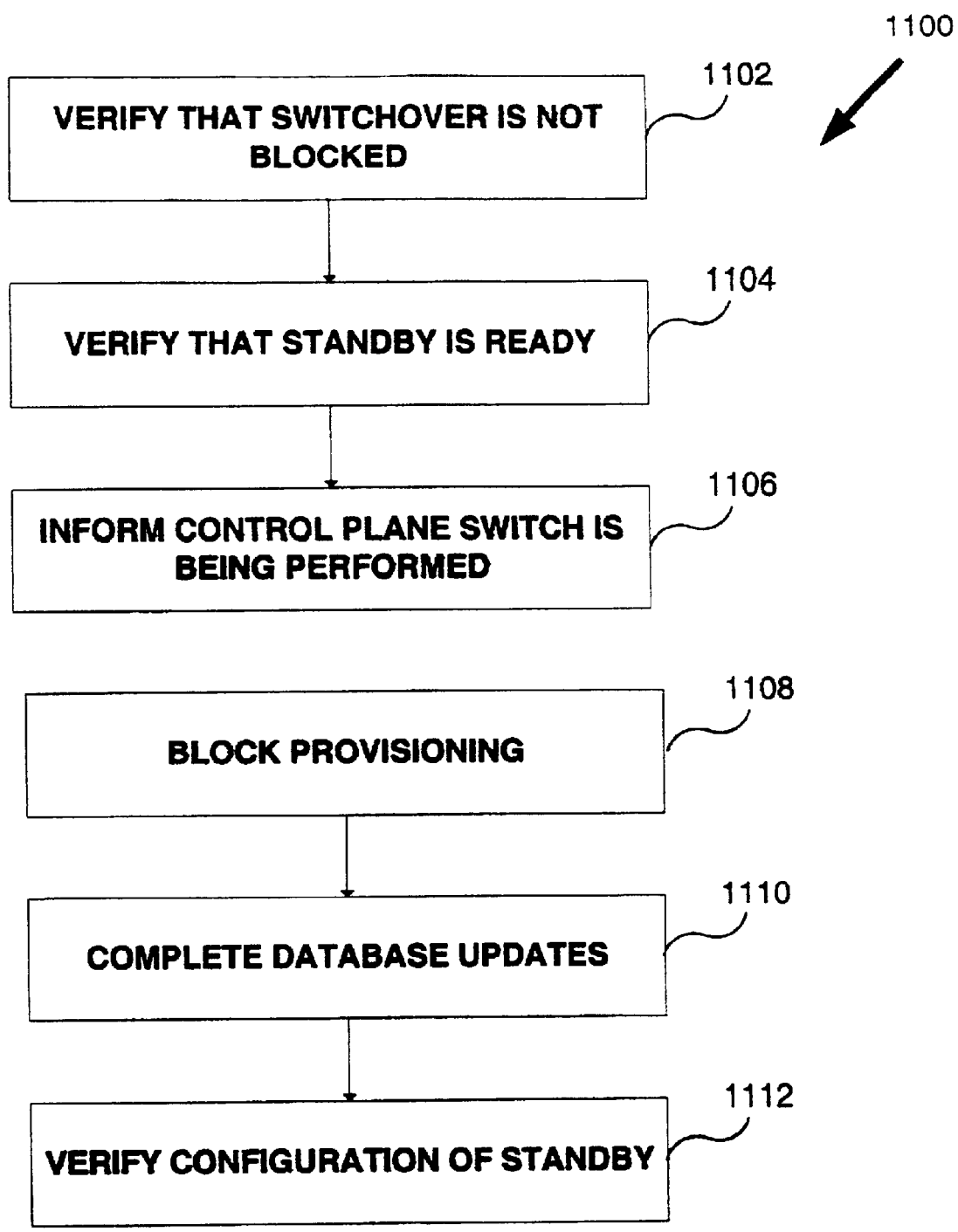
FIGS. 11A and 11B illustrate a flow chart of an operation for an active card to perform a graceful switchover to a standby card according to one embodiment.
Figure 11B:
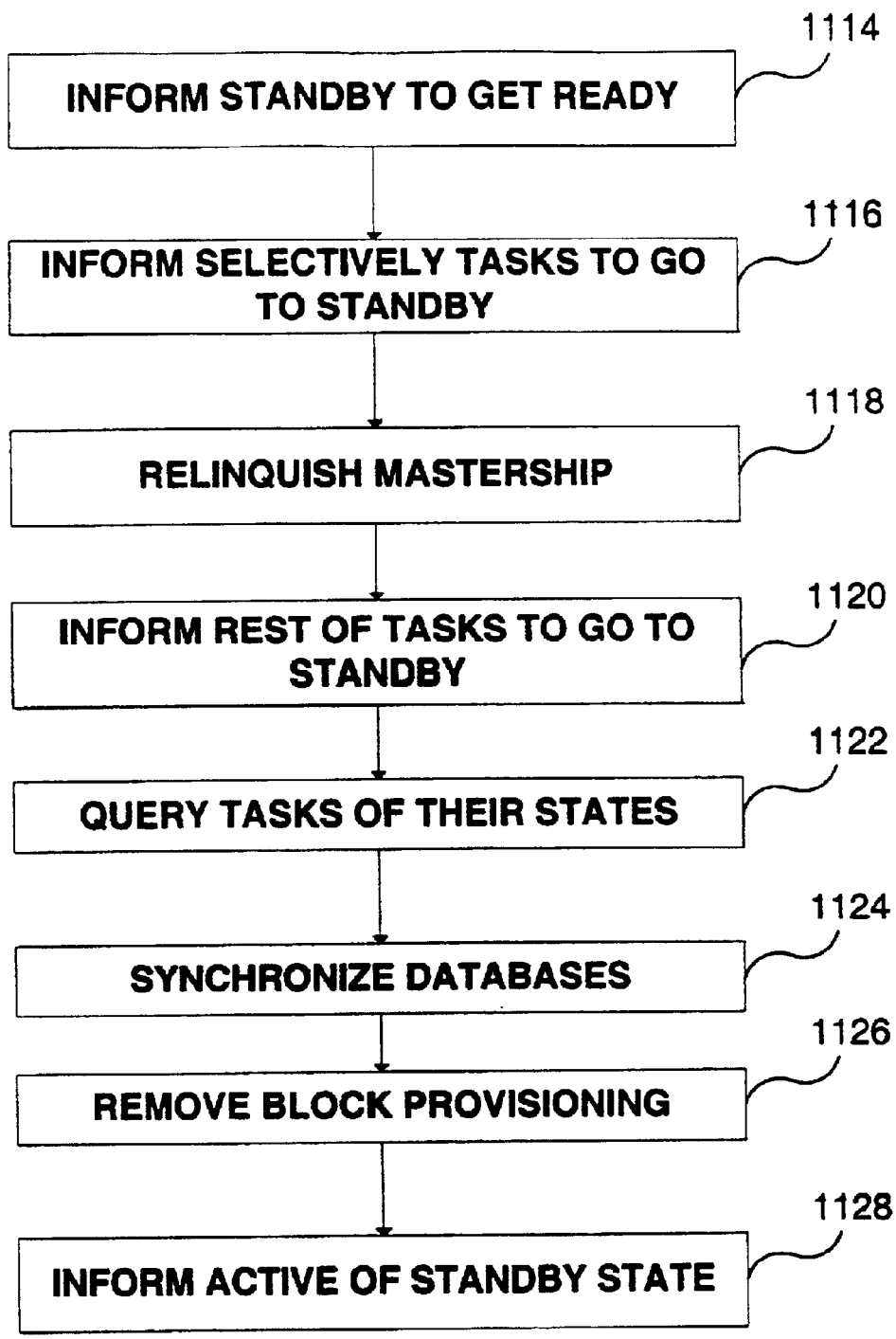

FIGS. 11A and 11B illustrate a flow chart of an operation 1100 for an active card 910 to perform a graceful switchover to a standby card 950 according to one embodiment. In the following operation, SRM 918 and RCM 920 of active card 910 can be used to facilitate the fast and smooth switchover.

Referring to FIGS. 11A and 11B, at operation 1102, active card 910 verifies that a switchover is not blocked by checking if standby card 950 is inserted in router 104 or checking to see if standby card 950 is not offline. The standby card 950 can be put in "offline" mode for upgrade purposes or for other reasons, which in effect removes the functionality of redundancy. The intercard communication mechanism can be used to verify if standby card 950 is online or offline. For example, SRM 918 can request the state of the standby card 950. The states can be related to a card state, card type, hardware, software, and database checksums. Thus, if the returned state is "offline," active card 910 will reject a switchover.

At operation 1104, active card 910 verifies that standby card 950 is not offline.

At operation 1106, SRM 918 informs the control plane or applications layer of router 104 that a switch is being performed.

At operation 1108, active card 910 blocks all new updates to flash disk 924. For instance, SRM 918 and datastore 922 can block all updates to RAM data structures 912, non-persistent data 914, and flash disk 924. For one embodiment, SRM 918 can send a message to application task 916 that all tasks are prevented from making an update such as, for example, a change in a routing table within flash disk 924. The block will also block all new updates to standby card 950, which is mandatory for a switchover. For another embodiment, application task 916 can determine whether certain data changes to RAM data structures 912 and non-persistent data 914 should not be blocked that will not be fatal for a switchover.

At operation 1110, SRM 918 and RCM 920 replicate information in RAM data structures 912, persistent data 914, and flash disk 924 to its peer in standby card 950 to complete database updates.

At operation 1112, SRM 918 verifies the configuration information on standby card 950 is identical to active card 910. For example, the SRM 958 can exchange checksums in database information in standby card 950 with active card 910. For one embodiment, if the checksums to not match, SRM 958 will replicate databases in active card 918 again and perform the verification process again. If the checksums do not match the second time, switchover will not take place.

At operation 1114, SRM 918 informs standby card 950 to be ready to become active after replication is completed. Active card 910 informs standby card 950 to get ready to become "active." For one implementation, active card 910 sends a message to standby card 950 to prepare to become active. Active card 910 can thus wait for an acknowledgment (i.e., "ready" or "not ready"). If standby card 950 responds with "not ready," the switchover is aborted.

At operation 1116, SRM 918 informs selectively application task 916 that certain tasks that are running are to go to standby. For example, SRM 918 will send a message to a select group of tasks and acknowledgment is necessary for this message. The message is to inform the tasks that the active card 910 is being brought down to a standby state.

At operation 1118, active card 910 relinquishes its mastership of router 104. For example, SRM 918 can call an I/O driver to de-assert a "master" state to relinquish mastership. The hardware of active card 910 then gives immediate control or mastership to standby card 950. As such, this action will forward all data coming to router 104 to standby card 950.

At operation 1120, SRM 918 informs application task 916 that the rest of the tasks to go to standby. That is, the functions of some tasks change as the card states change. Such a change can be propagated to all the tasks.

At operation 1122, SRM 918 queries the tasks of their states and waits until the tasks turn to standby. This operation is mainly required for tasks which are in the active state could be performing functions that only an active card 910 should be capable of doing, e.g., responding to the management station or transmitting data on the uplink/access ports, responding to line alarms, etc. By this query/handshake, all critical tasks are guaranteed to go to standby.

At operation 1124, active card 910 establishes communication with the active (standby card 950) for synchronization of databases for both persistence and non-persistence information. Once the databases are synchronized, the state of active card 910 ready for standby state.

At operation 1126, SRM 918 removes the block made to application task 916 and data store 922.

At operation 1128, active card 910 is set to standby state.

The above operation relates to events for active card 910. The events for standby card 950 are described with respect to FIGS. 12A and 12B below.

Figure 12A:
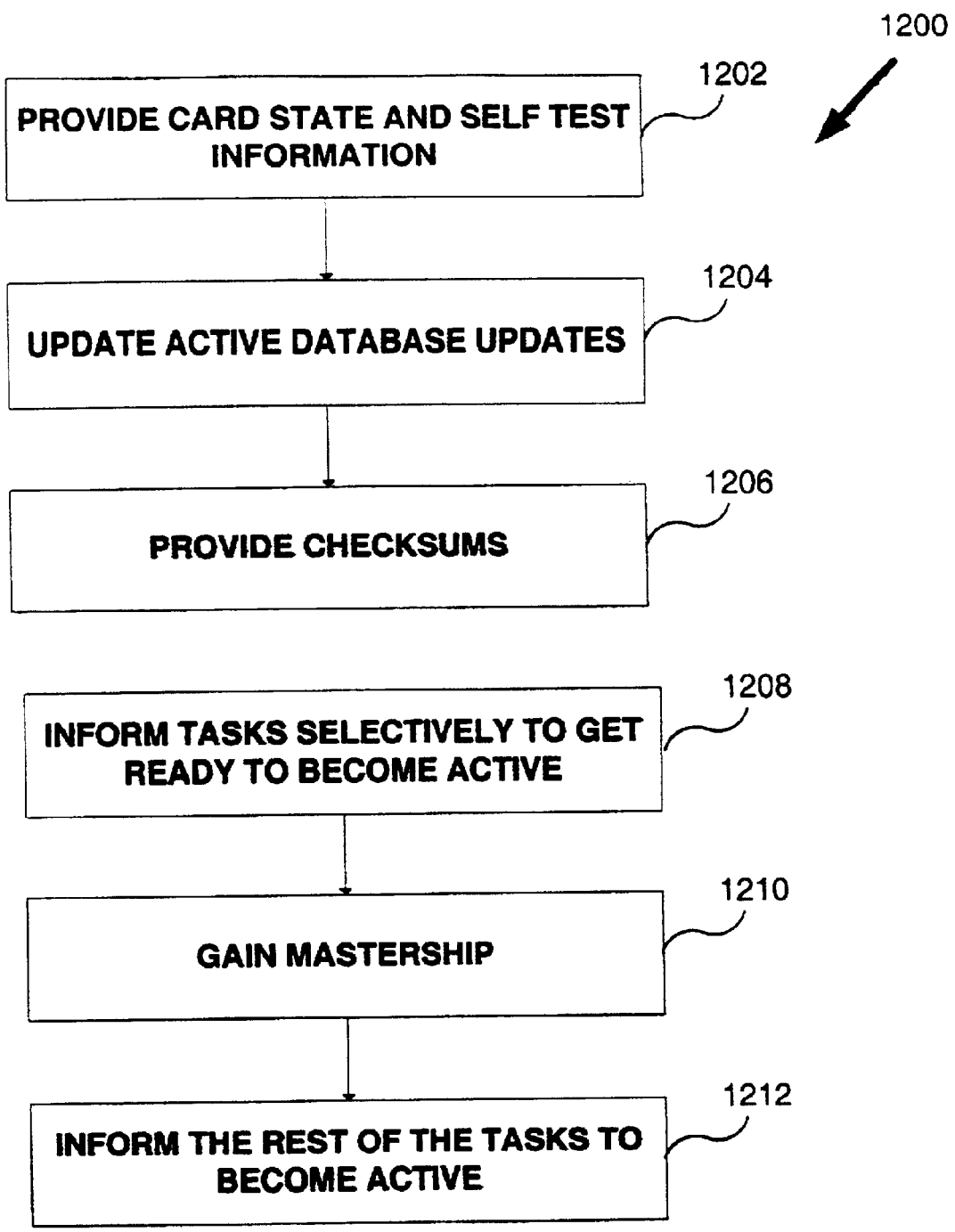
FIGS. 12A and 12B illustrate a flow chart of an operation for a standby card to perform the graceful switchover according to one embodiment.
Figure 12B:
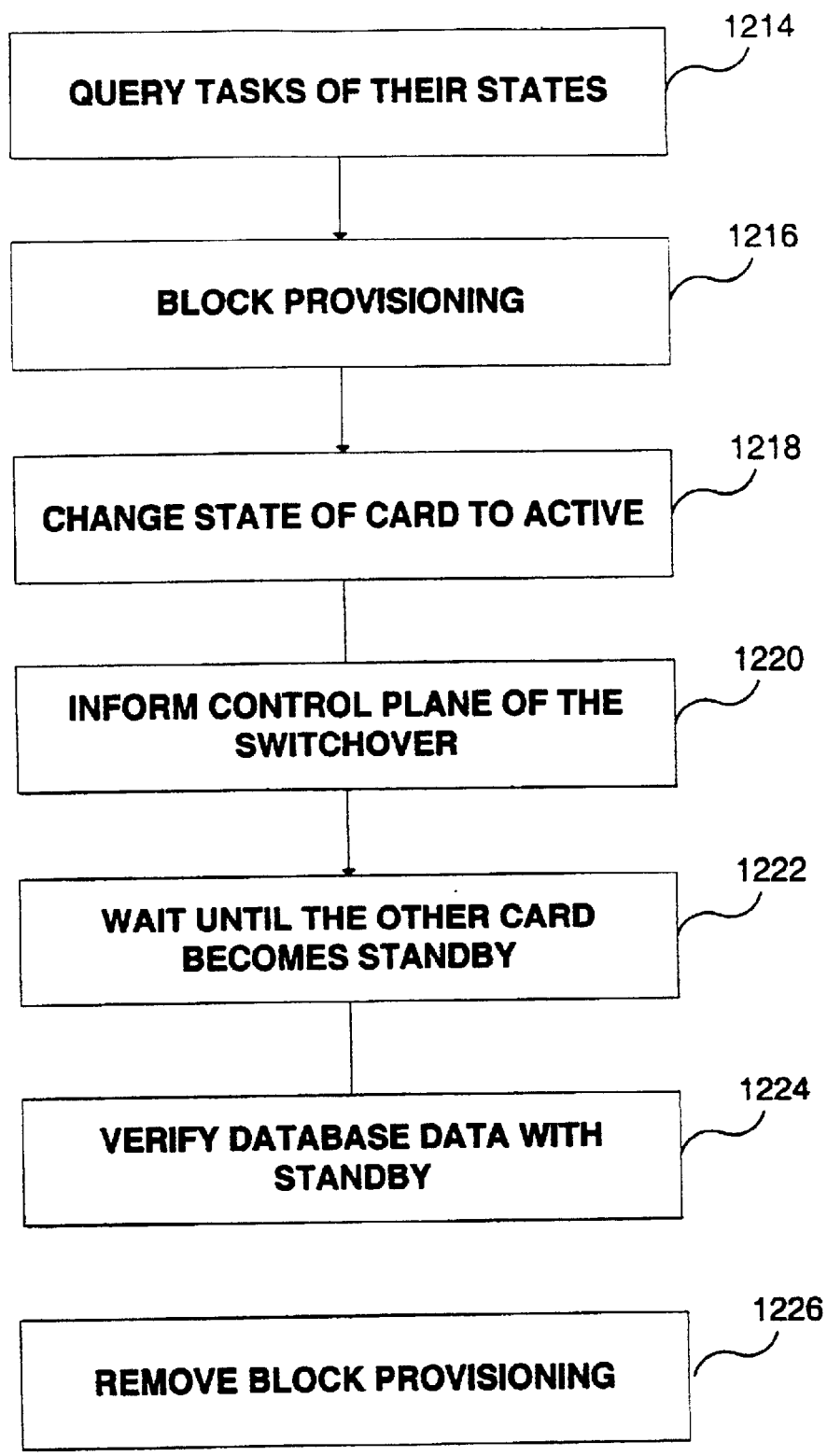

FIGS. 12A and 12B illustrate a flow chart of an operation 1200 for a standby card 950 to perform the graceful switchover according to one embodiment. In the following operation, SRM 958 and RCM 960 of standby card 950 can be used to facilitate a fast and smooth switchover. Referring to FIGS. 12A and 12B, at operation 1202, SRM 958 provides card state information and self test information to active card 910 via SRM 918.

At operation 1204, RCM 960 updates peer databases in standby card 950 from active card 910.

At operation 1206, SRM 958 provides database checksums to active card 910 via SRM 918.

At operation 1208, SRM 958 informs peer application task 956 that certain tasks are to become ready for active status.

At operation 1210, standby card 950 gains mastership for router 104 the moment active card 910 relinquishes mastership.

At operation 1212, SRM 958 informs peer application task 956 the rest of the tasks are to have an active status. SRM 958 also updates state information in standby card 950 that it has mastership.

At operation 1214, peer application task 956 queries the tasks of their state and waits until they are in an active state. For one implementation, some tasks may restart as active if necessary.

At operation 1216, SRM 958 blocks new network updates to RAM data structures 952, non-persistent data 954, and flash disk 964 on the standby card 950.

At operation 1218, standby card 950 changes its state to active.

At operation 1220, SRM 958 informs the control plane or applications layer running on standby card 950 of the switchover.

At operation 1222, SRM 958 waits until the other card (active card 910) is in a standby state.

At operation 1224, SRM 958 and/or RCM 960 verifies that the data in the databases of standby card 950 are consistent with the databases of active card 910.

At operation 1226, SRM 958 removes the block provision to the databases in standby card 950.

Non-Graceful Switchover

A non-graceful switchover refers to a switchover that is initiated by a failure in the active card 910 without a warning. For example, an active card 910 can fail for any number of hardware and software reasons as will be explained in more detail below. The non-graceful switchover is very similar to the graceful switchover except that there is no preparation for the switchover. That is, the switchover could happen at any moment in time for a redundant system and database updates could be pending or databases could be, e.g., in the middle of a routing table or FIB update. Moreover, some information can be lost. For one embodiment, a recovery mechanism can be implemented to recover lost information.

Figure 13:
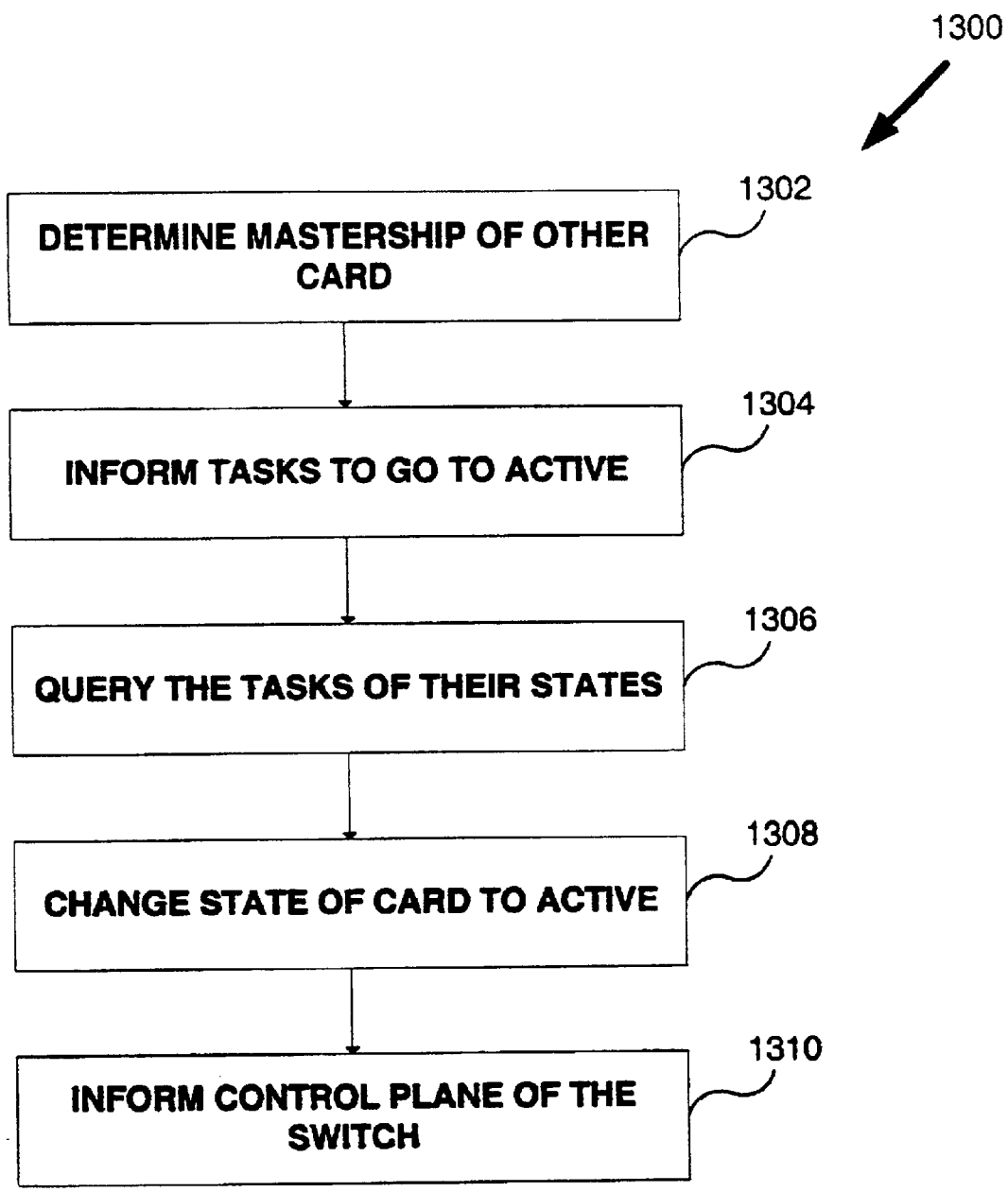
FIG. 13 illustrates a flow chart of an operation for a standby card to perform a non-graceful switchover according to one embodiment.

FIG. 13 illustrates a flow chart of an operation 1300 for a standby card 950 to perform a non-graceful switchover according to one embodiment. The following operation 1300 is related to standby card 950. For one embodiment, active card 910 performs the operation 1100 in FIG. 11 for the non-graceful switchover.

Referring to FIG. 13, at operation 1302, SRM 958 determines that the other card (active card 910) does not own mastership for router 104.

At operation 1304, SRM 958 informs peer application task 956 that all tasks are to go "active" and the state of the standby card 910 is to be updated as "active."

At operation 1306, SRM 958 queries the tasks of their states and waits until they turn "active."

At operation 1308, the state of the active card 910 is changed to "non-active" or "standby."

At operation 1310, standby card 950 informs the control plane or applications layer that standby card 950 owns mastership for router 104 and a switchover has occurred.

Standby Card Redundancy Synchronization

There are two major components that need to be synchronized for redundancy to work with active card 910 and standby card 950. First, there must be synchronization of "persistent information," which is stored in flash disk 924. Persistent information can include, for example, configuration information and associated files related updates, logs, stats, and etc. Second, there must be synchronization of "non-persistent information," which are stored in RAM (e.g., Ram Data Structures 912 and non-persistent data 914). Non-persistent information includes, for example, routing tables, session connections, etc. Ever task running on router 104 has redundancy as part of its design. That is, every task focuses on "persistent information duplication" and "non-persistent information duplication." The datastore software modules in the active card 910 and standby card 950 assist in the persistent and non-persistent duplication or updating.

Persistent Updating

Figure 14:
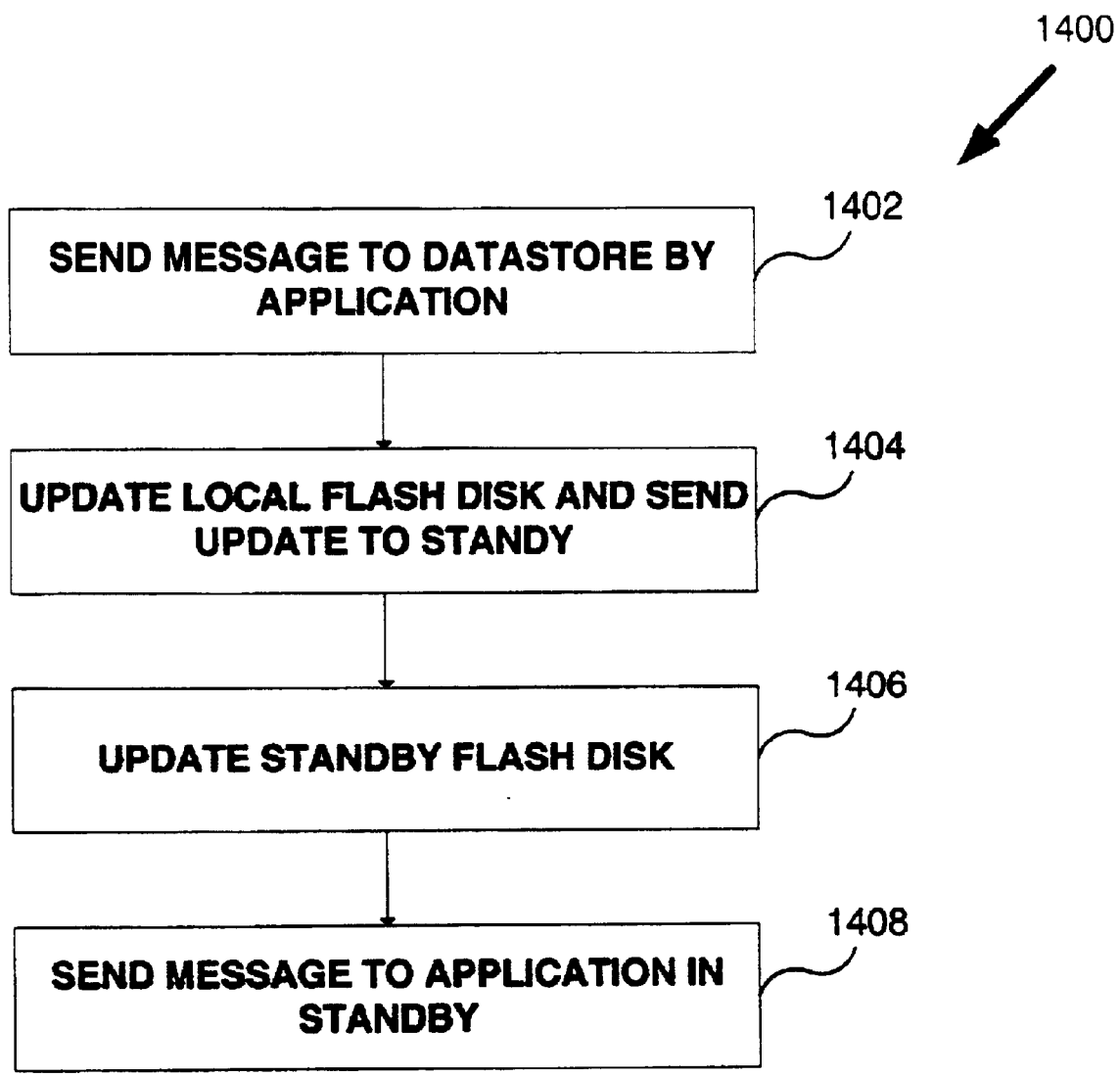
FIG. 14 illustrates a flow chart of an operation to update persistent information to a standby card according to one embodiment.

FIG. 14 illustrates a flow chart of an operation 1400 to update persistent information to a standby card 950. The operation 1400 relates to any task that invokes the datastore 922 on active card 910 to save configuration information on flash disk 924. The datastore 922, after updating the local flash disk 924, sends a message across to its peer datastore 962 in standby card 950 for copying of the same information on flash disk 964. Furthermore, the message to data store 962 can be sent to peer application task 956 to update RAM data structures 952 and non-persistent data 954 with the new configuration information. For one embodiment, there can be negative or positive acknowledgments for all the transactions.

Referring to FIG. 14, at operation 1402, application task 916 sends a message to data store 922 to save configuration information being made in flash disk 924. For example, the message can contain a record identification for updating. Alternatively, there can be multiple record updates for a single transaction.

At operation 1404, datastore 924 updates flash disk 924 with the configuration information. After updating the local flash disk 924, datastore 924 sends an acknowledgement to application task 916 that flash disk 924 has been updated. Datastore 924 then sends the same message to its peer datastore 962 in standby card 950 via RCM 920 and 960.

At operation 1406, datastore 962 in standby card 950 updates flash disk 964 with the same update to flash disk 924 in active card 910. Datastore 962 sends the same set of messages to peer application task 956 that was sent to application task 916 by datastore 922 in active card 910.

At operation 1408, peer application task 956 interprets the messages and updates is RAM data structures 952 and non-persistent data 954 accordingly.

Non-persistent Updating

Figure 15:
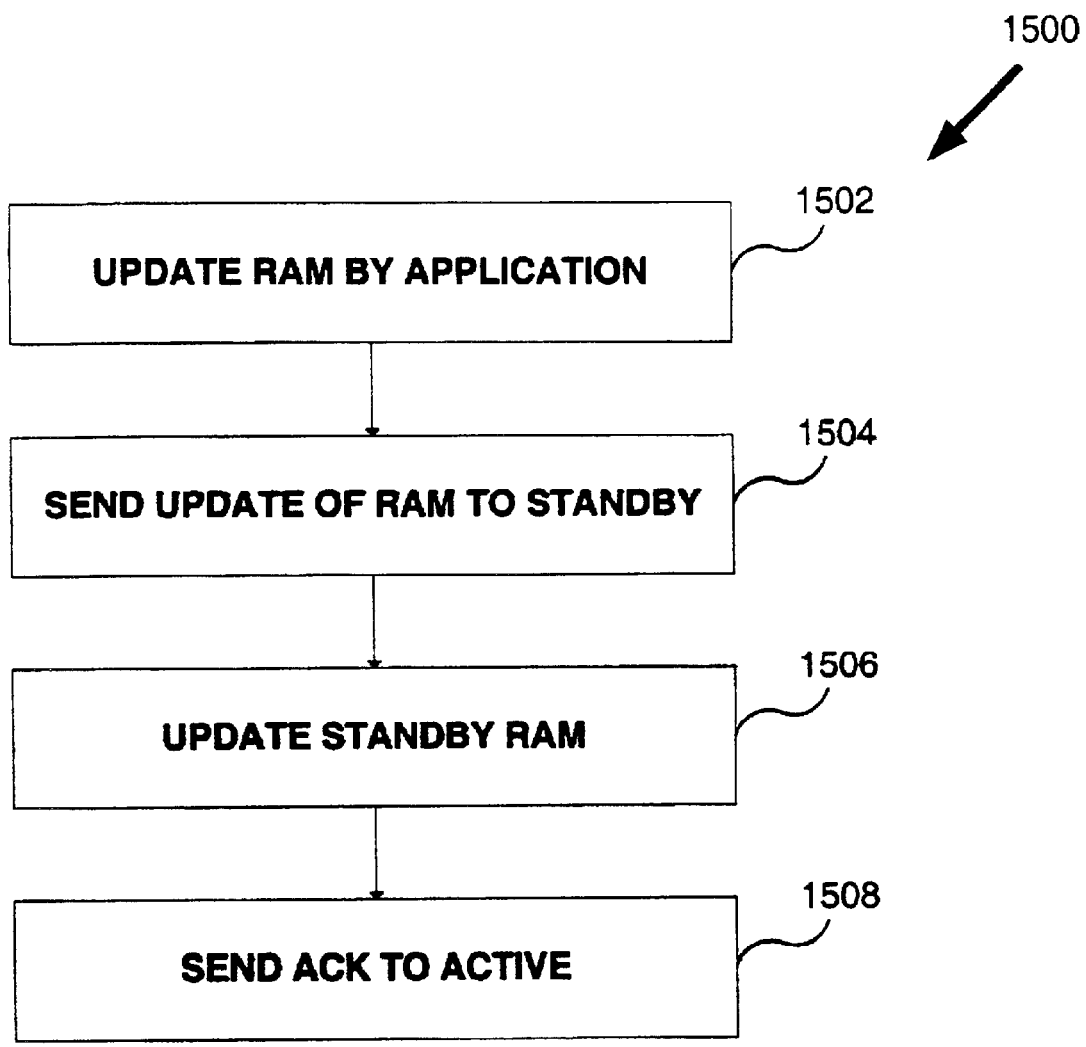
FIG. 15 illustrates a flow chart of an operation to update non-persistent information to a standby card according to one embodiment.

FIG. 15 illustrates a flow chart of an operation 1500 to update non-persistent information to standby card 950. The operation 1500 relates to an application task 916 that transmits a configuration change to its RAM data structures 912 and non-persistent data 914 in active card 910 and a message to its peer application task 956 in standby card 950 to update it respective RAM data structures 952 and non-persistent data 954. For one implementation, negative or positive acknowledgment can be used on all the transactions.

Referring to FIG. 15, at operation 1502, application task 916 updates its RAM data structures 952 or non-persistent data 954 and sends a message to RCM 920 to transmit the message to standby card 950.

At operation 1504, RCM 920 transmits the message to peer application task 956 via RCM 960. RCM 920 transmits the same set of messages to peer application task 956 that application task 916 transmitted in the active card 910.

At operation 1506, peer application task 956 updates its RAM data structures 952 and non-persistent data 954 accordingly. Peer application task 956 can send an acknowledgement to application task 916 in active card 910 that it has made the change.

At operation 1508, SRM 918 on active card 910 on receipt of acknowledgment unblocks the blocking process that may have been implemented to prevent changes to RAM data structures 912, non-persistent data 914, and flash disk 924.

The above updating operations can be performed for two types of updating to standby card 950, which are referred as "bulk updates" and "delta (small) updates."

Bulk Updates

A bulk update refers to an update to the standby card 950 when standby card 950 is first inserted into router 104 and active card 910 has been operating in active mode. The newly inserted card can be a new card or a spare card or a card from another router. The SRMs running on active card 910 and standby card 950 determine the validity and status of themselves in determining active status or standby status. For purposes of explanation, standby card 950 that is inserted obtains a standby status. If the inserted card is functionally capable of becoming a standby, the standby card 950 must be synchronized with the active card 910.

At this point, a large update "bulk update" takes place between the active card 910 and the standby card 950 may have a huge routing table operating therein. In particular, the update is called "bulk" because all the information in active card 910 has to be copied to standby card 950, which can include millions of routing entries.

At the beginning of the bulk update, SRM 918 blocks all changes to the configuration of active card 910 such as, for example, command line changes or session setup changes. For one embodiment, network route updates can be queued because network topology changes must always be known even during a bulk update.

Datastore 922 in active card 910 will ensure that databases storing persistent data (i.e., information stored in flash disk 924) are mirrored in a memory or a flash disk 964 of the standby card 950. For example, a routing table, connection information, etc. are mirrored in active card 910 and standby card 950. RCM 920 informs the modules on the active card 910 of the existence of standby card 950. For one embodiment, the updating can be different for each application that may be used for different types of routing protocols running on active card 910.

Delta Updates

There are two types of changes that can occur on active card 910. First, a change that is required to be replicated or updated to standby card 950. For example, configuration changes, a routing table update, node name changes, etc., are required to be updated in standby card 950. Second, a change that is not required to be updated to standby card 950. For example, counter updates or non-critical alarms are not required to be updated to standby card 950. However, such changes can be replicated to standby card 950.

Delta updating can be performed using the operations described above related to persistent updating and non-persistent updating. For one embodiment, even if a delta update fails and standby card 950 resumes operation, the lack of the delta update will not necessarily cause standby card 950 to fail because a peer node will resend a message. As long as the message is not committed, standby card 950 does not necessarily require the delta update to resume operation if active card 910 fails. That is, if a message or change is committed by the active card 910, it must be made to the standby card 950 in a delta update to maintain consistency with peer nodes.

Error Handling

Figure 16:
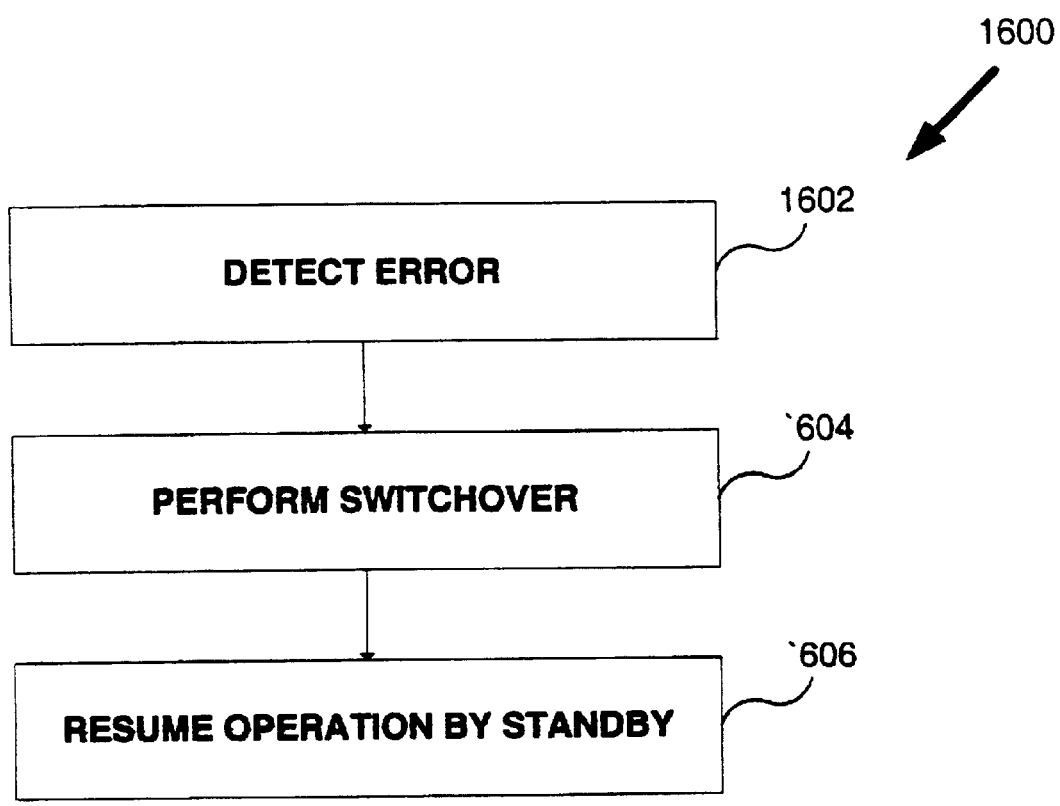
FIG. 16 illustrates a flow chart of an operation to perform error handling according to one embodiment.

The active card 910 includes software and hardware error handling capabilities. For example, SRM 918 can handle software errors and error logic can handle hardware errors for active card 910. FIG. 16 illustrates a flow chart of an operation 1600 to perform error handling according to one embodiment.

Referring to FIG. 16, at operation 1602, active card 910 detects an error such as a software or hardware error. Active card 910 detects if the error requires a switchover. If the error requires a switchover, active card 910 and standby card 950 can perform a non-graceful switchover as described above.

At operation 1604, a hardware switchover takes place to standby card 950. A certain period of time is required to perform the physical switchover, which is in the order of a few milliseconds.

At operation 1606, standby card 950 resumes operation for router 104. The standby card 950 must resume operation quickly because a protocol session with router 104 may time out. Because of the delta updating of non-persistent and persistent information for relevant information changes to active card 910, standby card 950 can resume operation seamlessly and quickly.

Software/Hardware Failures

A software failure is the most critical type of failure. That is, software errors are related to a number of software states and variables, which require consistency in a redundancy system. Furthermore, software errors can be difficult to detect. Common types of software failures include segmentation fault, memory corruption, memory exhaustion, application forced switchover, and infinite loops.

A segmentation fault occurs if there is an invalid access to memory. If there is a wrong access to memory hardware or software can detect the wrong access and generate an error to a SRM to cause a switchover. In particular, a wrong access to memory can cause incorrect information to be stored, which can create inconsistent routing table information to be stored. A memory exhaustion error occurs if too much memory space is being used. For one implementation, a warning can be given if used memory spaces reach a warning level, and a switchover can occur if the used memory space passes a certain threshold.

An application forced switchover can occur in software where a user forces the switchover by a command line instruction. For example, a new card being inserted that is to have active status. An infinite loop can also cause a processor from processing other instructions. For one embodiment, watchdog timers can be used to determine if an instruction is an infinite loop causing a software error. Alternatively, a low priority task can be used to determine if the processor is stuck in an infinite processing another task. That is, if the low priority task never gets processing time, an infinite loop can be determined.

A hardware failure is less severe than a software failure because of the redundant hardware in standby card 950. Common types of hardware failures are ASIC diagnostics failure, bus failure, memory failure, or a card failure during a power-up or boot sequence. Such hardware failures will also cause an active card to relinquish mastership and cause a switchover to standby card 950.

ROUTING PROTOCOL REDUNDANCY

Basic Routing Protocol Redundancy Requirements

To have routing protocol level redundancy, standby card 950 must be populated with all pertinent information required for each of the routing protocols running on the active card 910. Each routing protocol module running on the active card 910 and standby card 950 is responsible for maintaining a mirror copy of its protocol information in both the active card 910 and standby card 950. Thus, if the active card 910 fails, the standby card 950 can resume all routing protocol sessions of the active card 910. The standby card 950 resumes operation before any of the routing protocol session states times out thus preventing the failure from being observed by peer nodes.

Exemplary Routing Protocol Interaction

Figure 17:
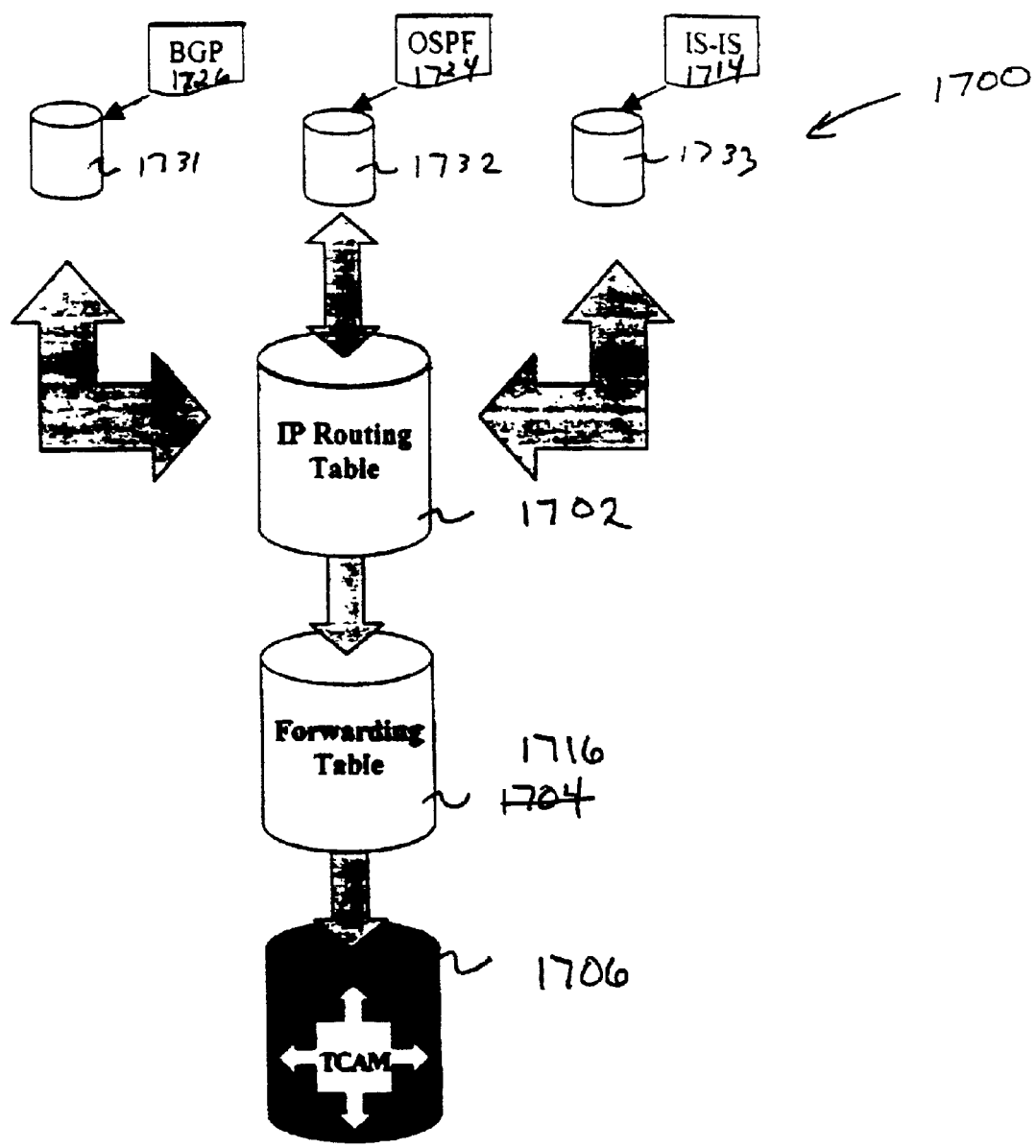
FIG. 17 illustrates a diagram to show routing protocol interaction within a network device according to one embodiment.

FIG. 17 illustrates a diagram 1700 to show routing protocol interaction within a node according to one embodiment. Referring to FIG. 17, each routing protocol BGP 1726, OSPF 1724, and IS-IS 1714 is associated with its own database 1731, 1732, and 1733, respectively. Such databases can includes specific routing protocol routes or information. Furthermore, the databases 1731, 1732, and 1733 for each routing protocol can store data structures for state machines and statistics operating within routing protocols BGP 1726, OSPF 1724, and IS-IS 1714.

The sum of all aggregated routes are stored in an IP routing table 1702. The forwarding table (FIB) 1702 can be generated based on the routes in the IP routing table 1702. FIB 1716 can include forwarding information to forward packets for router 104. For one embodiment, a tertiary content addressable memory (TCAM) 1706 can store the routes in FIB 1716. In other embodiments, any combination of a processor and memory system can be used to store and maintain FIB 1716.

The above routing protocol interaction is to operate in the same manner on standby card 950 if active card 910 fails.

Thus, the information in databases 1731, 1732, 1733 for BGP 1726, OSPF 1724, and IS-IS for active card 910 are replicated to the same in standby card 950. Furthermore, the IP routing table 1702 and FIB 1716 are replicated to the same in standby card 950. Thus the TCAM 1706 for the standby card 950 will switch and forward packets using consistent forwarding information for router 104.

Figure 18:
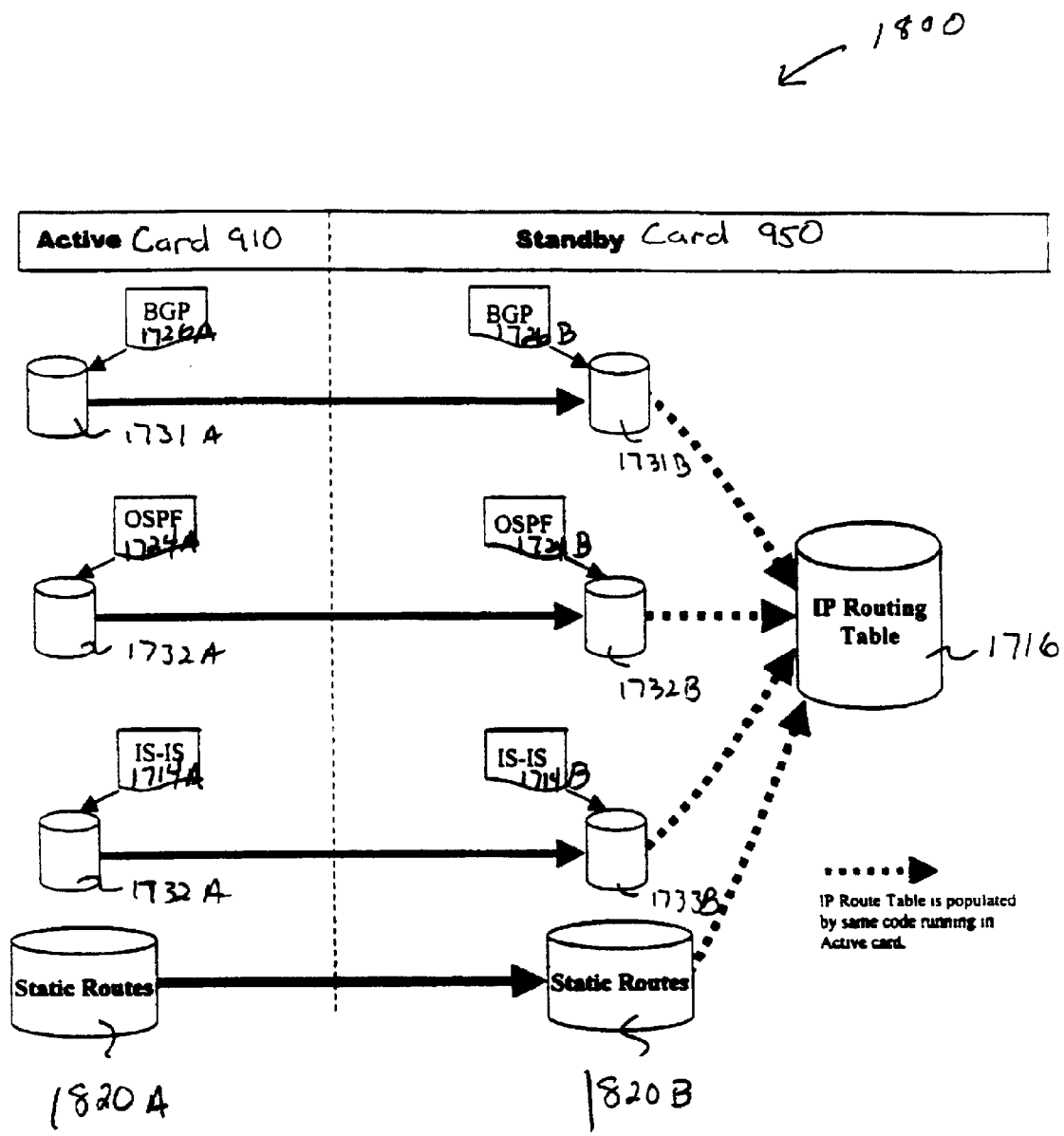
FIG. 18 illustrates a diagram to show routing protocol interaction between an active card and a standby card according to one embodiment.

FIG. 18 illustrates a diagram 1800 to show routing protocol interaction between an active control point and a standby control point according to another embodiment. Referring to FIG. 18, a copy of the routing information within databases 1731 A, 1732A, and 1733A for routing protocols BGP 1726A, OSPF 1724A, and IS-IS 1714A, respectively, is maintained in its peer database in the standby control point.

For one embodiment, to avoid overloading the connection between the active card 910 and the standby card 950, active card 910 will only replicate or copy static routes 1820A to its peer static routes 1820B in the standby control point. Static routers are native routes. The standby card 950 is running in the same manner as the active card 910 except that it has no access to the ports being used for communicating to the network 100 for router 104. In particular, the regular code path in the standby card 950 will only redistribute and populate its IP Routing Table 1716.

In the event of a failure to the active control point, the router 104 will switchover operation to the standby control point. Router 104 will continue routing traffic seamlessly because the standby control point has generated a valid forwarding table from the private datastore of each routing protocol. As such, a peer node communicating with router 104 can maintain routing protocol session with router 104. Furthermore, router 104 can prevent failures from being observed by the peer node and prevent the switchovers from being observed by the peer node.

Exemplary Architecture for Routing Protocol Redundancy

Figure 19:
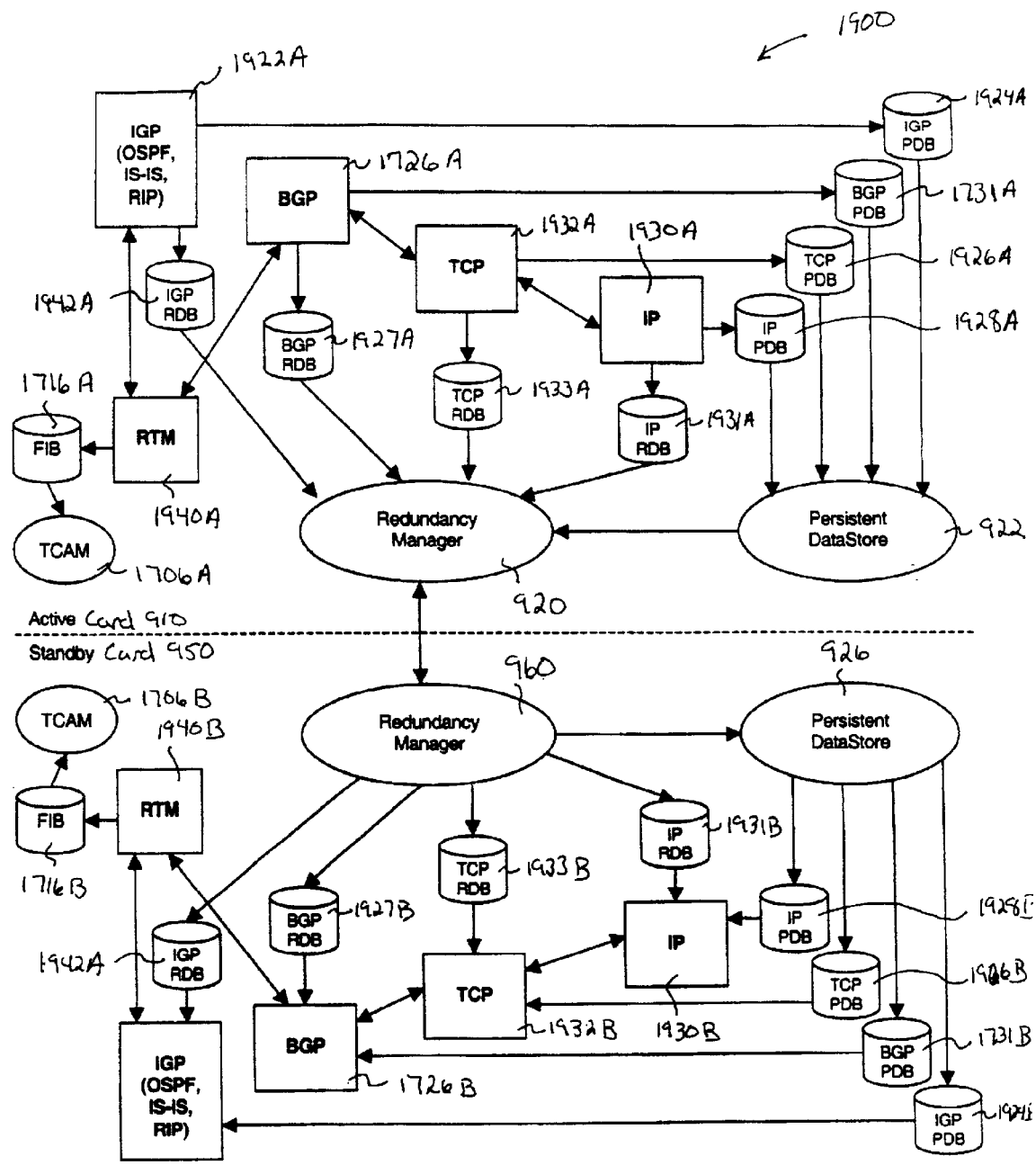
FIG. 19 illustrates an architecture for routing protocol redundancy according to one embodiment.

FIG. 19 illustrates an exemplary architecture 1900 for routing protocol redundancy. Exemplary architecture 1900 includes routing protocol databases and modules for active card 910 and a standby card 950 to support routing protocol redundancy. Each of the modules for the active card 910 and standby card 950 have two types databases for redundancy, which are redundant databases (RDBs) and persistent data bases (PDBs).

The active card 910 includes Interior Gateway Protocols (IGP) module 1992A accessing IGP RDB 1942A and IGP RDB 1924A. The IGP module includes modules for OSPF, RIP, and IS-IS routing protocols. The active card 910 also includes BGP module 1726A accessing BGP RDB 1927A and BGP PDB 1731A, TCP module 1932A accessing TCP RDB 1933A and TCP PDB 1926A, and an IP module 1930A accessing an IP RDB 1931A, and IP PDB 1928A.

The standby card 950 includes peer modules of the active card 910 accessing peer PDBs and RDBs. In particular, standby card 950 includes IGP module 1992B accessing IGP RDB 1942B and IGP RDB 1924B. The standby card 950 also includes BGP module 1726B accessing BGP RDB 1927B and BGP PDB 1731B, TCP module 1932B accessing TCP RDB 1933B and TCP PDB 1926B, and an IP module 1930B accessing an IP RDB 1931B, and IP PDB 1928B.

The redundancy for persistent data (PDBs) and non-persistent data (RDBs) is handled differently. Persistent data redundancy is handled by an internal datastore module of each active card 910 and standby card 950. If the datastore module of active card 910 stores data to a flash disk, the same data is passed transparently to standby card 950 and in its flash disk. In addition, the peer datastore module in the standby card 950 is notified of the change and the data being changed is also passed as a part of the notification. Each of the modules is also responsible for redundancy of its only its own non-persistent data. For example, if OSPF received some updates from BGP, OSPF will not pass it to the standby card 950. In this situation, BGP will send update to its peer BGP in standby card 950.

The active card 910 and standby card 950 perform routing redistribution identically. Each of the routing protocol modules on both the active card 910 and standby card 950 is responsible to send its best routes to the routing table managers (RTMs) 1940A and 1940B, respectively. If RTM 1940A on the active card 910 is configured to redistribute routes to other protocols, RTM 1940A will do so on the standby card 950 as well. For one embodiment, RTM redistribution settings are considered configuration information and is made redundant as a persistent data.

The forwarding information tables (FIBs) 1716A and 1716B are built identically on both the active card 910 and standby card 950, respectively. The FIBs 1716A and 1716B are based on best routes and configured administrative distance for each protocol. For one embodiment, protocol distance setting information for the RTMs is considered configuration information and is made redundant as a persistent data. The tertiary content addressable memories (TCAMs) 1706A and 1706B operate identically on the active card 910 and standby card 950, respectively. The TCAMs 1706A and 1706B can be programmed based on persistent data from different modules and dynamic FIB data from the RTMs 1940A and 1940B. The standby card 950 (if acting in standby) has no physical line connected for the router 104. As such, standby card 950 is responsible for being an interface manager to handle interface states to be in synchronization with active card 910. That is, standby card 950 provides information to its modules and to peer modules in the active card 910.

Border Gateway Protocol (BGP) Redundancy

Basic BGP Redundancy Requirements

BGP is the most widely used routing protocol on the Internet. BGP is an external gateway protocol used by routers of different autonomous systems (ASs). A BGP router routes packets between network boundaries. Thus, a BGP routing or forwarding table can be very large capable of storing millions of routes. BGP, however, offers a different challenge than the other routing protocols. BGP uses TCP for connectivity and reliable data transfer. Consequently, if BGP loses its TCP connection with a peer, the peer reacts by immediately dropping all the routes learned from that neighboring peer. For this reason, to have BGP routing protocol redundancy, TCP must also be made redundant in order to avoid routes learned by BGP to become inaccessible.

In the following embodiments, the redundancy platform 900 shown in FIG. 9 provides the support to have BGP and TCP protocol redundancy. The redundancy platform 900 allows a standby card 950 to relearn BGP routing and forwarding information in a short enough time as not to constitute a service outage. Furthermore, redundancy platform 900 provides the support to the perform the following operations to obtain BGP and TCP protocol redundancy.

TCP Level Redundancy Requirements

TCP level of redundancy is an additional level of redundancy in order to have BGP routing protocol redundancy.

The following embodiment illustrate exemplary interaction between BGP and TCP for redundant node 104.

Figure 20:
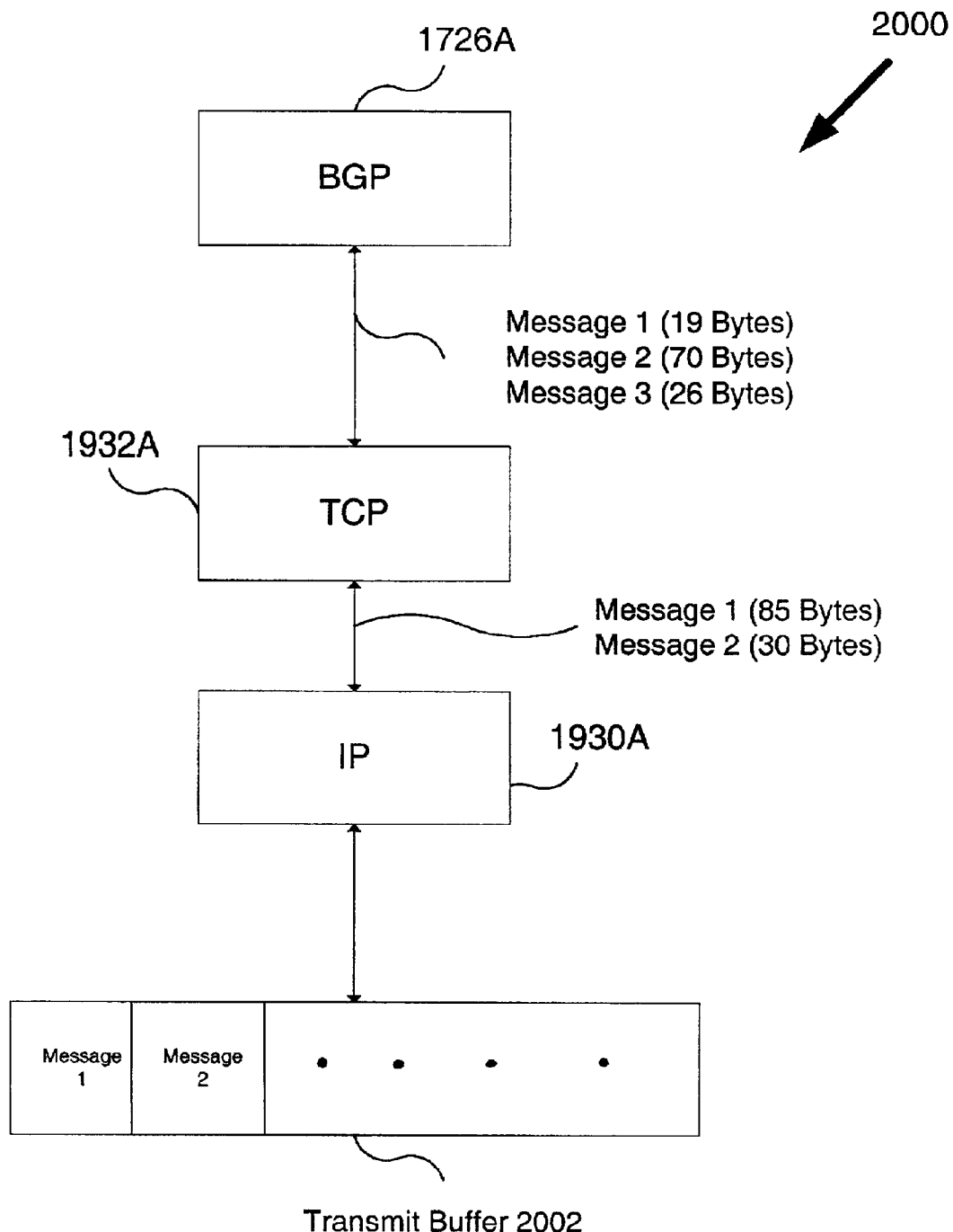
FIG. 20 illustrates an exemplary diagram to show an interaction between BGP, TCP, and IP.

FIG. 20 illustrates an exemplary diagram 2000 to show the interaction between BGP, TCP, and IP. For purposes of explanation, diagram 2000 refers to active card 910 being in "active mode." Referring to FIG. 20, diagram 2000 shows BGP 1726A sending three messages to TCP 1932A. Message 1 is 19 bytes long. Message 2 is 70 bytes long, and message 3 is 26 bytes for a total number 115 bytes.

TCP 1932A is a byte stream protocol. TCP 1932A considers the three messages from BGP 1726A as a stream of bytes. For example, TCP 1932A can send the 115 bytes from BGP 1726A as two messages to IP 1930A. Message 1 having 85 bytes and message 2 having 30 bytes. Thus, IP 1930A can receive the two messages from TCP 1932A. IP 1930A can temporarily store the two messages in a transmit buffer 2002.

Because TCP 1932A considers messages as continuous byte stream, TCP 1932A can store sequence numbers in the message to indicate where in the byte stream the message is located. For example, TCP 1932A can store a next send number (NS) and a next receive number (NR) to determine order of the messages. The NS number is an identifier identifying the message or packet. The NR number is an identifier identifying the next message or packet in the byte stream received from remote peer. Referring to FIG. 20, message 1 to IP 1930A can have a randomly generated NS number=1000. If a peer node receives message 1 having a NS number=1000, the peer node knows that the next message (i.e., message 2) should have a NS=1085. If it does not, the peer node will know the message is out of order from message 1 and will determine something is wrong.

Another parameter TCP 1932A can use is window size. The window size is maximum number of bytes TCP 1932A can send out before receiving an acknowledge from a peer node. The window size parameter can be negotiated between the peers. For example, the window size can be 8K or 16K. For one embodiment, data passing from and through BGP 1726A, TCP 1932A, IP 1930A, and transmit buffer 2002 are replicated or copied into the standby card 950 until the messages have been acknowledged by the receiving peer node.

Figure 21A:
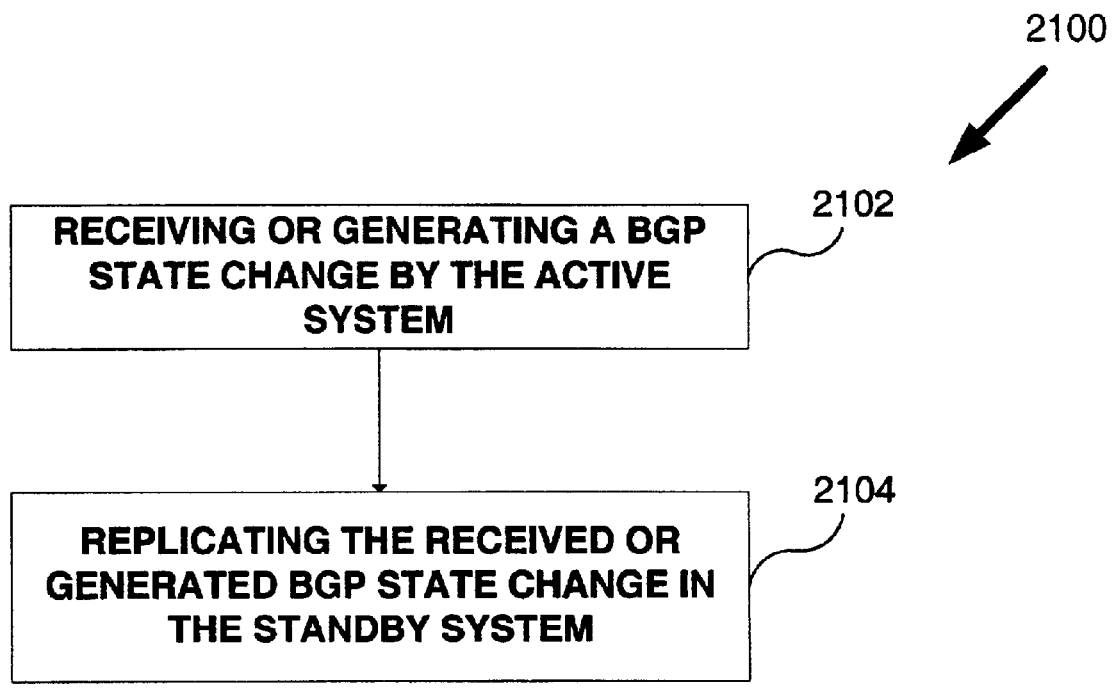
FIG. 21A illustrates a flow chart of an operation for replicating received or generated BGP state changes according to one embodiment.

FIG. 21A illustrates a flow chart of an operation 2100 for replicating received or generated BGP state changes according to one embodiment. The following operation 2100 can be implemented by redundant node 104 having an active card 910 and a standby card 950 as shown above. For purposes of explanation, operation 2100 begins at operation 2102. At operation 2102, a BGP state change is received or generated by active card 910. For example, a peer node can send redundant node 104 that a BGP route is no longer available as a state change.

At operation 2104, the received or generated BGP state change is replicated from the active card 910 to the standby card 950. For example, the redundancy platform 900 can perform a "delta update" of the BGP state change to the standby card 950 as explained above.

Figure 21B:
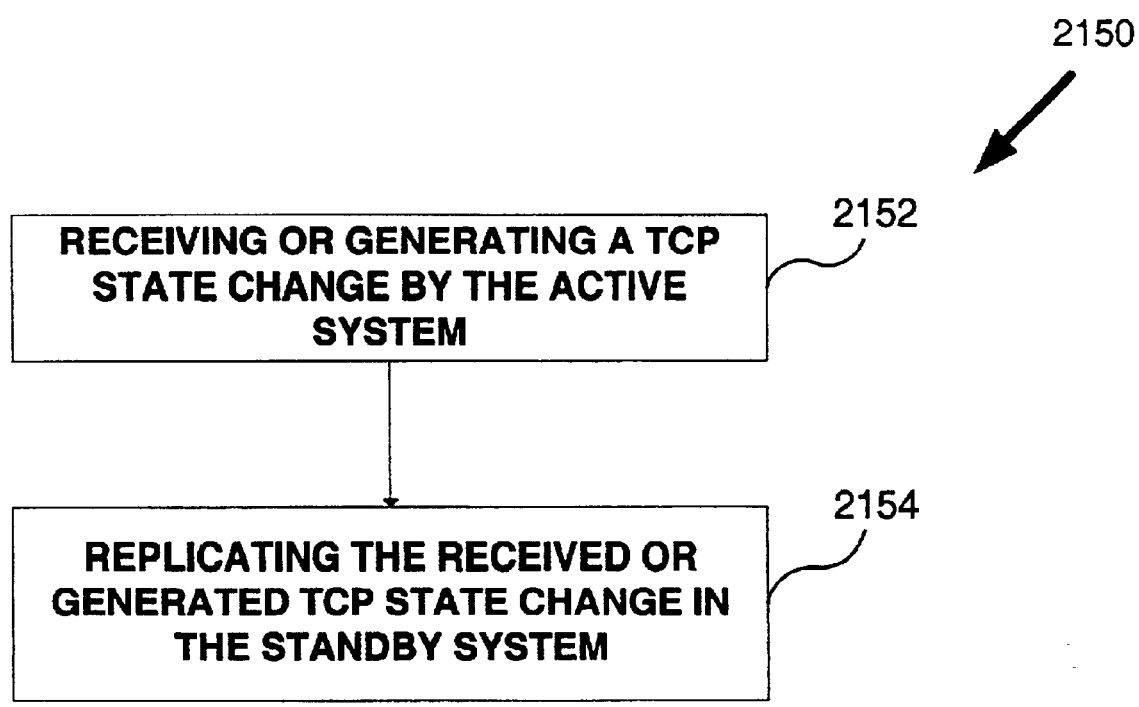
FIG. 21B illustrates a flow chart of an operation for replicating received or generated TCP state changes according to one embodiment.

FIG. 21B illustrates a flow chart of an operation 2150 for replicating received or generated TCP state changes according to one embodiment. For purposes of explanation, operation 2150 begins at operation 2152. At operation 2152, a TCP state change is received or generated by active card 910. For example, a peer node can send redundant node 104 that a TCP connection has been dropped and is no longer available as a state change.

At operation 2104, the received or generated TCP state change is replicated from the active card 910 to the standby card 950. For example, the redundancy platform 900 can perform a "delta update" of the TCP state change to the standby card 950 as explained above.

The above operations 2100 and 2150 allow for BGP and TCP redundancy for BGP and TCP state changes. In other embodiments, the above operations 2100 and 2150 can be implemented to provide selective redundancy for BGP and TCP messages. That is, some or all BGP and TCP messages can be made redundant in standby card 950.

TCP Lock Step For BGP Messages Being Sent

In one embodiment, a requirement for TCP level of redundancy is a BGP and TCP "lock step" requirement. The lock step requirement requires that for every message that is sent or received by an active card 910 there must be an acknowledgement that the standby card 950 has stored the sent or received message before active card 910 can send or receive another message. If a switchover occurs and standby card 950 did not save the message, redundancy is broken.

Figure 22:
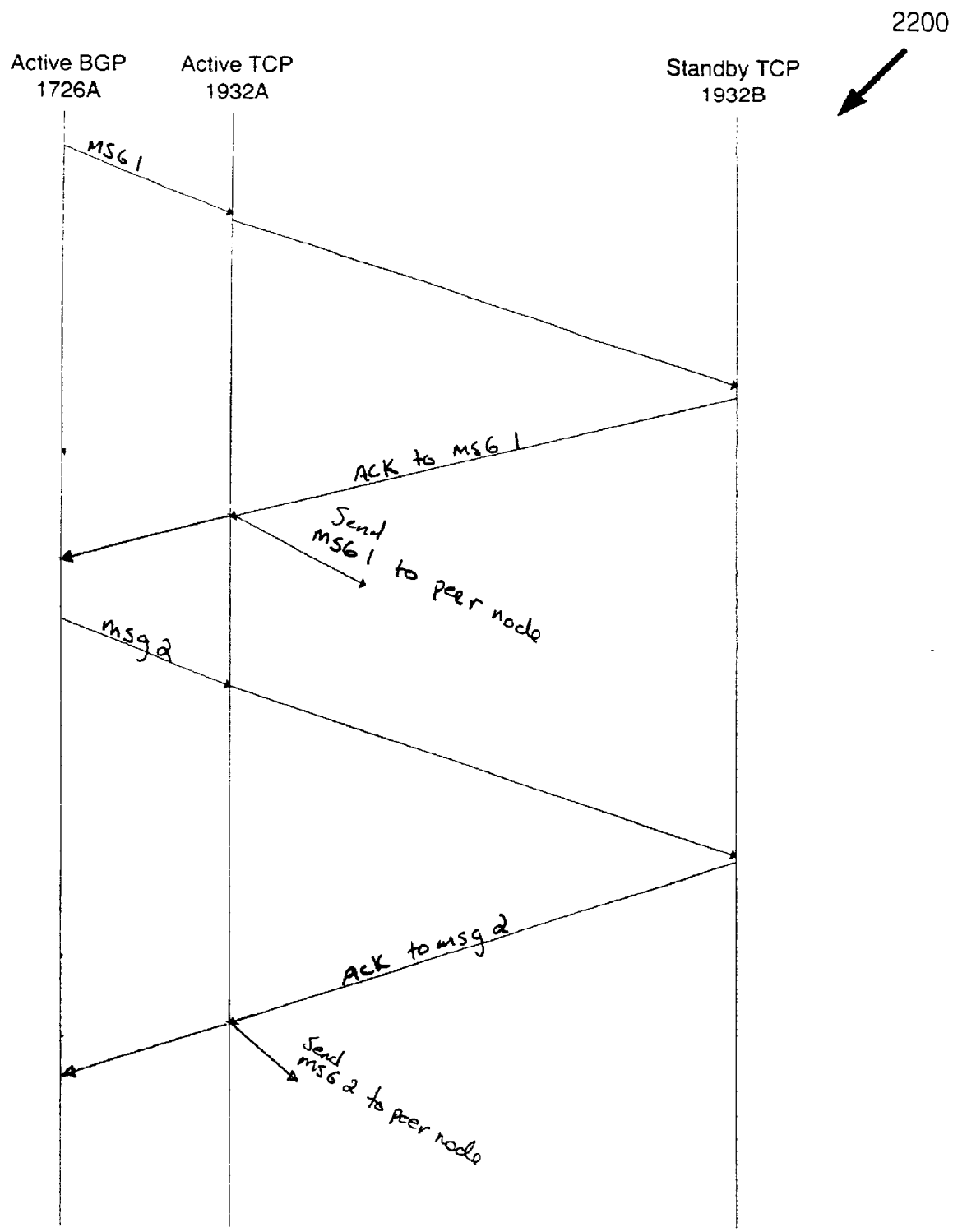
FIG. 22 illustrates one embodiment of a dialog between an active TCP operating on an active card and a standby TCP operating on a standby card to show a lock step requirement for a BGP message being sent to a peer node.

FIG. 22 illustrates an exemplary dialog between an active TCP operating on active card 910 and a standby TCP operating on standby card 950 to show the lock step requirement for a BGP message being sent to a peer node. Referring to FIG. 22, dialog 2200 shows an active BGP 1726A sending a BGP message (message 1) to active TCP 1932 A. Active card 910 is planning to send message 1 to another router or peer node. Active TCP 1932A sends message 1 to standby TCP 1932B so that message 1 can be replicated in standby card 950. Standby card 950 sends an acknowledgement to active TCP 1932A that it has replicated message 1.

For one embodiment, the redundant node 104 having a redundancy platform 900 will not send message 1 to the peer node via IP 1932A until it has received an acknowledgement that message 1 has been replicated. Furthermore, redundant node 104 will not send another message (i.e., message 2) until it has received acknowledgment from standby TCP 1932B that message 1 has been saved. As stated previously, if message 1 is not saved in standby card 950, redundancy will be broken and if a switchover occurs standby card 950 cannot resume operation in the current state of active card 910.

Thus, after active TCP 1932A receives and acknowledgement of message 1, it will send the "ack" to BGP 1726A and the then BGP 1726A can send out the second message 2. Likewise, active card 910 will not send message to a peer node via IP 1932A until it has received an acknowledgement that standby TCP 1932B has stored message 2 in standby card 950. By maintaining such a lock step ensures that that standby card 950 has the same BGP messages in the active card 910 that are planning to be sent out to a peer node.

TCP Lock Step for BGP Messages Being Received

Figure 23:
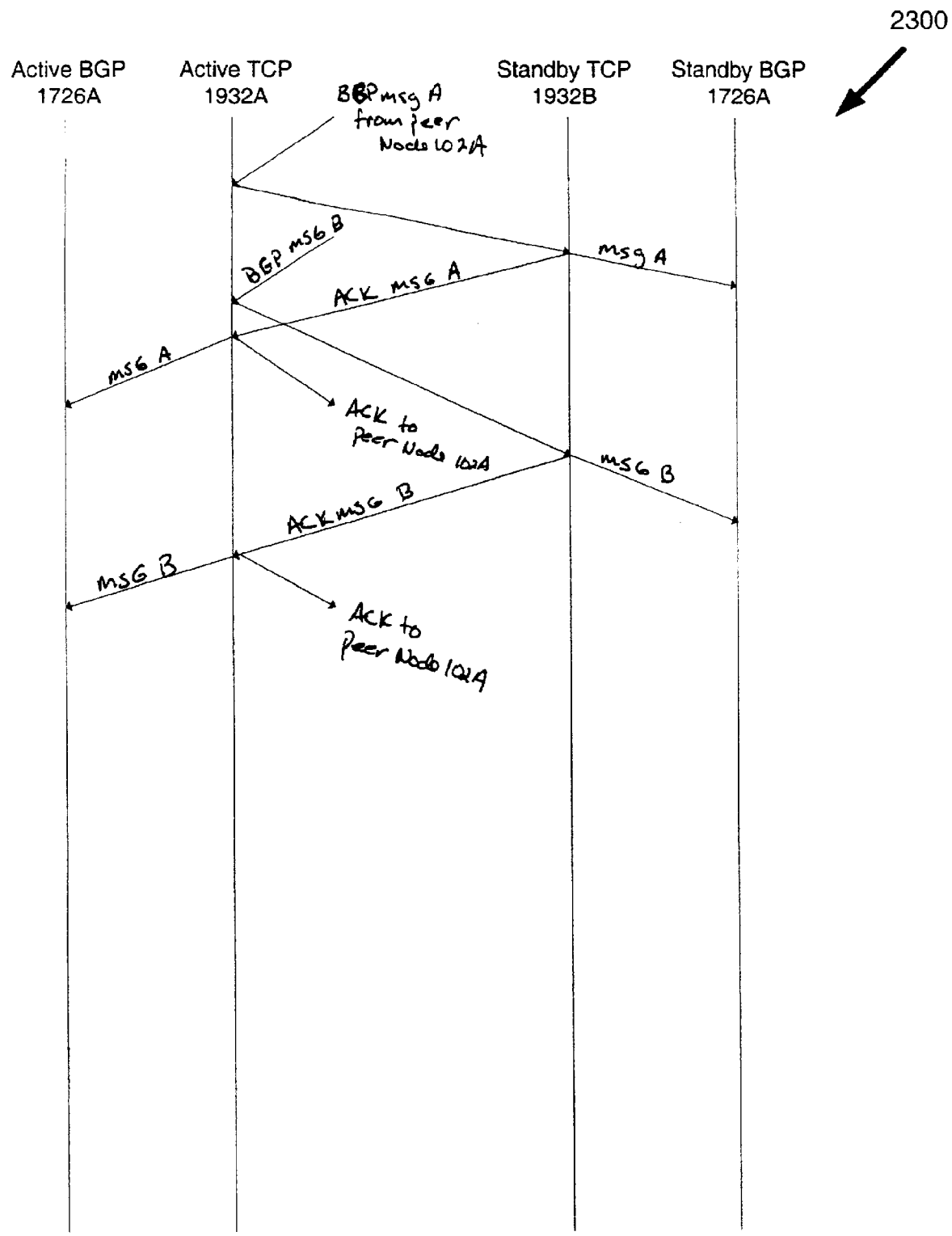
FIG. 23 illustrates one embodiment of a dialog between an active TCP operating on an active card and a standby TCP operating on a standby card to show a lock step requirement for a BGP message being received from a peer node.

FIG. 23 illustrates an exemplary dialog between an active TCP operating on active card 910 and a standby TCP operating on standby card 950 to show the lock step requirement for a BGP message being received from a peer node. Referring to FIG. 23, dialog 2300 shows an active TCP 1932A in the active card 910 receiving a BGP message (message A) from remote node 102A. Before TCP 1932A can send and acknowledgement to remote node 102A, TCP 1932A must ensure that message A is replicated in standby card 950. If message A is not replicated in standby card 950, redundancy is broken.

As such, TCP 1932A sends message A to it's the standby TCP 1932B. The standby TCP 1932B sends message A to standby BGP 1726B in standby card 950. Standby TCP 1932B then sends an acknowledgement to active TCP 1932A that message A has been replicated. After receiving the acknowledgement from standby TCP 1932B, active TCP 1932A sends message A to active BGP 1726A and can then send an acknowledgement to message A to remote node 102A.

If a second BGP message (message B) is received by active TCP 1932A, it will also perform the same operation with message A to replicate message B in standby card 950 and wait for an acknowledgement that message B has been replicated. After receiving the acknowledgement from standby TCP 1932B, active TCP 1932A will send message B to active BGP 1726A and can then send an acknowledgement to message B to remote node 102A. Acknowledgement of message B will not occur until message A has been replicated. Thus, by maintaining such a lock step ensures that that standby card 950 has the same BGP messages that were received by active card 910.

Incremental (Delta) Updating for BGP Protocol Redundancy

Figure 24:
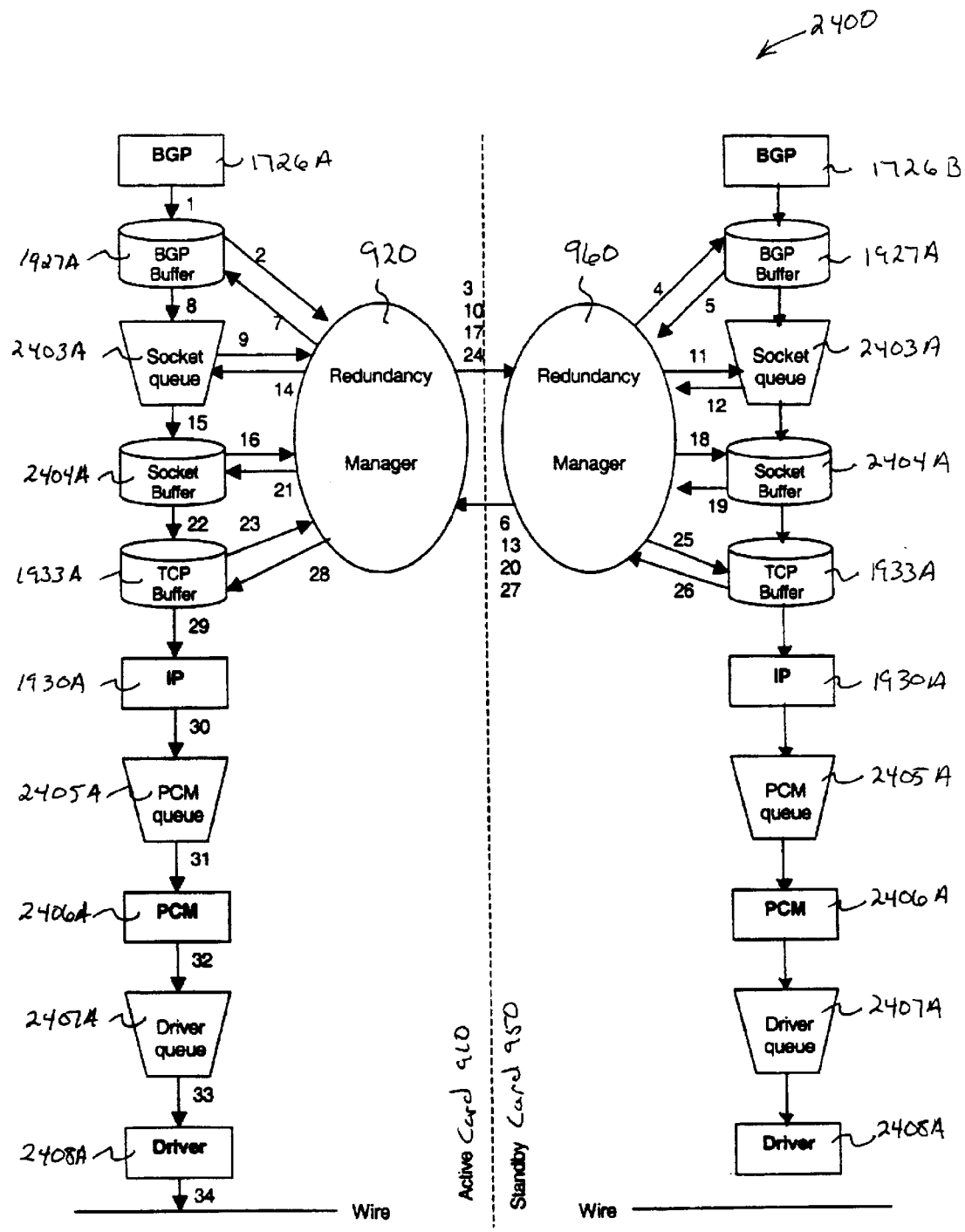
FIG. 24 illustrates a BGP architecture to show delta updating for individual BGP information being sent to a peer node according to one embodiment.
Figure 25:
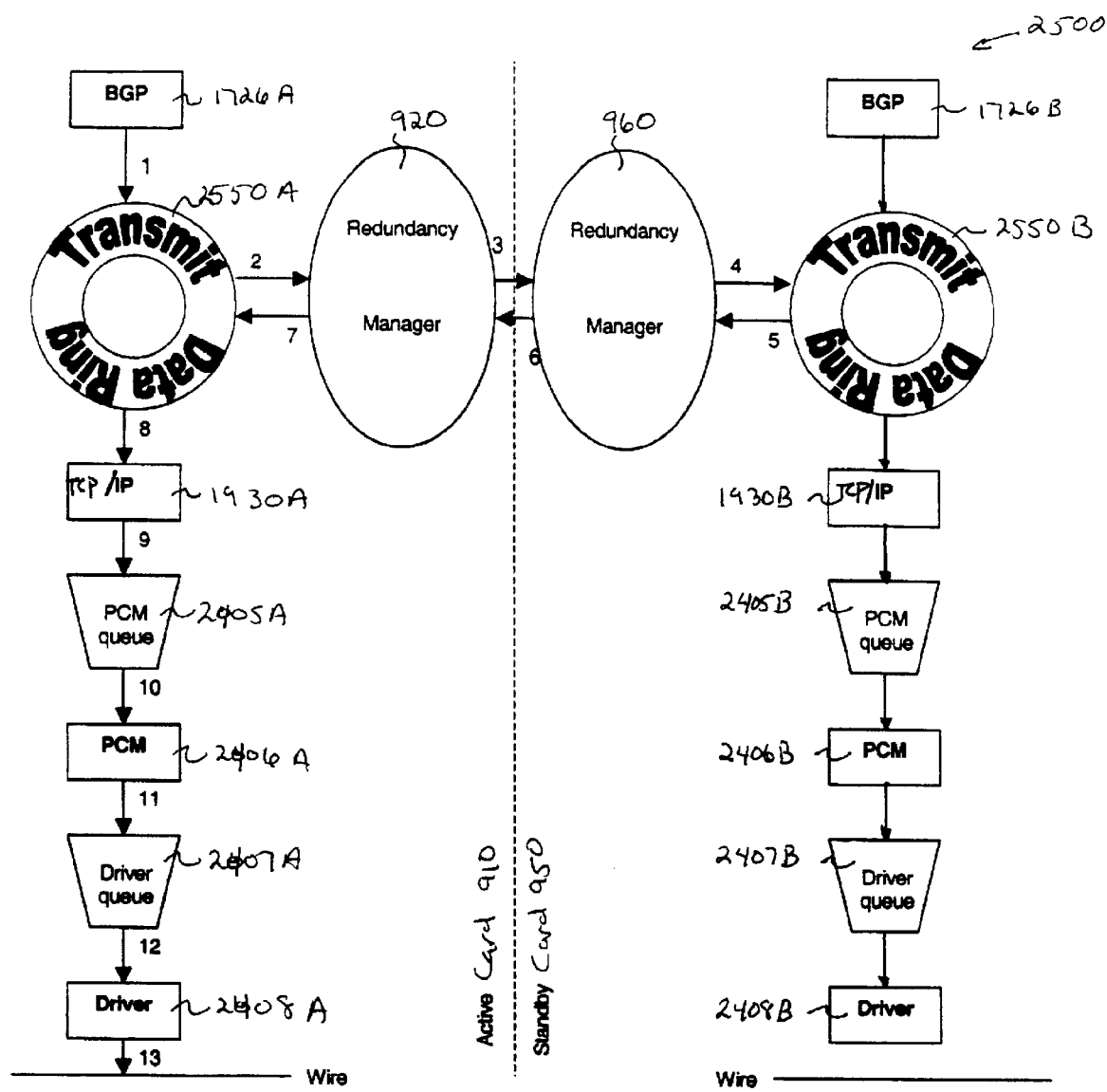
FIG. 25 illustrates a BGP architecture to show delta updating for individual BGP information being sent to a peer node according to one embodiment.
Figure 26:
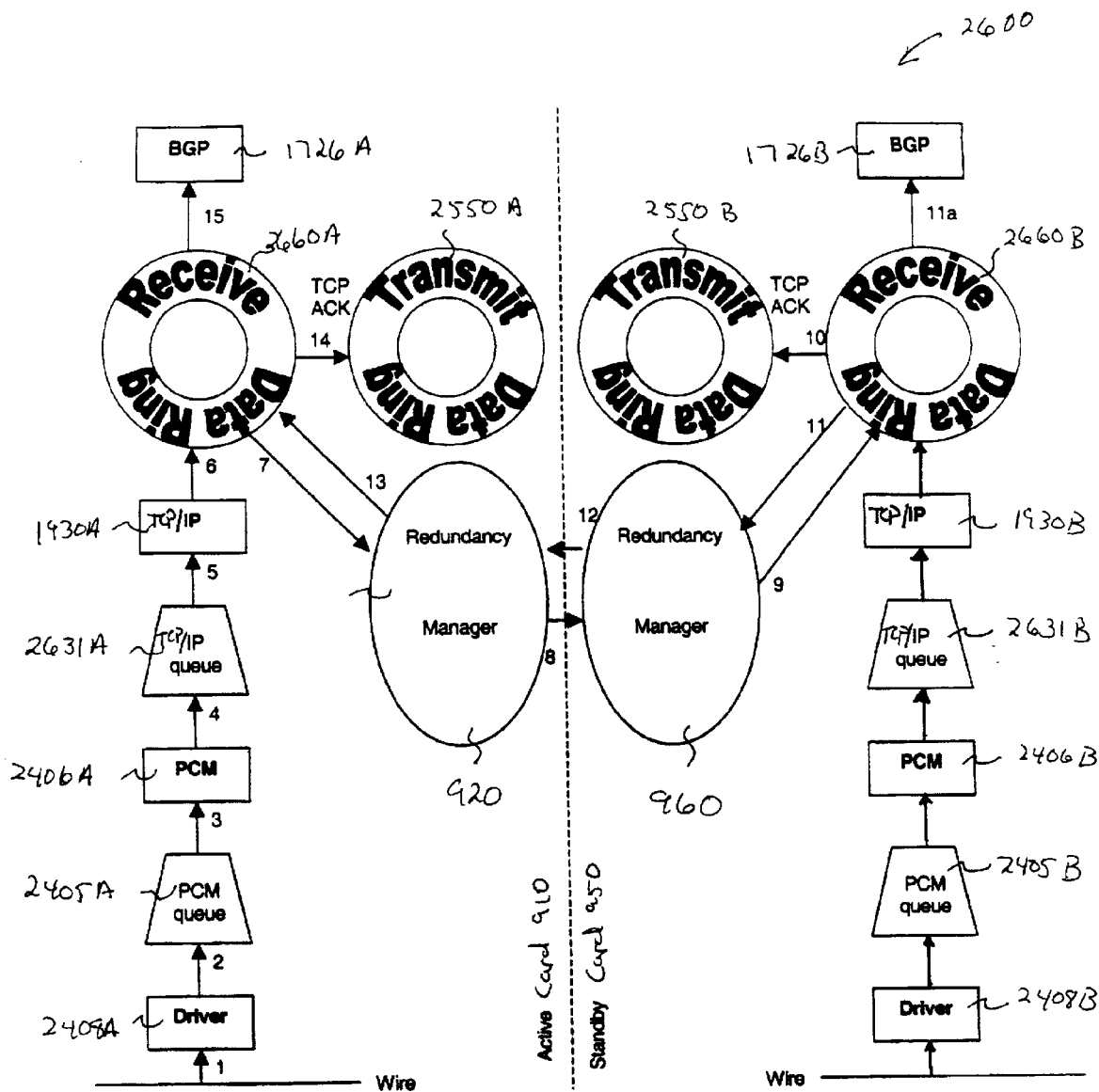
FIG. 26 illustrates a BGP architecture to show delta updating for individual BGP information being received from a peer node according to one embodiment.

FIGS. 24 and 25 show varying embodiments for delta updating of individual BGP messages being sent to a peer node implementing the TCP lock step requirement as illustrated by FIG. 22 above. FIG. 26 shows an embodiment for delta updating of individual BGP messages being received from a peer node implementing the TCP lock step requirement as illustrated in FIG. 23 above.

FIG. 24 illustrates a BGP architecture 2400 to show delta updating for individual BGP messages being sent to a peer node according to one embodiment. The BGP architecture 2400 works on top of redundancy platform 900 as shown in FIG. 9. In the following architecture 2400, each BGP message generated by BGP protocol running on the active card 910 is updated or replicated in the standby card 950. The BGP message passes through a number of buffering stages, which requires redundancy at every stage.

Referring to FIG. 24, the operation of architecture 2400 will now be explained with regards to reference points 1 through 34. At reference point 1, BGP 1926A sends a message that is stored in BGP buffer 1927A. At reference point 2, the message must be mirrored or replicated in standby card 950. Thus, the message is sent to redundancy manager 920, and at reference point 3, redundancy manager 920 sends the message to its peer redundancy manager 960 in standby card 950 via an intercard link (e.g., a "wire"). Redundancy manager 960 now updates BGP buffer 1927B with the message thereby having a mirror copy of the message stored in BGP buffer 1927A.

At reference point 5, an acknowledgement is sent to redundancy manager 960 that the message has been updated. At reference point 6, redundancy manager 960 in standby card 950 sends the acknowledgement to redundancy manager 920 in active card 910. Redundancy manager 920 thus stores the acknowledgement in BGP buffer 1927. Afterwards, the message is passed to socket queue 2403A.

Here, the above operations are performed for reference points 9 through 28 to propagate the message through socket queue 2403A, socket buffer 2404A, and TCP buffer 1933A in active card 910. Thus, the message being propagated in socket queue 2403A, socket buffer 2404A, and TCP buffer 1933A are mirrored or replicated to its peer socket queue 2403B, socket buffer 2404B, and TCP buffer 1933B in standby card 950. After the message is stored in TCP buffer 1933A, for reference points 29 through 34, the message is passed through IP 1930A, protocol chain manager (PCM) queue 2405A, PCM 2006A, driver queue 2407A, and driver 2408A out on a wire to the peer node. The socket queues store end-point information for the BGP protocol in which the end-point information relates to a BGP protocol running on another node. The PCM manages messages designated for each type of routing protocol. The PCM queues stores messages for individual routing protocols.

FIG. 25 illustrates an exemplary BGP architecture 2500 to show delta updating for individual BGP messages being for data transmit redundancy according to another embodiment. The exemplary BGP architecture 2500 reduces the number of buffering stages between BGP and TCP/IP. In particular, BGP can send messages ("packets") directly to a buffer used by TCP/IP. For example, the buffer can be a "ring buffer." BGP can control a "write" pointer to the ring buffer and TCP/IP can control a "read" pointer to the ring buffer.

Referring to FIG. 25, the operation of architecture 2500 will now be explained with regards to reference points 1 through 13. At reference point 1, BGP 1926A sends a message "packet" that is stored in transmit data ring 2508A. At reference point 2, the message must be mirrored or replicated in standby card 950. Thus, the message is sent to redundancy manager 920, and at reference point 3, redundancy manager 920 sends the message to its peer redundancy manager 960 in standby card 950 via an intercard link (e.g., a "wire"). Redundancy manager 960 now updates the transmit data ring 2108B with the message thereby having a mirror copy of the message stored in transmit data ring 2508A.

At reference point 5, an acknowledgement is sent to redundancy manager 960 that the message has been updated. At reference point 6, redundancy manager 960 in standby card 950 sends the acknowledgement to redundancy manager 920 in active card 910. Redundancy manager 920 thus stores the acknowledgement in transmit data ring 2508A. Afterwards, the message is passed through TCP/IP 1930A, PCM queue 2405A, PCM 2406A, driver queue 2407A, and driver 2408A out on a wire to the peer node.

FIG. 26 illustrates an exemplary BGP architecture 2600 for data receive according to one embodiment. The exemplary BGP architecture 2600 is similar to BGP architecture 2500 with an addition data ring buffer (i.e., receive data ring buffer 2660A and 2660B). In particular, BGP can receive BGP messages from the data ring buffer.

Referring to FIG. 26, the operation of architecture 2600 will now be explained with regards to reference points 1 through 14. At reference point 1, standby card 910 receives a BGP message from the a wired connection by driver 2408A. At reference point 2, driver 2408A sends the message to PCM queue 2405A. At reference point 3, PCM queue 2405A sends the message to PCM 2406A. At reference point 4, PCM 2406A sends the message to TCP/IP queue 2631 A. At reference point 5, TCP/IP queue 2631A sends the message to TCP/IP 1930A. At reference point 6, TC/IP 1930A sends the message to data receive ring buffer 2660A.

At reference point 7, data receive ring buffer 2660A sends the message to redundancy manager 920. At reference point 8, redundancy manager 920 sends the message to redundancy manager 960 in the standby card 950 to be replicated. At reference point 9, redundancy manager 960 sends the message to data receive ring buffer 2660B. At reference point 10, an acknowledgement of the message is stored in transmit ring data buffer 2550B. At reference point 11 and 11a, the message is sent to BGP 1726B and the acknowledgement is sent to redundancy manager 960. At reference point 12, the acknowledgement is sent to redundancy manager 920.

At reference point 13, redundancy manager 920 sends the acknowledgement to data receive ring buffer 2660A. At reference point 14, the acknowledgement from redundancy manager 960 is store in transmit ring buffer 2550A. At reference point 15, the message is sent to BGP 1726A. In the above operation, the message received by active card 910 will not be sent to BGP 1726A until it has been received by BGP 1726B. Furthermore, the above operations, illustrate incremental updating for a received BGP message from a peer node or neighbor.

Figure 27:
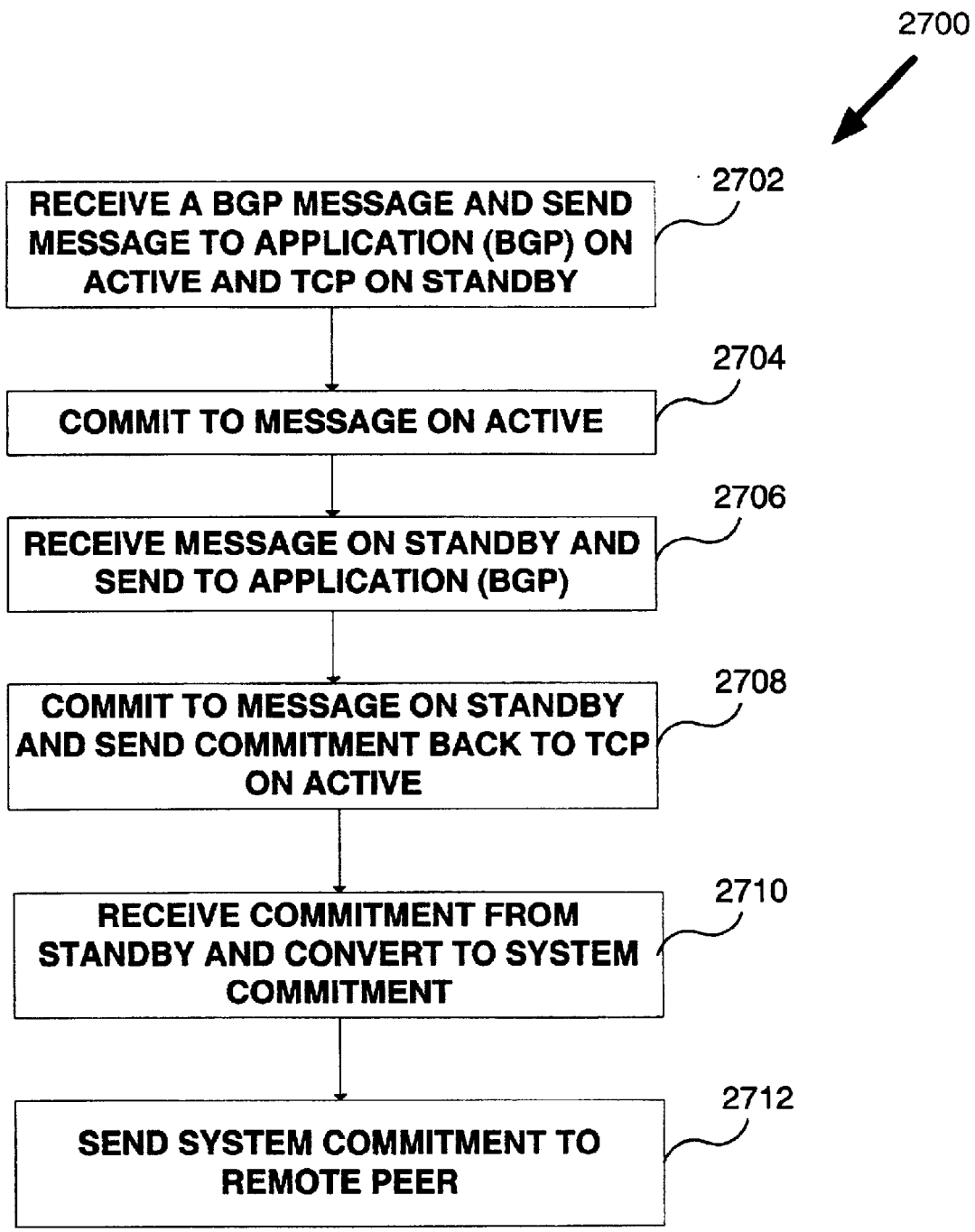
FIG. 27 illustrates a flow chart to commit to a BGP message according to one embodiment.

FIG. 27 illustrates a flow chart of an operation 2700 to commit to a BGP message according to one embodiment. The following operation 2700 can be implemented by redundant node 104 having an active card 910 and a standby card 950 as shown above. For purposes of explanation, operation 2700 refers to FIG. 19 and begins at operation 2702.

At operation 2702, a BGP message is received by active card 910. Active card 910 sends the message up through the upper layers to an application (BGP), i.e., BGP 1726A. Active card 910 also sends the message to TCP 1932B in the standby card 950.

At operation 2704, the active card 910 commits to the message.

At operation 2706, the standby card 950 receives the message and sends the message from TCP 1932B to application (BGP) on standby, i.e., BGP 1726B.

At operation 2708, the standby card 950 commits to the message and sends the commitment to the TCP 1932A in active card 950.

At operation 2710, the standby card 910 receives the commitment from the standby card 950 and converts the commitment to a system commitment.

At operation 2712, the active card 910 sends the system commitment to the remote peer.

The above operation 2700 uses the redundancy manager 920 and 960 to facilitate the transfer of messages between active card 910 and standby card 950. In other embodiments, the operations 2702 through 2710 can be repeated for other messages, however, the system commitment for a particular will not be sent to a peer node until the standby card 950 has committed. The above operations allow a BGP message to pass quickly through to the upper layers on both the active card 910 and standby card 950.

Boot Sequence/Bulk Updating for BGP Protocol Redundancy

Figure 28:
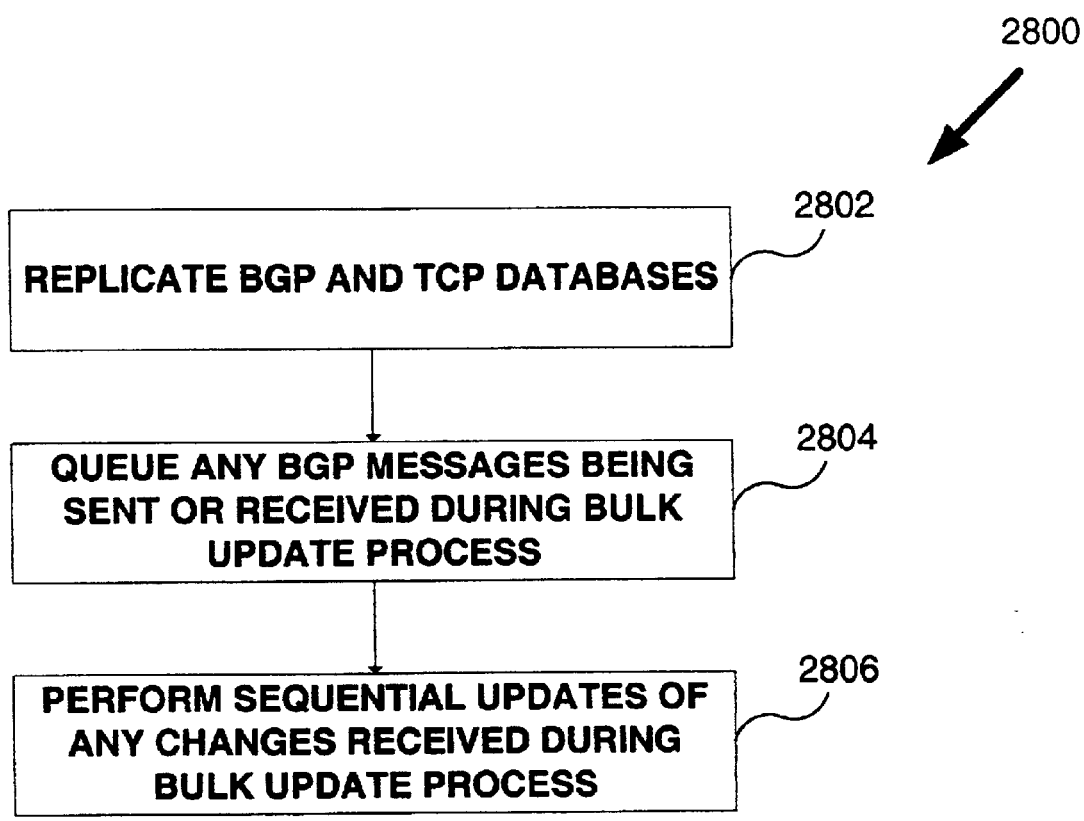
FIG. 28 illustrates a flow chart of an operation to perform bulk updating for the BGP protocol redundancy according to one embodiment.

FIG. 28 illustrates a flow chart of an operation 2800 to perform bulk updating for BGP protocol redundancy according to one embodiment. For purposes of explanation, operation 2800 refers to a boot sequence in which an active card 910 and standby card 950 are operating in a router 104.

Referring to FIG. 28, at operation 2802, BGP and TCP databases are replicated from the active card 910 to the standby card 950. For example, as shown in FIG. 19, the BGP RDB 1927A and BGP PDB 1731A in active card 910 are replicated to BGP RDB 1927B and BGP PDB 1731B in standby card 950. The bulk update operation as explained in the redundancy platform 900 can be used to replicate the BGP databases. Furthermore, the TCP RDB 1933A and TCP PDB 1926A in active card 910 are replicated to the TCP RDB 1933B and TCP PDB 1926B in standby card 950 using the same operation for the BGP databases. Alternatively, nonvolatile memory and other databases can also be replicated.

At operation 2804, any BGP messages received or sent are queued so they can be made in the standby card 950 after the bulk update process. At operation 2806, any BGP messages received or sent are delta updated to the standby card 950 using the delta update operations as shown in FIGS. 24 through 26.

Intermediate System-to-Intermediate System Protocol (IS-IS) Redundancy

Basic IS-IS Protocol Redundancy Requirements

The IS-IS protocol is a link state protocol. A router in an area/domain that generates an IS-IS protocol packet floods all routers within the area/domain with the packet. That is, the packet generated by one IS-IS router is stored in every IS-IS router within the area or domain. Thus, each IS-IS router has a complete and consistent view of the network of other IS-IS routers. These packets are referred to as link state packets (LSP). An LSP packet includes information about the IS router that generates the packet. As such, each router running an IS-IS protocol includes an LSP database or an IS-IS database storing LSP packets.

In order to have IS-IS protocol redundancy, the standby controller system must maintain or be aware of configuration/global information, circuit information, adjacency information, and link state packet (LSP) information in the active controller system. Configuration information includes global information such as the global state of an active card 910, i.e., active or standby. Circuit information includes the states of the circuits that are running. For example, are the circuits enabled/disabled. Adjacency information includes information on the adjacencies of the active, i.e., who are its neighbors. Link state information includes LSP packet information. The redundancy platform 900 provides the support to maintain IS-IS protocol redundancy.

Boot Sequence/Bulk Update For IS-IS Protocol Redundancy

Figure 29:
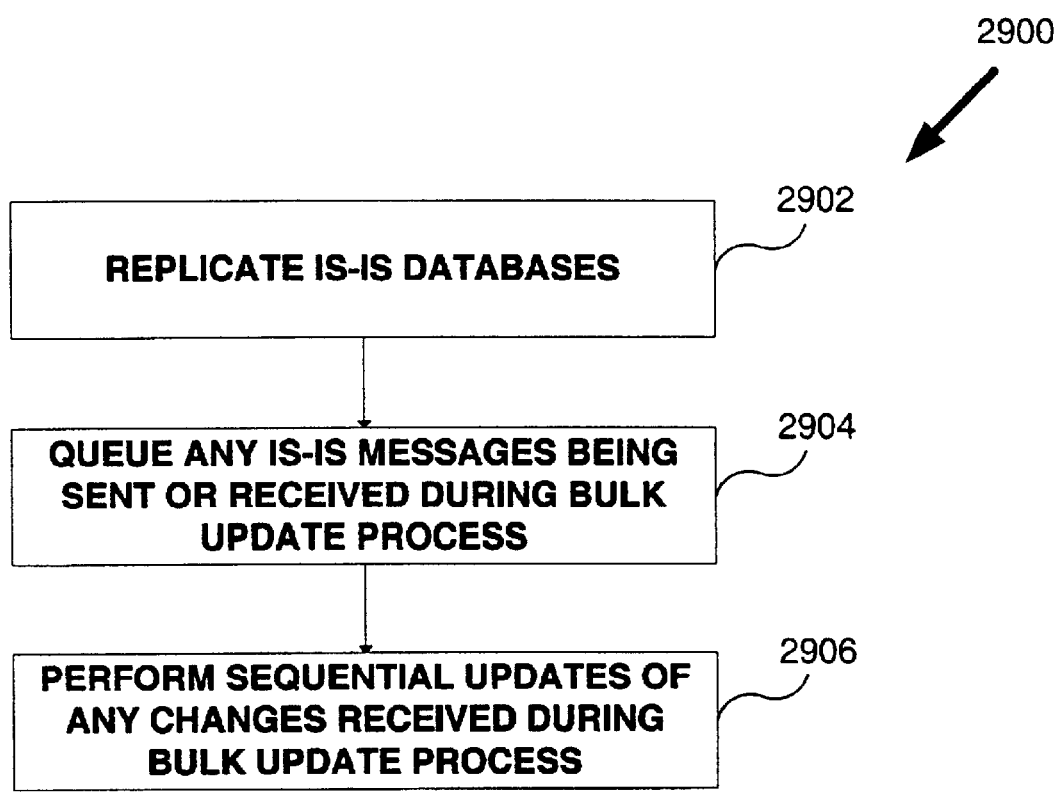
FIG. 29 illustrates a flow chart of an operation to perform bulk updating for the IS-IS protocol redundancy according to one embodiment.

FIG. 29 illustrates a flow chart of an operation 2900 to perform bulk updating for IS-IS protocol redundancy according to one embodiment. For purposes of explanation, operation 2900 refers to a boot sequence in which an active card 910 and standby card 950 are operating in a router 104.

Referring to FIG. 29, at operation 2902, IS-IS databases are replicated from the active card 910 to the standby card 950. For example, as shown in FIG. 19, IGP RDB 1942A and IGP PDB 1924A and FIB 1716A in active card 910 are replicated to IGP RDB 1942B and IGP PDB 1924B and FIB 1716B in standby card 950. IGP databases can be selectively copied for just IS-IS database information. The bulk update operation as explained in the redundancy platform 900 can be used to replicate the IGP IS-IS databases.

At operation 2904, any IS-IS messages received or sent are queued so they can be made in the standby card 950 after the bulk update process. At operation 2906, any IS-IS messages received or sent are delta updated to the standby card 950 using the delta update operations as shown in FIGS. 24 through 26.

Incremental (Delta) Update For IS-IS Protocol Redundancy

Figure 30:
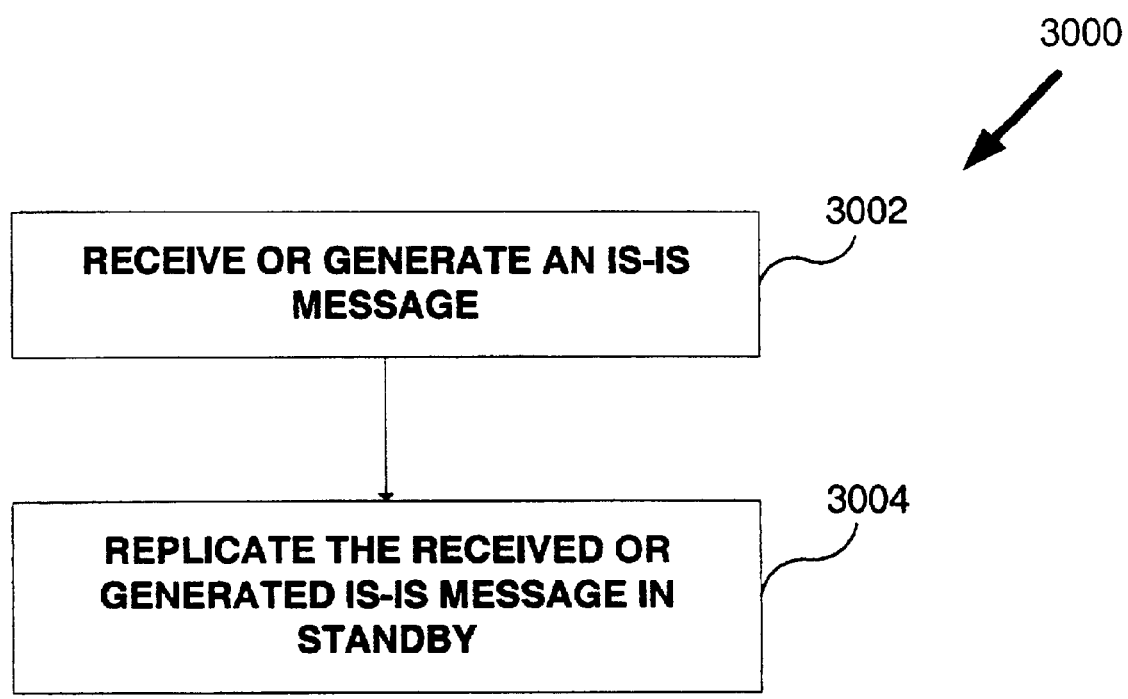
FIG. 30 illustrates a flow chart of an operation to perform delta updating for the IS-IS messages being received or sent according to one embodiment.

FIG. 30 illustrates a flow chart of an operation 3000 to perform incremental (delta) updating for individual IS-IS messages being received or sent according to one embodiment. For purposes of explanation, operation 3000 refers to router having an active card 910 and standby card 950.

Referring FIG. 30, at operation 3002, an IS-IS message is received or generated. For example, IS-IS protocol can generate a LSP or receive a LSP from a peer node. At operation 3004, active card 910 sends the LSP packet to standby card 950, which is treated as neighbor. Thus, standby card 950 replicates the LSP packet.

Open Shortest Path First Protocol (OPSF) Redundancy

Basic Requirements for OSPF Protocol Redundancy

The OSPF protocol is a link-state intra-domain routing protocol and relies on the IP protocol to transmit and receive packets. OSPF does not use TCP or UDP for reliable transfer of packets. The OSPF protocol builds on adjacencies with peer nodes neighbors by exchanging network information with peer nodes. OSPF updates into FIB and other protocols are made by routing table manager (RTM). The basic requirement for OSPF protocol redundancy is to maintain undisturbed OSPF protocol services for RTM on the standby card 910 with the RTM on peer nodes. Accordingly, for OSPF protocol redundancy, all protocol state information, OSPF database information, and configuration information must be maintained in standby card 950.

Boot Sequence/Bulk Update For OSPF Protocol Redundancy

Figure 31:
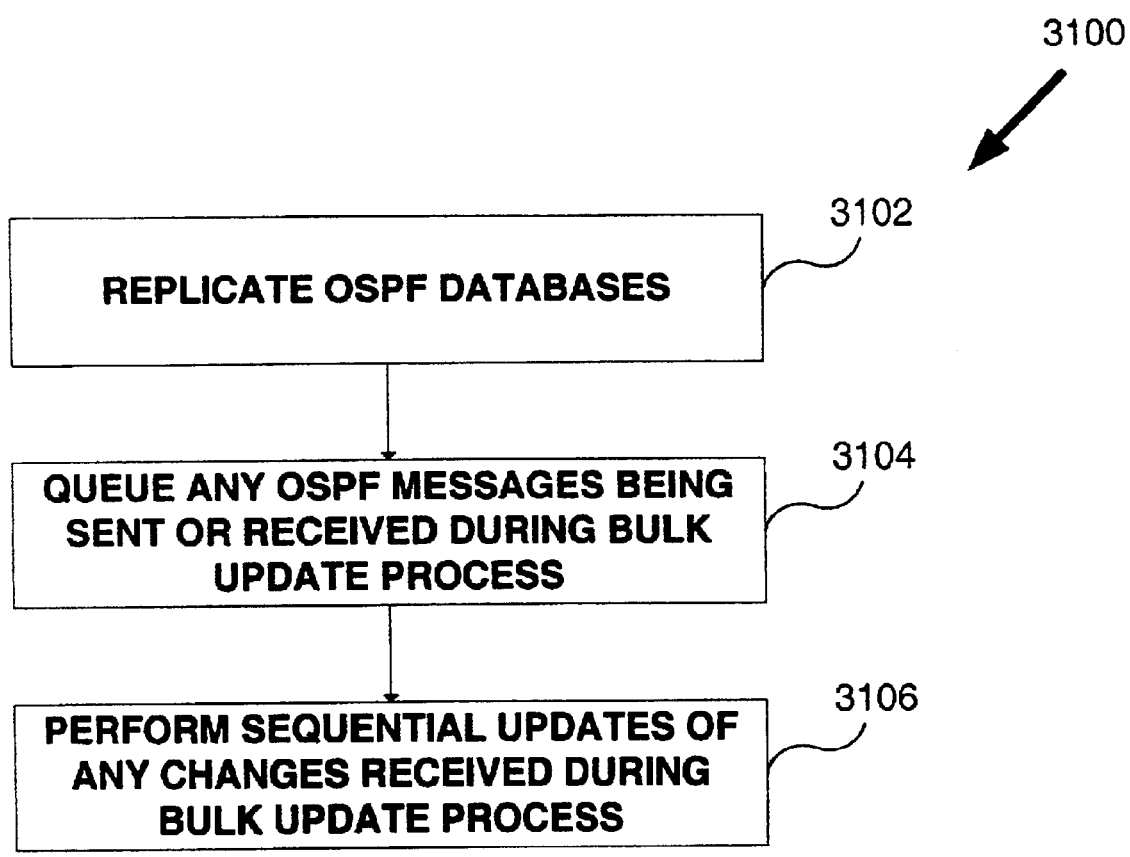
FIG. 31 illustrates a flow chart of an operation to perform bulk updating for the OSPF according to one embodiment.

FIG. 31 illustrates a flow chart of an operation 3100 to perform bulk updating for OSPF protocol redundancy according to one embodiment. For purposes of explanation, operation 3100 refers to a boot sequence in which an active card 910 and standby card 950 are operating in a router 104.

Referring to FIG. 31, at operation 3102, OSPF databases are replicated from the active card 910 to the standby card 950. For example, as shown in FIG. 19, IGP RDB 1942A and IGP PDB 1924A and FIB 1716A in active card 910 are replicated to IGP RDB 1942B and IGP PDB 1924B and FIB 1716B in standby card 950. IGP databases can be selectively copied for just OSPF database information. The bulk update operation as explained in the redundancy platform 900 can be used to replicate the IGP OSPF databases.

At operation 3104, any OSPF messages received or generated are queued so they can be made in the standby card 950 after the bulk update process. At operation 3106, any OSPF messages received or sent are delta updated to the standby card 950 using the delta update operations as shown in FIGS. 24 through 26.

Incremental (Delta) Update For OSPF Protocol Redundancy

Figure 32:
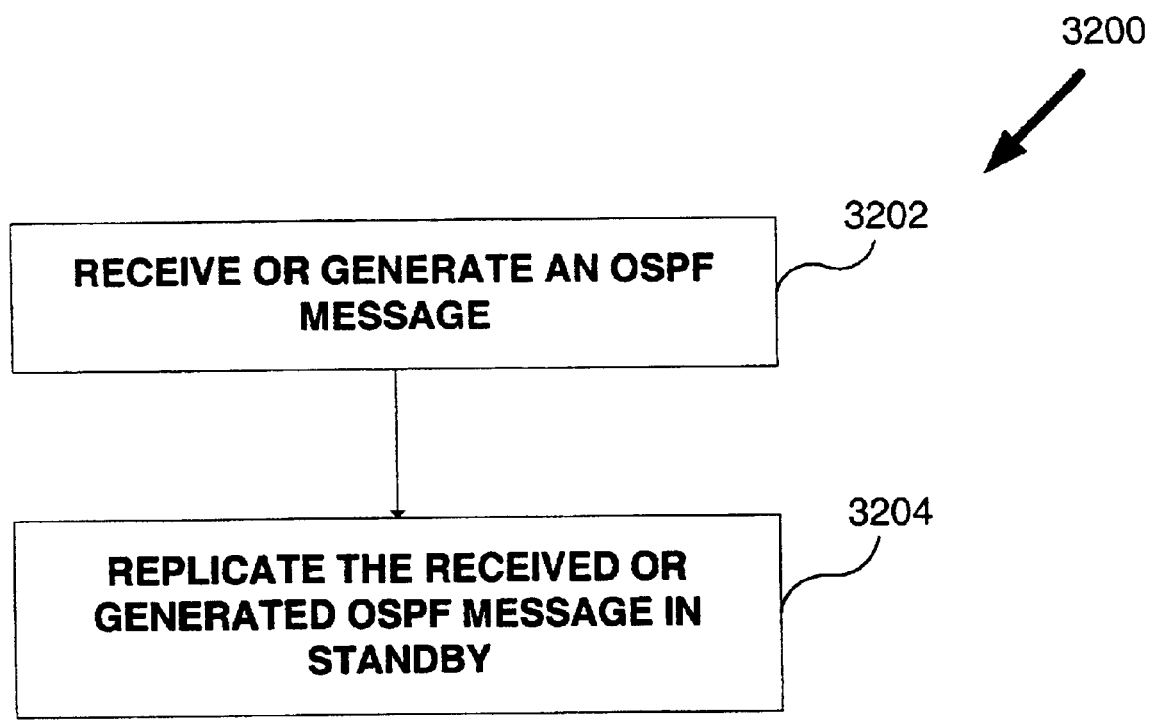
FIG. 32 illustrates a flow chart of an operation to perform delta updating for the OSPF messages being received or sent according to one embodiment.

FIG. 32 illustrates a flow chart of an operation 3200 to perform incremental (delta) updating for individual OSPF messages being received or sent according to one embodiment. For purposes of explanation, operation 3200 refers to router having an active card 910 and standby card 950. Referring FIG. 32, at operation 3202, an OSPF message is received or generated. At operation 3004, active card 910 sends the received or generated OSPF message to standby card 950 using the delta update as explained in the redundancy platform 900. The above described routing protocol redundancy techniques and operations are exemplary in nature and can be applied to other types of routing protocols such as, for example, the Routing Internet Protocol (RIP). For example, the redundancy platform 900 can be used to perform bulk, delta, non-persistent, and persistent data updating for RIP information as described above.

The above router and routing protocol redundancy operations can be implemented as software routines executed by a processor. For a given processor, the software routines can be stored on a storage device, such as a permanent memory. Alternatively, the software routines can be machine executable instructions stored on any machine readable storage medium, such as a diskette, CD-ROM, magnetic tape, digital video or versatile disk (DVD), laser disk, ROM, Flash memory, or other like memory devices. The series of instructions need not be stored locally, and could be received from a remote storage device, such as a server on a network, a CD ROM device, a floppy disk, etc. The instructions may be copied from the storage device into a temporary memory and then accessed and executed by a processor. For one implementation, such software routines can be written in the C programming language. It is to be appreciated, however, that these routines may be implemented in any of a wide variety of programming languages.

For alternate embodiments, the router and routing protocol redundancy operations can be implemented in discrete hardware or firmware. For example, one or more application specific integrated circuits (ASICs) could be programmed to perform the above described redundancy operations. In another example, the redundancy operations can be implemented in one or more ASICs on additional circuit boards and the circuit boards could be inserted into the router or node with redundancy as described above. In another example, field programmable gate arrays (FPGAs) or static programmable gate arrays (SPGA) can be used to implement the redundancy operations described herein. In yet another example, a combination or hardware and software could be used to implement redundancy operations described herein.

Thus, a router and routing protocol redundancy have been described. In the. foregoing specification, the invention has been described with reference to specific exemplary embodiments thereof. It will, however, be evident that various modifications and changes may be made thereto without departing from broader spirit and scope of the invention as set forth in the appended claims. The specification and drawings are, accordingly, to be regarded in an illustrative sense rather a restrictive sense.

What is claimed is:

1. In a network device having a redundancy platform including an active controller system and a standby controller system, a method comprising:
   receiving a routing protocol state change from a peer node by the active controller system;
   sending the routing protocol state change to the standby controller system;
   receiving a commitment to the routing protocol state change by the active controller system from the standby controller system;
   committing to the routing protocol state change in the active controller system; and
   sending the commitment to the peer node by the active controller system.

2. The method of claim 1, further comprising:
   sending the routing protocol state change to a routing protocol after receiving the commitment from the standby controller system.

3. The method of claim 1, further comprising:
   sending the routing protocol state change to a routing protocol after receiving the routing protocol state change from the peer node.

4. The method of claim 1, wherein the routing protocol state change includes a Border Gateway Protocol (BGP) state change, a Routing Internet Protocol (RIP) state change, an Open Shortest Path First Protocol (OSPF) state change, or an Intermediate System-to-Intermediate System Protocol (IS-IS) state change.

5. The method of claim 1, further comprising:
   receiving or generating a routing protocol message by the active controller system; and
   selectively replicating the received or generated routing protocol message in the standby controller system.

6. The method of claim 5, wherein the routing protocol message includes a BGP message, a RIP message, an OSPF message, or an IS-IS message.

7. The method of claim 1, further comprising:
   detecting a failure in the active controller system; and
   maintaining the same routing protocol state changes in the active controller system prior to failure in the standby controller system.

8. The method of claim 1, further comprising:
   performing Internet Protocol (IP) layer 3 service or a Multiprotocol Label Switching (MPLS) service.

9. A network device comprising:
   a standby controller; and
   an active controller to receive a routing protocol state change from a peer node, to send the routing protocol state change to the standby controller, to receive a commitment to the routing protocol state change from the standby controller system, to commit to the routing protocol state after receiving the commitment from the standby controller, and to send the commitment to the peer node.

10. The network device of claim 9, wherein the active controller is to send the routing protocol state change to a routing protocol after receiving the commitment from the standby controller.

11. The network device of claim 9, wherein the active controller is to send the routing protocol state change to a routing protocol after receiving the routing protocol state change from the peer node.

12. The network device of claim 9, wherein the routing protocol state change includes a Border Gateway Protocol (BGP) state change, a Routing Internet Protocol (RIP) state change, an Open Shortest Path First Protocol (OSPF) state change, or an Intermediate System-to-Intermediate System Protocol (IS-IS) state change.

13. The network device of claim 9, wherein the active controller system is to receive or generate a routing protocol message and to replicate selectively the received or generated routing protocol message to the standby controller system.

14. The network device of claim 13, wherein the routing protocol message includes a BGP message, a RIP message, an OSPF message, or an IS-IS message.

15. The network device of claim 9, wherein the active controller system is to detect a failure and the standby controller system is to maintain the same routing protocol state changes in the active controller system prior to the failure.

16. The network device of claim 9, wherein the active controller system or standby controller system is to perform an Internet Protocol (IP) layer 3 service or a Multiprotocol Label Switching (MPLS) service.

17. The network device of claim 9, wherein the network device includes a network router, switch, optical switch, bridge, hub, or gateway.

18. A machine-readable medium that provides instructions, which if executed by a processor, cause the processor to perform the operations comprising:
   receiving a routing protocol state change from a peer node by an active controller system;

sending the routing protocol state change to a standby controller system;

receiving a commitment to the routing protocol state change by the active controller system from the standby controller system;

committing to the routing protocol state change in the active controller system; and sending the commitment to the peer node by the active controller system.

19. The machine-readable medium of claim 18, that further provides instructions, which if executed by the processor, cause the processor to perform the operations comprising:

sending the routing protocol state change to a routing protocol after receiving the commitment from the standby controller system.

20. The machine-readable medium of claim 18, that further provides instructions, which if executed by the processor, cause the processor to perform the operations comprising:

sending the routing protocol state change to a routing protocol after receiving the routing protocol state change from the peer node.

21. A system having a redundancy platform including an active controller system and a standby controller system, the system comprising:

first receiving means for receiving a routing protocol state change from a peer node by the active controller system;

first sending means for sending the routing protocol state change to the standby controller system;

second receiving means for receiving a commitment to the routing protocol state change by the active controller system from the standby controller system;

committing means for committing to the routing protocol state change in the active controller system; and second sending means for sending the commitment to the peer node by the active controller system.

* * * * *